(12) United States Patent
Kobs

(10) Patent No.: US 11,181,413 B2
(45) Date of Patent: Nov. 23, 2021

(54) PRODUCT LEVEL DETECTION APPARATUSES AND SYSTEMS FOR FLUID DISPENSERS

(71) Applicant: GPCP IP Holdings LLC, Atlanta, GA (US)

(72) Inventor: Stephen Russel Kobs, Greenville, WI (US)

(73) Assignee: GPCP IP HOLDINGS LLC, Atlanta, GA (US)

( * ) Notice: Subject to any disclaimer, the term of this patent is extended or adjusted under 35 U.S.C. 154(b) by 360 days.

(21) Appl. No.: 16/114,623

(22) Filed: Aug. 28, 2018

(65) Prior Publication Data

US 2019/0063980 A1 Feb. 28, 2019

Related U.S. Application Data

(60) Provisional application No. 62/551,519, filed on Aug. 29, 2017.

(51) Int. Cl.
*G01F 23/26* (2006.01)
*G01F 23/00* (2006.01)
(Continued)

(52) U.S. Cl.
CPC .......... *G01F 23/266* (2013.01); *A47K 5/1202* (2013.01); *A47K 5/1217* (2013.01);
(Continued)

(58) Field of Classification Search
CPC .. A47K 5/1202; A47K 5/1207; A47K 5/1217; A47K 2005/1218; A47K 5/16;
(Continued)

(56) References Cited

U.S. PATENT DOCUMENTS 5,017,909 A * 5/1991 Goekler ................ G01F 23/265
340/620
5,021,778 A 6/1991 Walton
(Continued)

FOREIGN PATENT DOCUMENTS

WO 20150106030 A1 7/2015

OTHER PUBLICATIONS

International Search Report and Written Opinion, PCT/US2018/048435, dated Jan. 7, 2019, 14 pages.

*Primary Examiner* — Nimeshkumar D Patel
*Assistant Examiner* — Gedeon M Kidanu
(74) *Attorney, Agent, or Firm* — Nelson Mullins Riley & Scarborough LLP

(57) ABSTRACT

A fluid dispenser, such as a skincare product dispenser, comprises a dispenser housing configured to hold a reservoir of fluid for dispensing and a drive assembly for interacting with the reservoir and causing dispensing of the fluid. A fluid detection sensor is positioned within the dispenser housing proximate the reservoir and configured to detect a capacitance level therein. A controller is configured to determine, based on data from the fluid detection sensor, a change in the fluid level across a dispense. The controller is also configured to determine, based on the determined change, that the fluid level in the reservoir reaches a threshold level and cause an action, such as providing an alert, sending information to a remote server, or modifying an operating parameter.

23 Claims, 30 Drawing Sheets

(51) Int. Cl.
*A47K 5/12* (2006.01)
*A47K 5/16* (2006.01)
*G01F 11/00* (2006.01)

(52) U.S. Cl.
CPC .............. *A47K 5/16* (2013.01); *G01F 11/003* (2013.01); *G01F 23/0069* (2013.01); *G01F 23/263* (2013.01); *G01F 23/265* (2013.01); *G01F 23/268* (2013.01); *A47K 2005/1218* (2013.01)

(58) Field of Classification Search
CPC .............. B05B 11/0054; B05B 11/3005; B05B 11/3007; B05B 11/3008; B05B 11/3042; G01F 11/003; G01F 23/0069; G01F 23/263; G01F 23/265; G01F 23/266; G01F 23/268
See application file for complete search history.

(56) References Cited

U.S. PATENT DOCUMENTS

| | | | |
|---|---|---|---|
| 5,182,545 | A | 1/1993 | Goekler et al. |
| 6,431,400 | B1 | 8/2002 | O'Maley et al. |
| 6,443,334 | B1 * | 9/2002 | John .................. B67D 1/0004 222/146.6 |
| 6,539,797 | B2 * | 4/2003 | Livingston ............ G01F 23/266 73/290 R |
| 6,977,588 | B2 | 12/2005 | Schotz et al. |
| 7,040,566 | B1 | 5/2006 | Rodrian et al. |
| 7,530,475 | B2 | 5/2009 | Ophardt |
| 7,533,845 | B2 | 5/2009 | Neveu et al. |
| 7,704,096 | B2 | 4/2010 | Liao et al. |
| 7,774,096 | B2 | 8/2010 | Goerg et al. |
| 7,783,380 | B2 | 8/2010 | York et al. |
| 7,987,756 | B2 | 8/2011 | Lewis et al. |
| 8,240,508 | B2 | 8/2012 | Wegelin et al. |
| 8,364,546 | B2 | 1/2013 | Yenni et al. |
| 8,366,035 | B2 | 2/2013 | Kling et al. |
| 8,395,396 | B2 | 3/2013 | Hagleitner |
| 8,511,599 | B2 | 8/2013 | Lalau et al. |
| 8,558,701 | B2 | 10/2013 | Wegelin et al. |
| 8,763,946 | B1 | 7/2014 | Keily |
| 8,789,787 | B2 | 7/2014 | Kling et al. |
| 8,833,607 | B2 | 9/2014 | Wegelin et al. |
| 8,847,752 | B2 | 9/2014 | Wegelin et al. |
| 9,027,788 | B2 | 5/2015 | Ophardt et al. |
| 9,163,972 | B2 | 10/2015 | Veros et al. |
| 9,349,274 | B2 | 5/2016 | Wegelin et al. |
| 9,357,887 | B2 | 6/2016 | Wegelin et al. |
| D768,407 | S | 10/2016 | Patterson et al. |
| 9,476,752 | B2 | 10/2016 | Vilag et al. |
| 9,633,543 | B2 | 4/2017 | Wegelin et al. |
| 9,633,544 | B2 | 4/2017 | Wegelin et al. |
| 9,633,545 | B2 | 4/2017 | Wegelin et al. |
| 9,913,562 | B2 | 3/2018 | Wegelin et al. |
| 9,984,553 | B2 | 5/2018 | Wegelin et al. |
| 10,034,583 | B2 | 7/2018 | Carignan et al. |
| 10,038,330 | B2 | 7/2018 | Klemm et al. |
| 10,144,027 | B2 | 12/2018 | Ophardt et al. |
| 2005/0011987 | A1 | 1/2005 | Lemaire et al. |
| 2006/0277992 | A1 * | 12/2006 | Calabrese ............ G01F 23/266 73/304 R |
| 2008/0048064 | A1 | 2/2008 | Lemaire et al. |
| 2009/0177315 | A1 | 7/2009 | Goeking et al. |
| 2009/0204256 | A1 | 8/2009 | Wegelin |
| 2009/0250484 | A1 | 10/2009 | Kling et al. |
| 2010/0030376 | A1 | 2/2010 | Omdoll |
| 2010/0170979 | A1 | 7/2010 | Lewis et al. |
| 2010/0268381 | A1 | 10/2010 | Goerg et al. |
| 2011/0054678 | A1 | 3/2011 | Thompson |
| 2011/0114669 | A1 * | 5/2011 | Yang .................. A47K 5/16 222/52 |
| 2011/0133010 | A1 | 6/2011 | Pelland et al. |
| 2011/0215188 | A1 | 9/2011 | Lalau et al. |
| 2015/0206077 | A1 | 7/2015 | Himmelmann et al. |
| 2015/0223646 | A1 * | 8/2015 | Wegelin ............ A47K 5/1211 222/1 |
| 2015/0366411 | A1 * | 12/2015 | Yang .................. A47K 5/1217 222/25 |
| 2016/0020070 | A1 | 1/2016 | Kim et al. |
| 2016/0029854 | A1 | 2/2016 | Veros et al. |
| 2016/0097668 | A1 | 4/2016 | Vilag et al. |
| 2016/0209441 | A1 | 7/2016 | Mazzeo et al. |
| 2016/0240071 | A1 | 8/2016 | Wegelin et al. |
| 2016/0240072 | A1 | 8/2016 | Wegelin et al. |
| 2016/0278583 | A1 | 9/2016 | Wegelin et al. |
| 2017/0135530 | A1 * | 5/2017 | Macleod ............ B05B 11/3009 |
| 2017/0190565 | A1 * | 7/2017 | Proper ................. B67D 7/3245 |
| 2017/0251884 | A1 * | 9/2017 | Carignan ............ A47K 5/1202 |
| 2018/0100754 | A1 * | 4/2018 | Kumar .................. G01F 23/268 |
| 2018/0111145 | A1 * | 4/2018 | Ophardt ................ B05B 12/004 |
| 2018/0199765 | A1 | 7/2018 | Wegelin et al. |
| 2018/0276975 | A1 | 9/2018 | Wegelin et al. |
| 2019/0335957 | A1 | 11/2019 | Hines et al. |

* cited by examiner

PRODUCT LEVEL DETECTION APPARATUSES AND SYSTEMS FOR FLUID DISPENSERS

CROSS-REFERENCE TO RELATED APPLICATION(S)

This application claims priority to U.S. Provisional Application No. 62/551,519, entitled "Skincare Product Level Detection Apparatuses and Systems", filed on Aug. 29, 2017, and which is incorporated by reference herein in its entirety.

FIELD OF THE INVENTION

Example embodiments of the present invention generally relate to fluid dispensers and, more particularly to product level detection within fluid dispensers.

BACKGROUND

Fluid dispensers (e.g., skincare product dispensers) are often provided in washrooms, in bathrooms, on work sites, and at other locations for providing a fluid (e.g., liquid, gel, foam etc.), such as a soap, sanitizer, lotion, or shampoo for personal care. The dispensers may include a dispenser housing and a reservoir filled with a fluid. In some cases, the reservoir may be in the form of a replaceable cartridge that may be selectively positioned within the dispenser housing. As the fluid is dispensed from an individual cartridge, the volume of the fluid in the cartridge decreases, and such cartridges must be periodically replaced. However, it may be difficult to ascertain the level of fluid within a cartridge. In some configurations, such as when the cartridge includes a bag or collapsible solid (such as a bottle), the volume of space occupied by the reservoir of the cartridge may change as fluid is dispensed, making it difficult to visually confirm a level of fluid remaining within the cartridge, such as through a window of a dispenser.

Difficulty in determining the level of fluid remaining in a cartridge may make it difficult to determine when the cartridge should be replaced. Maintenance personnel may accordingly replace cartridges that have remaining fluid, which may lead to wasted fluid, thereby increasing operating costs. Additionally, failure to replace empty cartridges may lead to users attempting to dispense fluid from an empty cartridge, which may lead to an undesirable experience and user dissatisfaction.

Accordingly, a need exists for alternative product level detection apparatuses and systems for fluid dispensers, such as may assist in determining when a cartridge should be replaced.

BRIEF SUMMARY

Some example embodiments of the present invention provide product level detection systems for helping determine when a cartridge in a fluid dispenser should be replaced. In this regard, in some embodiments, one or more sensors may be used to detect the fluid level within the reservoir.

In some example embodiments, specific fluid level thresholds may be monitored in order to provide an appropriately timed indication to a maintenance person (e.g., maintainer) to replace the cartridge. In this regard, it has been noticed that various factors may make it difficult to ascertain an exact real-time fluid level in a cartridge. For example, the reservoir of the cartridge may deform or collapse differently each time, making it difficult to predict a remaining level of fluid within the cartridge. Additionally, changes in humidity and/or temperature may also make it difficult to determine an exact level of fluid remaining within the cartridge. Thus, some example embodiments of the present invention look for a change in fluid level before and after a dispense in order to help determine when a threshold fluid level is met, such as a low product level, an end-of-life product level, and/or an empty product level. Further, in some example embodiments, consecutive dispenses are monitored to determine if, overall, corresponding consecutive changes in fluid level before and after each dispense indicate that the fluid level in the reservoir meets a threshold fluid level. In such a manner, the maintenance person may be informed when such a threshold is meet to enable replacement of the cartridge at appropriate times to avoid unnecessary waste (e.g., by throwing away a non-empty cartridge) and continued usages by a consumer.

Further, in some embodiments, the specific placement of the fluid sensors (such as in relation to the physical shape of the cartridge) enables accurate threshold product level detection. For example, some example embodiments position a first fluid detection sensor proximate a bottom portion of a main body of a reservoir of the cartridge and a second fluid detection sensor proximate the nozzle portion of the reservoir of the cartridge. By monitoring change in fluid level in both portions of the reservoir, different product level thresholds can be accurately predicted, leading to more desirable maintenance of the fluid dispenser.

An example embodiment of the present invention provides fluid dispenser comprising a dispenser housing configured to hold a reservoir of fluid for dispensing, a drive assembly configured to interact with the reservoir of fluid to cause dispensing of the fluid therefrom, a fluid detection sensor positioned within the dispenser housing proximate the reservoir and configured to detect a capacitance level within the reservoir, and a controller. The controller is configured to determine, based on data received from the fluid detection sensor, a change in a level of fluid of the reservoir across a dispense. The controller is further configured to determine, based on the change in the level of fluid in the reservoir across the dispense, an instance in which the level of fluid within the reservoir reaches a threshold level of fluid. The controller is further configured to cause, in an instance in which the level of fluid within the reservoir reaches the threshold level of fluid, a threshold operation to occur. The threshold operation comprises at least one of indication of a notification on an interface of the fluid dispenser, transmission of an alert or information to a remote computing device, or modification of an operating parameter of the fluid dispenser.

In some embodiments, the controller is further configured to determine an instance in which the level of fluid within the reservoir reaches the threshold level of fluid by determining an instance in which a predetermined number of consecutive changes in the level of fluid that corresponds to an increasing capacitance level within the reservoir occurs, and wherein the predetermined number corresponds to at least two consecutive dispenses.

In some embodiments, the fluid detection sensor comprises a single-plate capacitive sensor that is configured to detect the capacitance level within the reservoir.

In some embodiments, the fluid detection sensor is configured to detect the capacitance level of a volume of the reservoir proximate the fluid detection sensor.

In some embodiments, the reservoir comprises a main body portion and a nozzle portion. The reservoir is configured to be positioned with the nozzle portion vertically below the main body portion. The fluid detection sensor is positioned proximate the nozzle portion and oriented to detect the capacitance level of fluid within the nozzle portion. In some embodiments, the threshold level of fluid corresponds to an end-of-life product level within the reservoir, and the controller is further configured to determine an instance in which the level of fluid within the reservoir reaches the end-of-life product level by determining an instance in which a predetermined number of consecutive changes in the level of fluid of the reservoir that corresponds to an increasing capacitance level within the reservoir occurs. The predetermined number corresponds to at least two consecutive dispenses. In some embodiments, the threshold level of fluid corresponds to an empty product level within the reservoir, and the controller is further configured to determine an instance in which the level of fluid within the reservoir reaches the empty product level by determining an instance in which a predetermined number of consecutive changes in the level of fluid of the reservoir that corresponds to a decreasing capacitance level within the reservoir occurs. The predetermined number corresponds to at least two consecutive dispenses.

In some embodiments, the reservoir comprises a main body portion and a nozzle portion. The fluid detection sensor is a first fluid detection sensor and the detected capacitance level from the first fluid detection sensor is a first capacitance level. The first fluid detection sensor is positioned proximate the main body portion and oriented to detect the capacitance level of fluid within the main body portion. The fluid dispenser comprises a second fluid detection sensor positioned within the dispenser housing proximate the nozzle portion of the reservoir and configured to detect a second capacitance level within the nozzle portion of the reservoir. The controller is configured to determine, based on data received from the second fluid detection sensor, the change in a level of fluid within the nozzle portion of the reservoir across the dispense. The controller is further configured to determine, based on the change in the level of fluid within the nozzle portion of the reservoir across the dispense, an instance in which the level of fluid within the nozzle portion of the reservoir reaches a second threshold level of fluid. The controller is further configured to cause, in an instance in which the level of fluid within the nozzle portion of the reservoir reaches the second threshold level of fluid, a second threshold operation to occur. The second threshold operation comprises at least one of indication of a notification on an interface of the fluid dispenser, transmission of an alert or information to a remote computing device, or modification of an operating parameter of the fluid dispenser.

In some embodiments, the controller is further configured to determine the change in the level of fluid of the reservoir across the dispense based on a first measured capacitance level taken prior to the dispense and a second measured capacitance level taken after the dispense. In some embodiments, the second measured capacitance level taken after the dispense occurs at least 90 seconds after the dispense occurs.

In some embodiments, the reservoir comprises a main body portion and a nozzle portion. The reservoir is configured to be positioned with the nozzle portion vertically below the main body portion. The fluid detection sensor is positioned proximate a bottom of the main body portion of the reservoir. In some embodiments, the fluid detection sensor is oriented generally upwardly and extends across a width of the bottom of the main body portion.

In some embodiments, the controller is further configured to determine an instance in which the level of fluid within the reservoir reaches the threshold level of fluid by determining that the determined change in the level of fluid of the reservoir across the dispense is greater than a minimum change in level threshold.

In another example embodiment a system is provided. The system comprises a fluid dispenser comprising a dispenser housing configured to hold a reservoir of fluid for dispensing, wherein the reservoir comprises a main body portion and a nozzle portion, a drive assembly configured to interact with the reservoir of fluid to cause dispensing of the fluid therefrom, a fluid detection sensor positioned within the dispenser housing proximate the reservoir and configured to detect a capacitance level within the reservoir, a communications interface configured to transmit data to a remote computing device, and a controller. The controller is configured to determine, based on data received from the fluid detection sensor, a change in a level of fluid of the reservoir across a dispense. The controller is further configured to determine, based on the change in the level of fluid in the reservoir across the dispense, an instance in which the level of fluid within the reservoir reaches a threshold level of fluid. The controller is further configured to cause, in an instance in which the level of fluid within the reservoir reaches the threshold level of fluid, transmission of an indication, alert, or information to be sent to a remote computing device. The system further comprises the remote computing device, which includes a remote computing device controller configured to receive, via a remote computing device communications interface, the indication, alert, or information from the controller of the fluid dispenser, and cause performance of a remote computing device action based on receipt of the indication, alert, or information.

In some embodiments, the controller of the fluid dispenser is further configured to determine an instance in which the level of fluid within the reservoir reaches the threshold level of fluid by determining an instance in which a predetermined number of consecutive changes in the level of fluid of the reservoir that corresponds to an increasing capacitance level within the reservoir occurs. The predetermined number corresponds to at least two consecutive dispenses.

In some embodiments, the fluid detection sensor comprises a single-plate capacitive sensor that is configured to detect the capacitance level within the reservoir.

In some embodiments, the reservoir comprises a main body portion and a nozzle portion. The reservoir is configured to be positioned with the nozzle portion vertically below the main body portion. The fluid detection sensor is positioned proximate the nozzle portion and oriented to detect the capacitance level of fluid within the nozzle portion.

In yet another example embodiment, a fluid dispenser is provided. The fluid dispenser comprises a dispenser housing configured to hold a reservoir of fluid for dispensing, wherein the reservoir comprises a main body portion and a nozzle portion, a drive assembly configured to interact with the reservoir of fluid to cause dispensing of the fluid therefrom, a fluid detection sensor positioned within the dispenser housing proximate the nozzle portion of the reservoir and configured to detect a capacitance level within the nozzle portion of the reservoir, and a controller. The controller is configured to determine, based on data received from the fluid detection sensor, an instance in which a level of fluid within the reservoir reaches a threshold level of fluid. The controller is further configured to cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to be sent to a remote computing device, or modification of an operating parameter of the fluid dispenser.

In some embodiments, the controller is configured to determine, based on the data received from the fluid detection sensor, a change in the capacitance level within the nozzle portion between a first nozzle portion reading corresponding to before a dispense occurs and a second nozzle portion reading corresponding to after the dispense occurs. The controller is further configured to determine an instance in which the level of fluid within the reservoir reaches the threshold level of fluid based on the determined change in the capacitance level within the nozzle portion between the first nozzle portion reading and the second nozzle portion reading.

In some embodiments, the controller is further configured to determine an instance in which the level of fluid within the reservoir reaches the threshold level of fluid by determining an instance in which a predetermined number of consecutive changes in the capacitance level within the nozzle portion that corresponds to an increasing capacitance level within the nozzle portion occurs. The predetermined number corresponds to at least two consecutive dispenses.

In some embodiments, the reservoir is configured to be positioned within the fluid dispenser with the nozzle portion vertically below the main body portion.

In yet another example embodiment an under-counter mounted fluid dispenser is provided. The under-counter mounted fluid dispenser comprises a dispenser housing configured to mount underneath a counter and hold a reservoir of fluid for dispensing. The reservoir comprises a main body portion and a nozzle portion. The reservoir is configured such that the nozzle portion is positioned vertically above the main body portion. The under-counter mounted fluid dispenser further comprises a drive assembly configured to interact with the reservoir of fluid to cause dispensing of the fluid therefrom, a fluid detection sensor, and a controller. The fluid detection sensor is positioned within the dispenser housing above the main body portion of the reservoir and oriented generally downwardly into the main body portion. The fluid detection sensor is configured to detect a capacitance level within the main body portion of the reservoir. The controller is configured to determine, based on data received from the fluid detection sensor, an instance in which a level of fluid within the reservoir reaches a threshold level of fluid. The controller is further configured to cause, in an instance in which the level of fluid within the reservoir reaches the threshold level of fluid, a threshold operation to occur. The threshold operation comprises at least one of indication of a notification on an interface of the fluid dispenser, transmission of an alert or information to be sent to a remote computing device, or modification of an operating parameter of the fluid dispenser.

In some embodiments, the fluid detection sensor comprises a single-plate capacitive sensor that is configured to detect the capacitance level within the main body portion of the reservoir.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10:
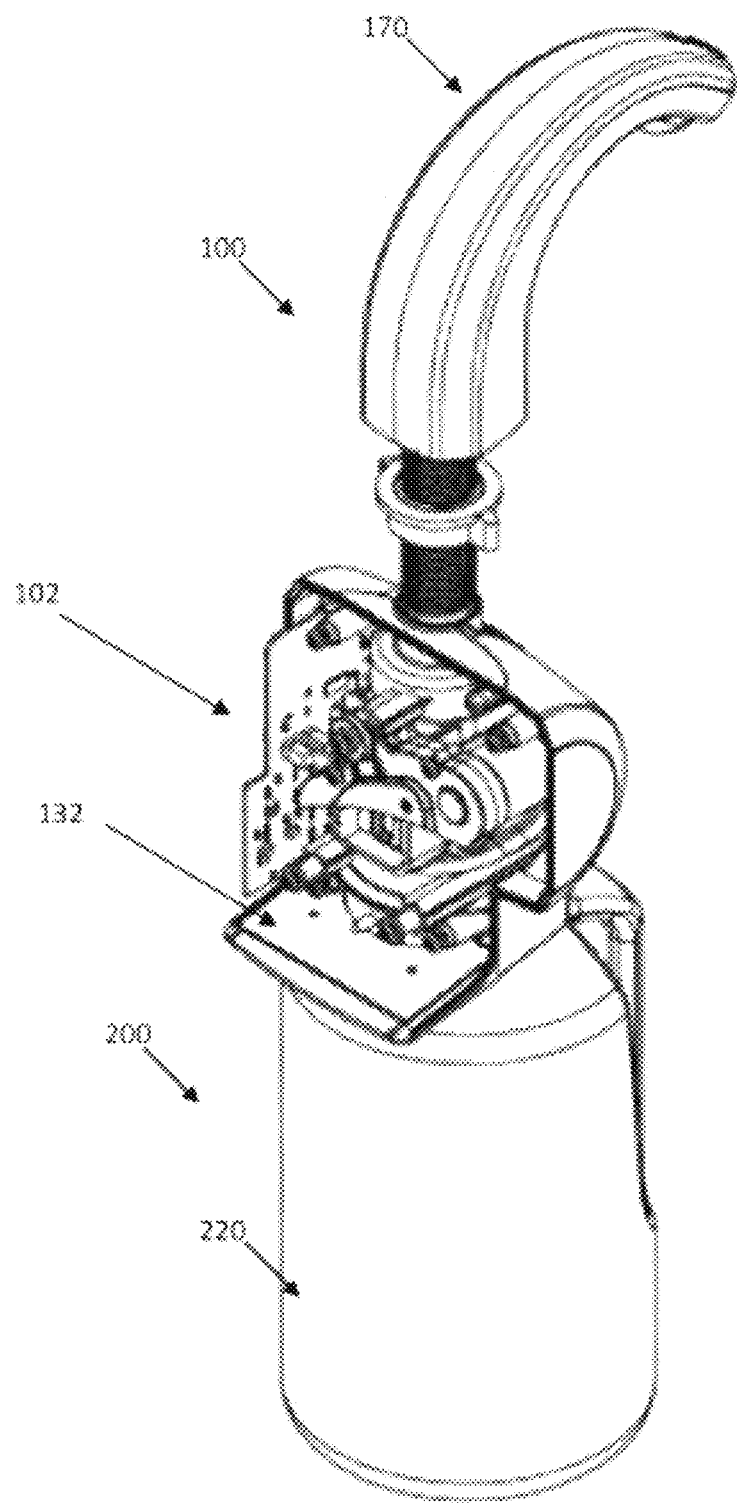
Figure 11:
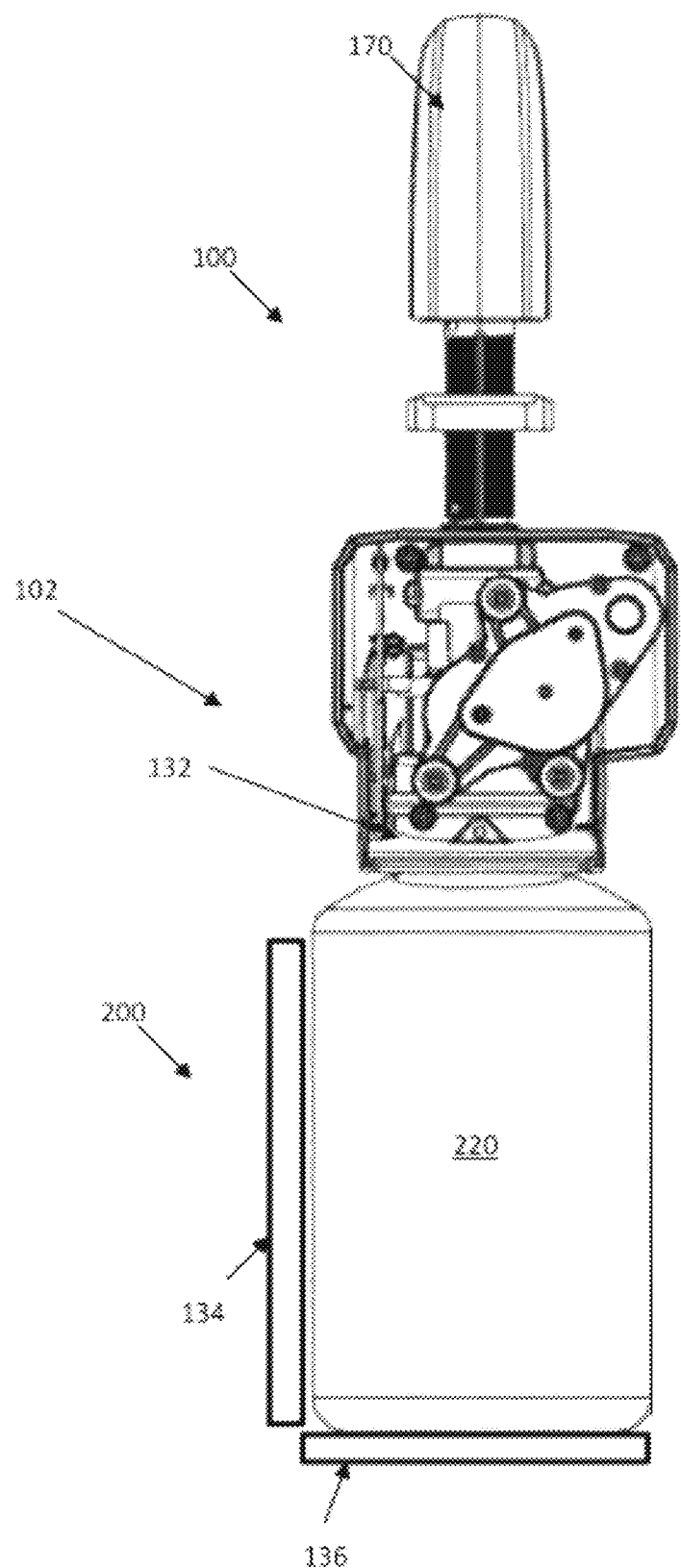
Figure 12:
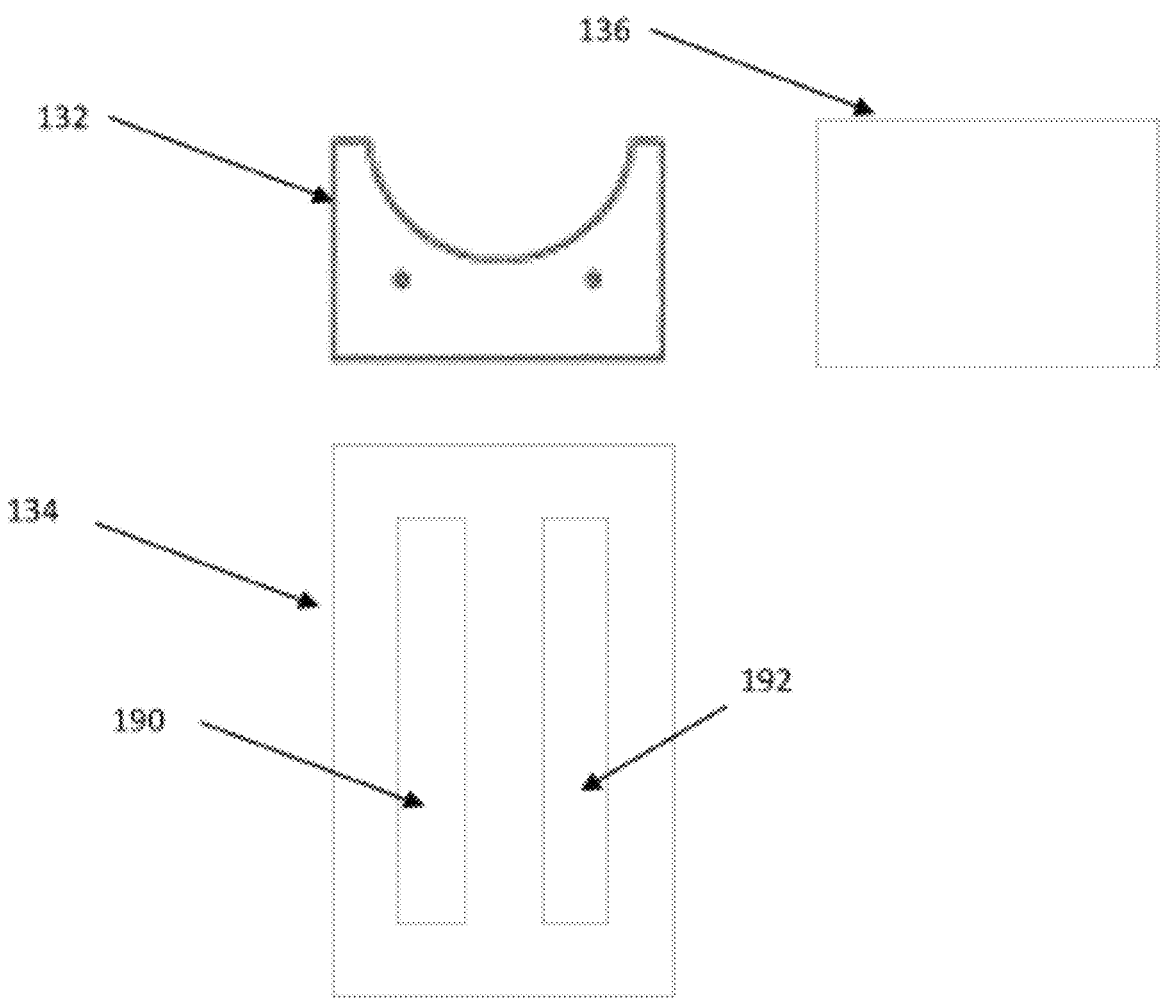
Figure 13:
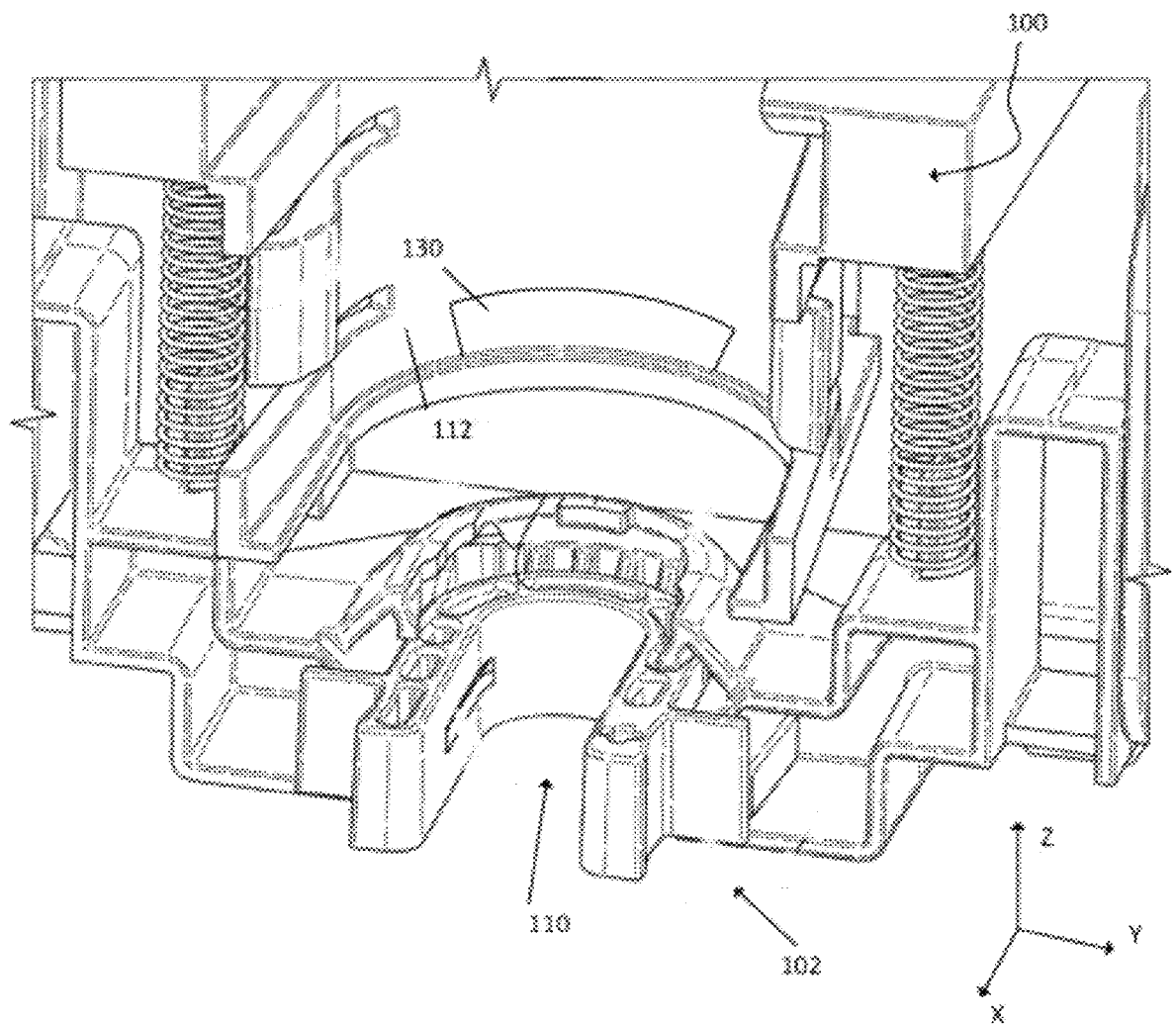
Figure 14:
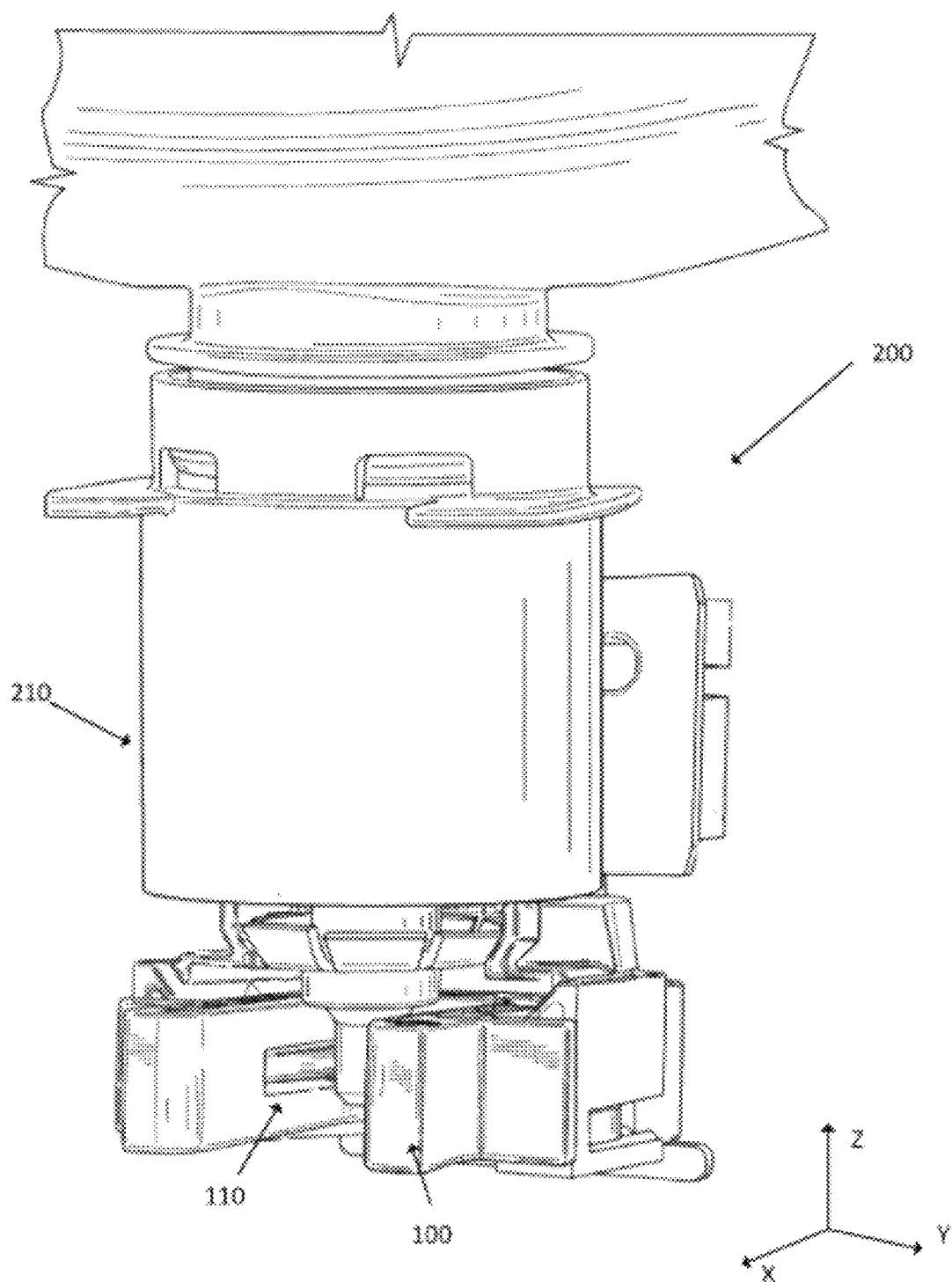
Figure 15:
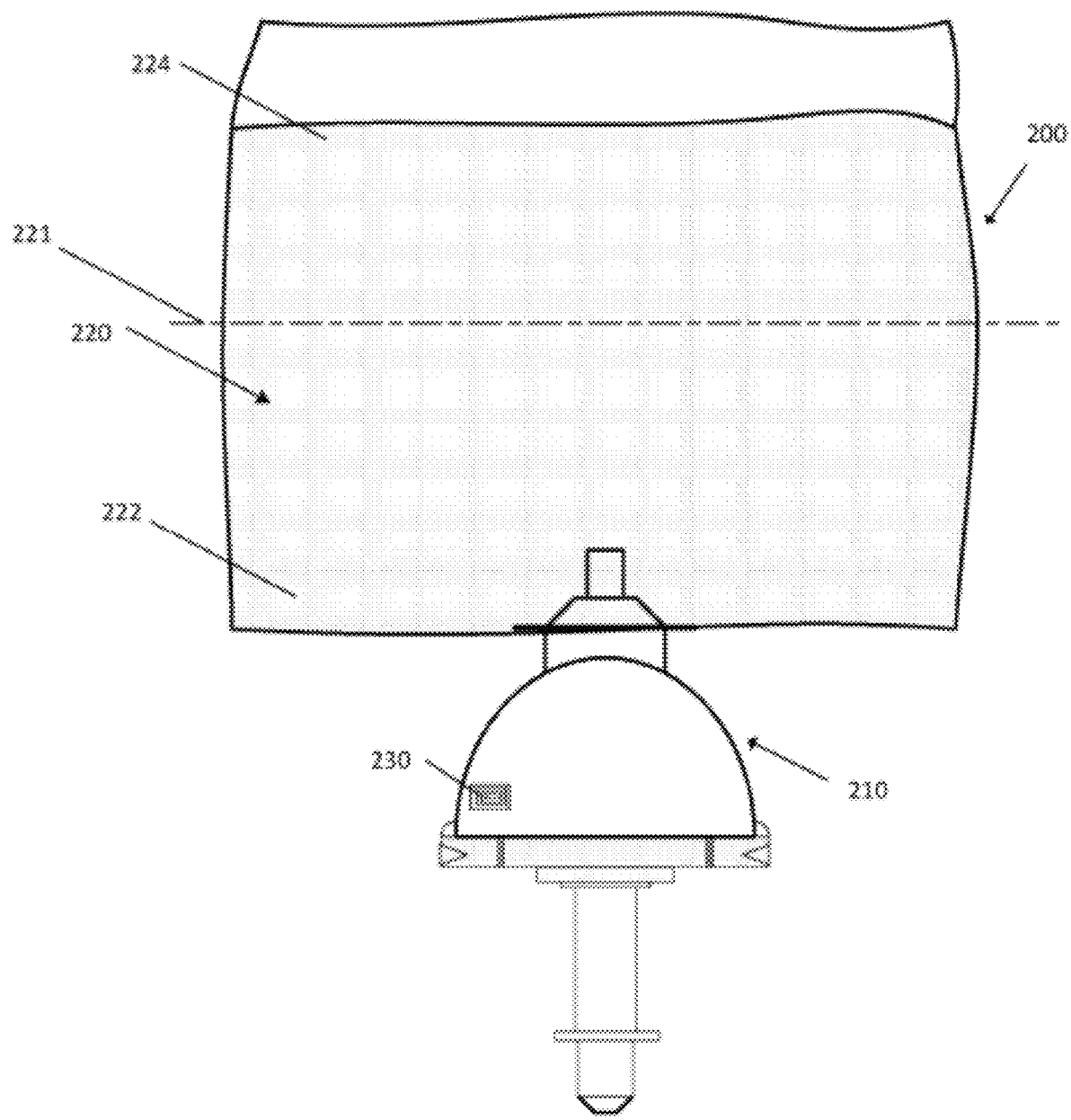
Figure 16:
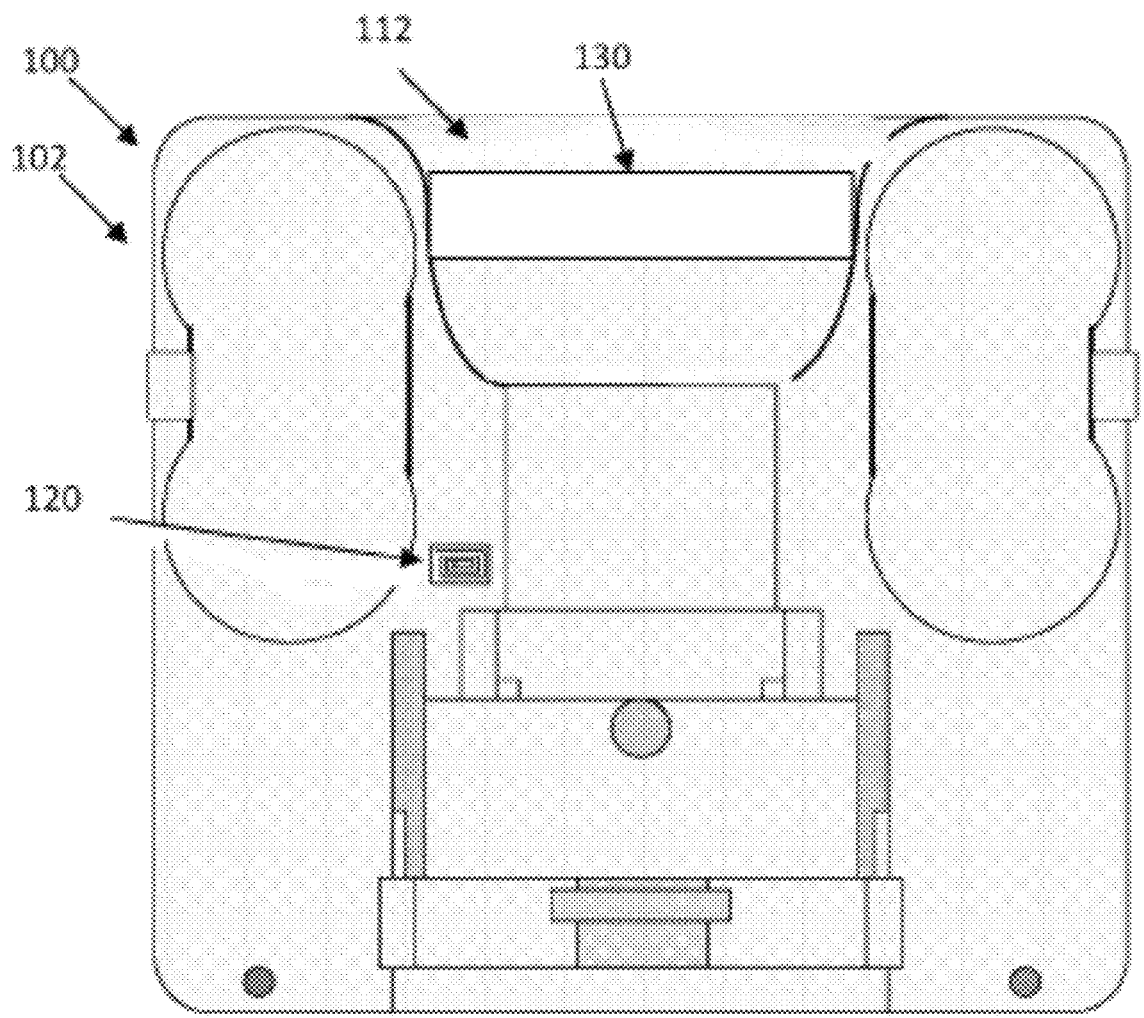
Figure 17:
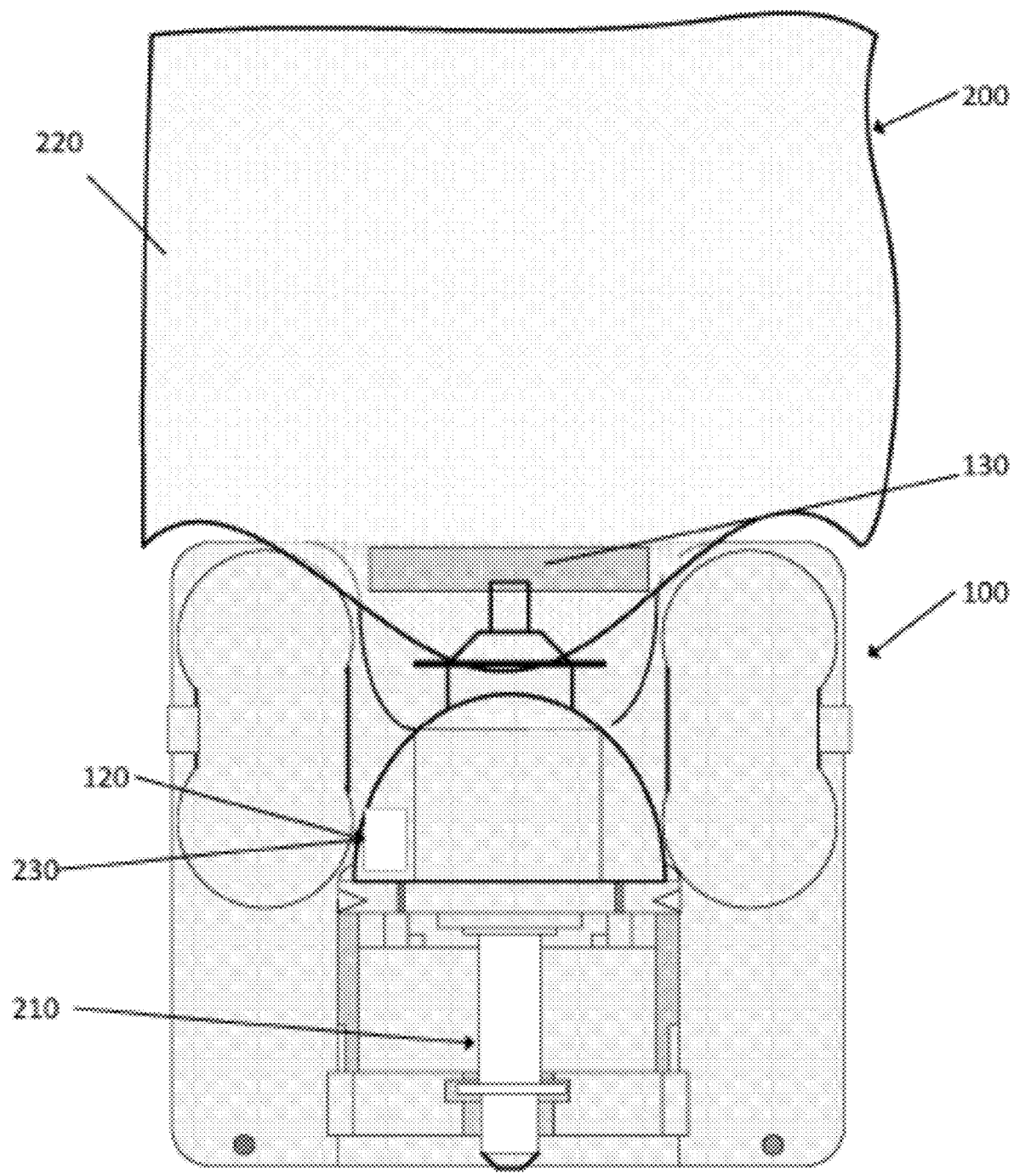
Figures 18A, 18B, 18C:
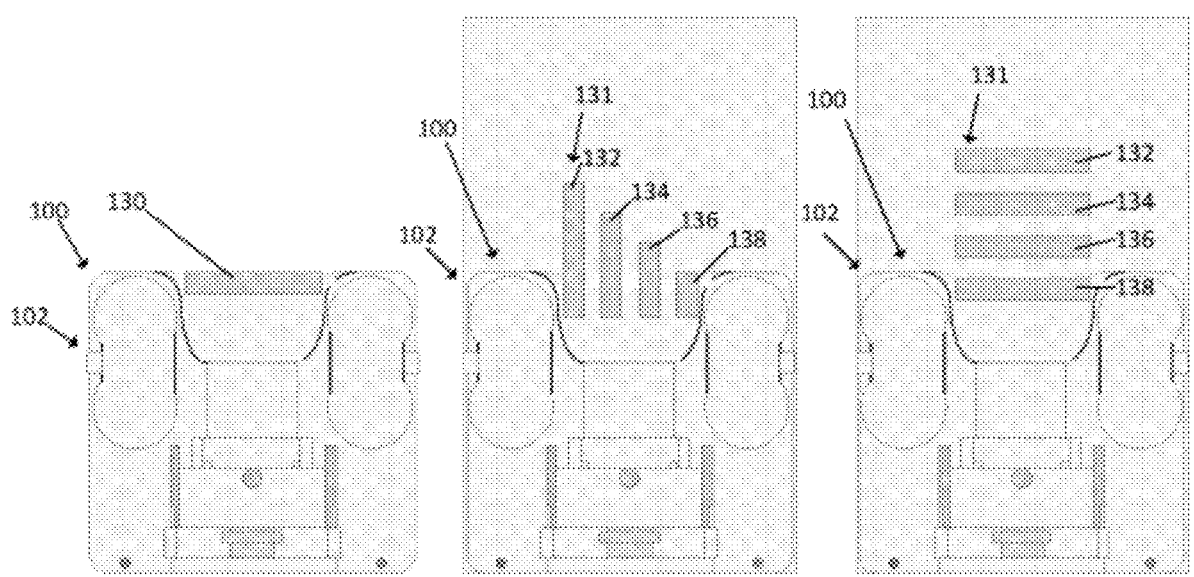
Figure 19:
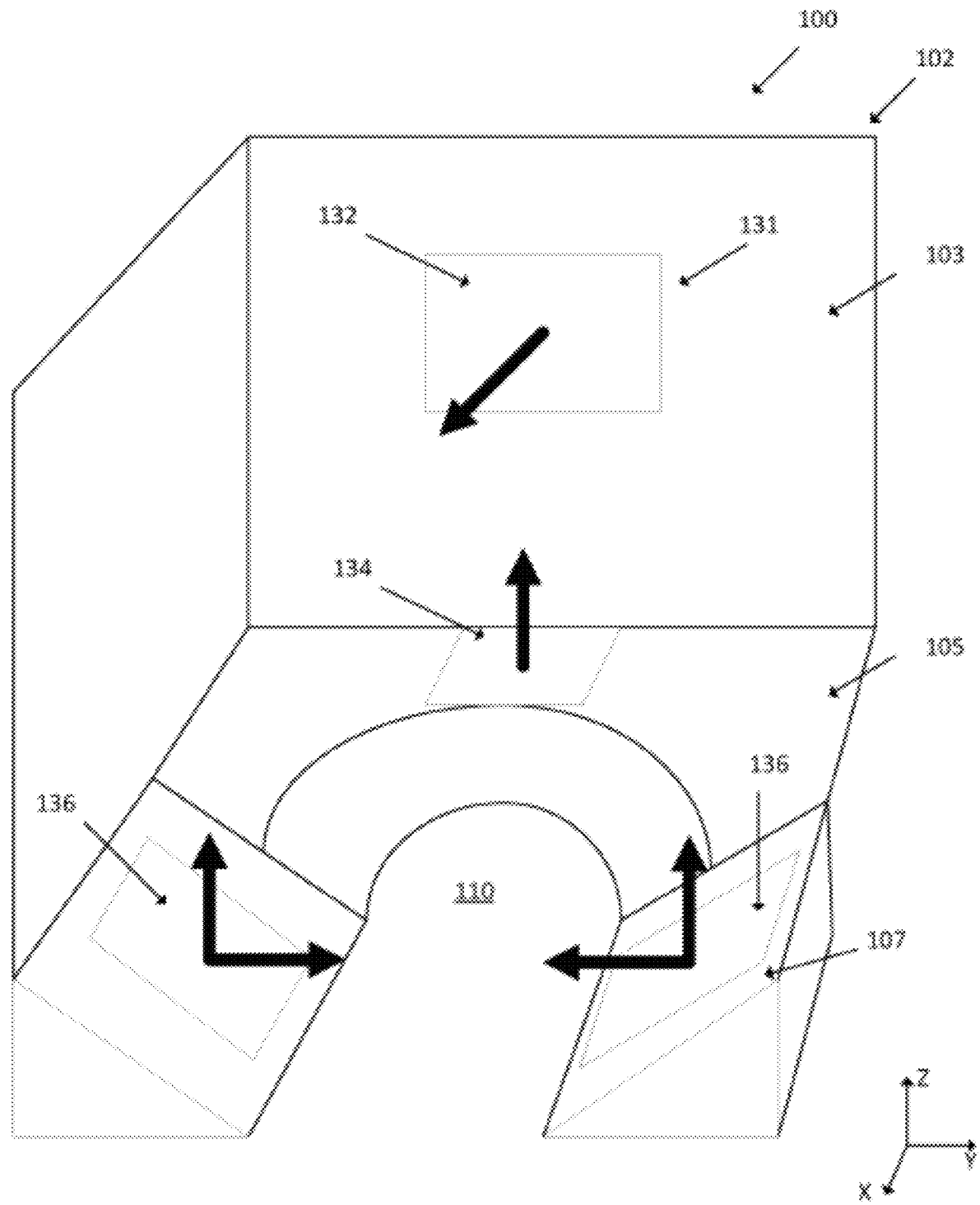
Figure 20:
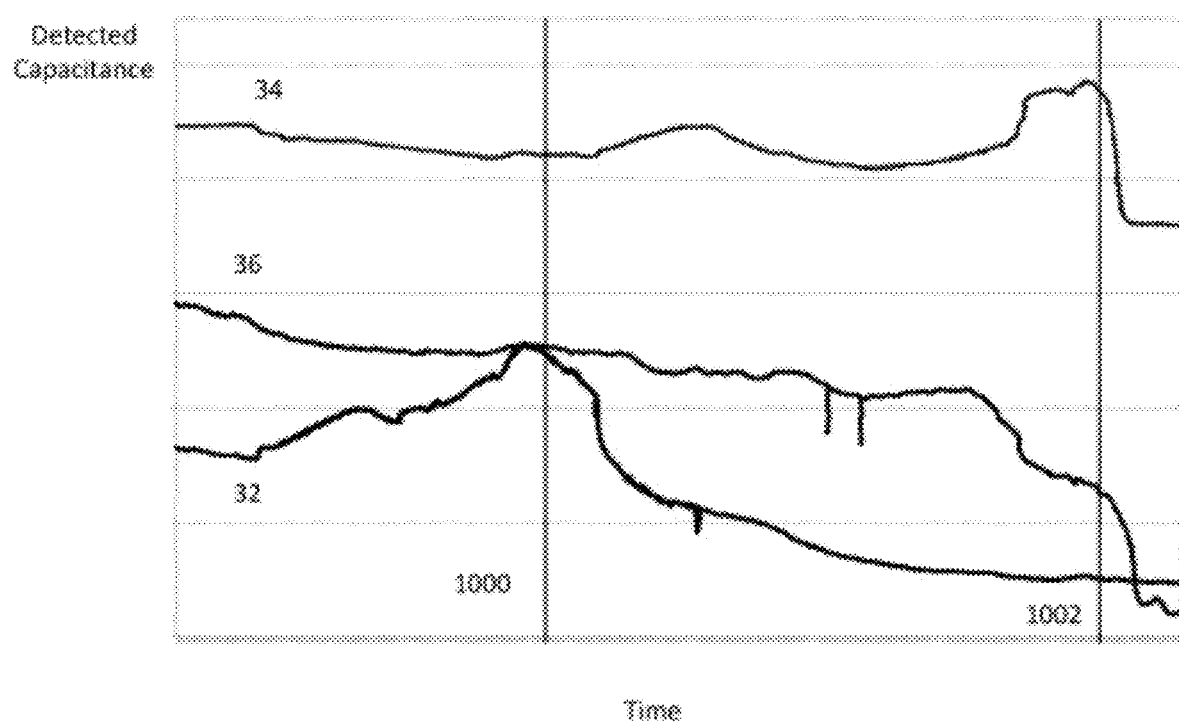
Figure 21:
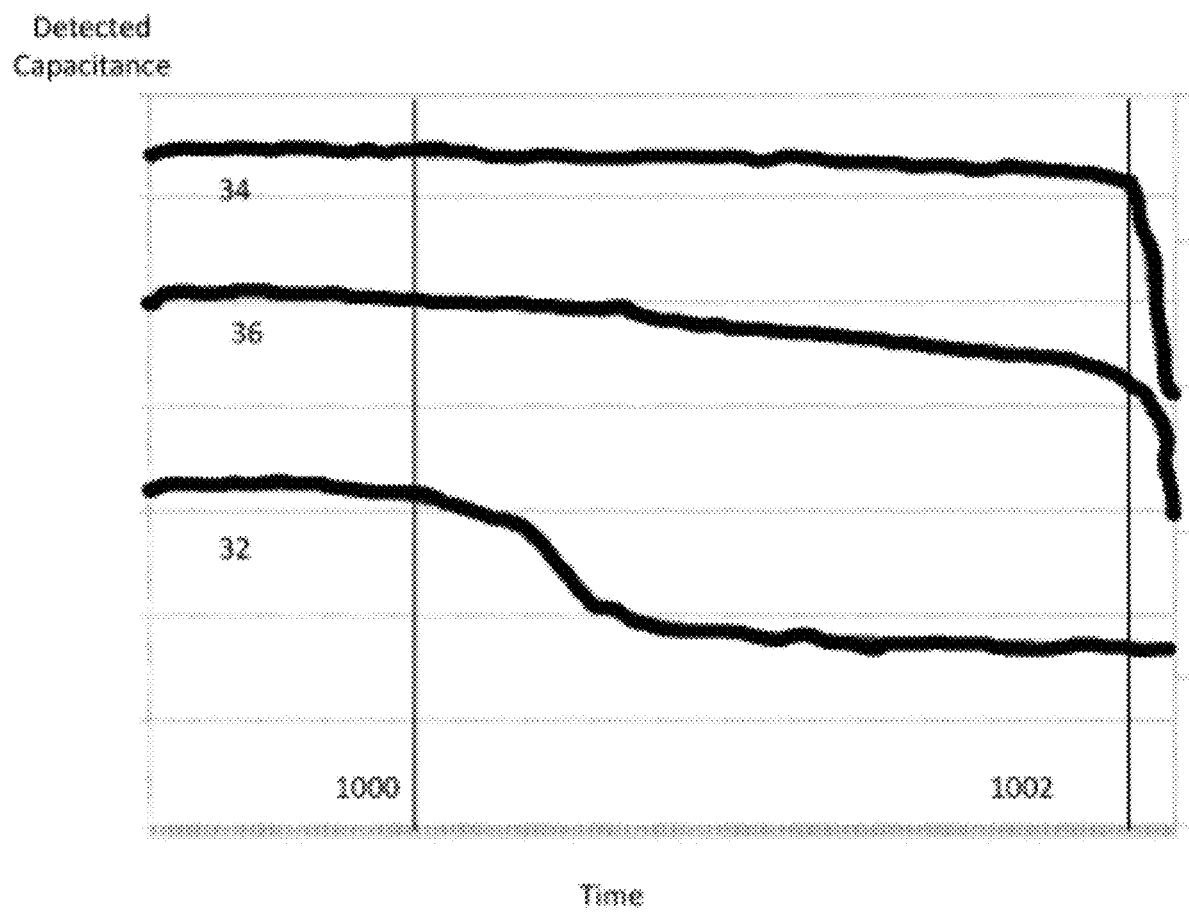
Figure 22:
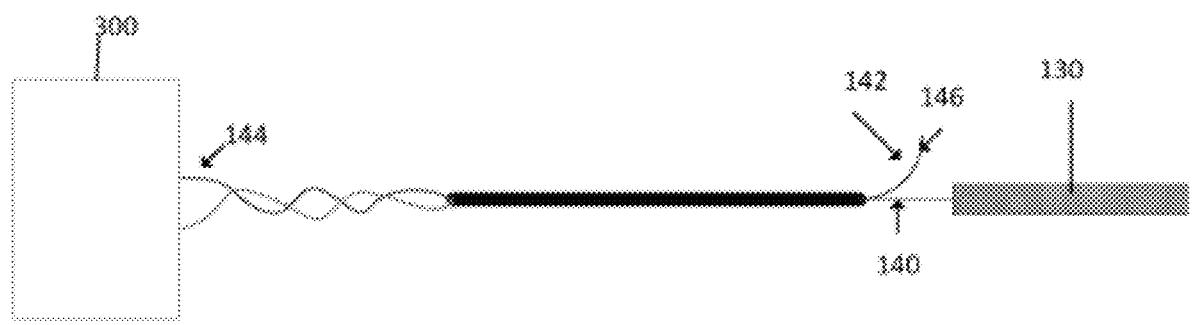
Figure 23:
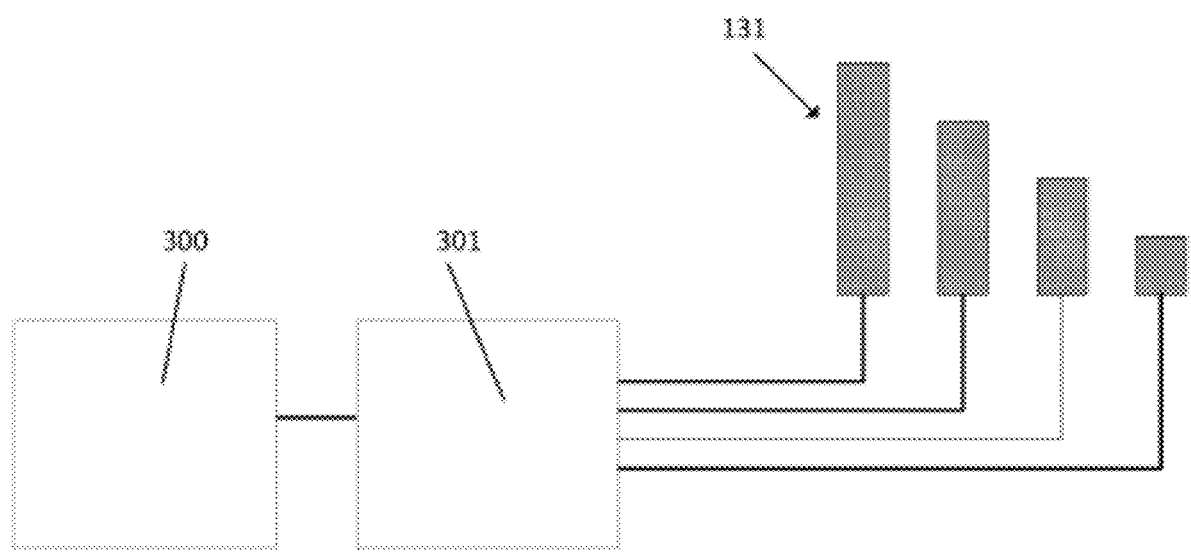
Figure 24:
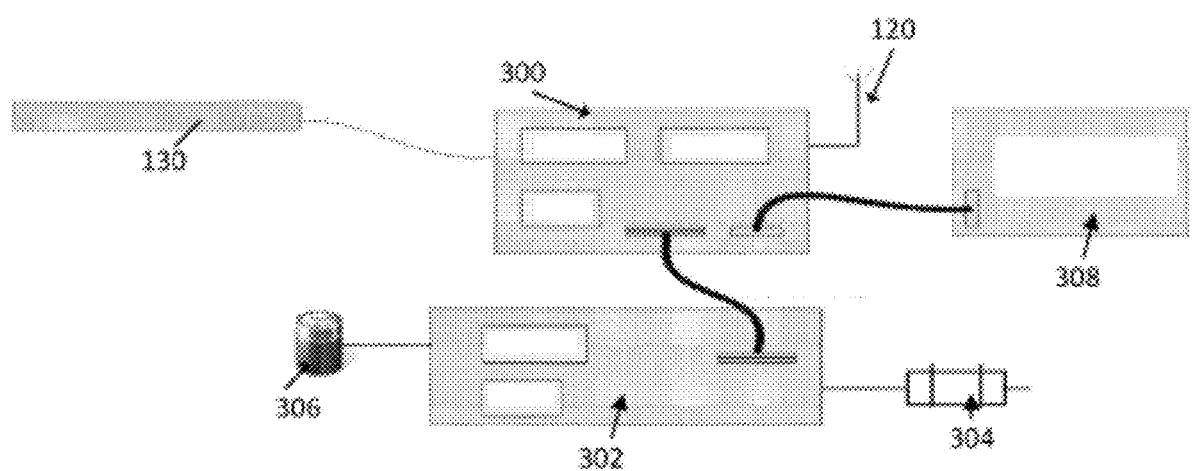
Figure 25:
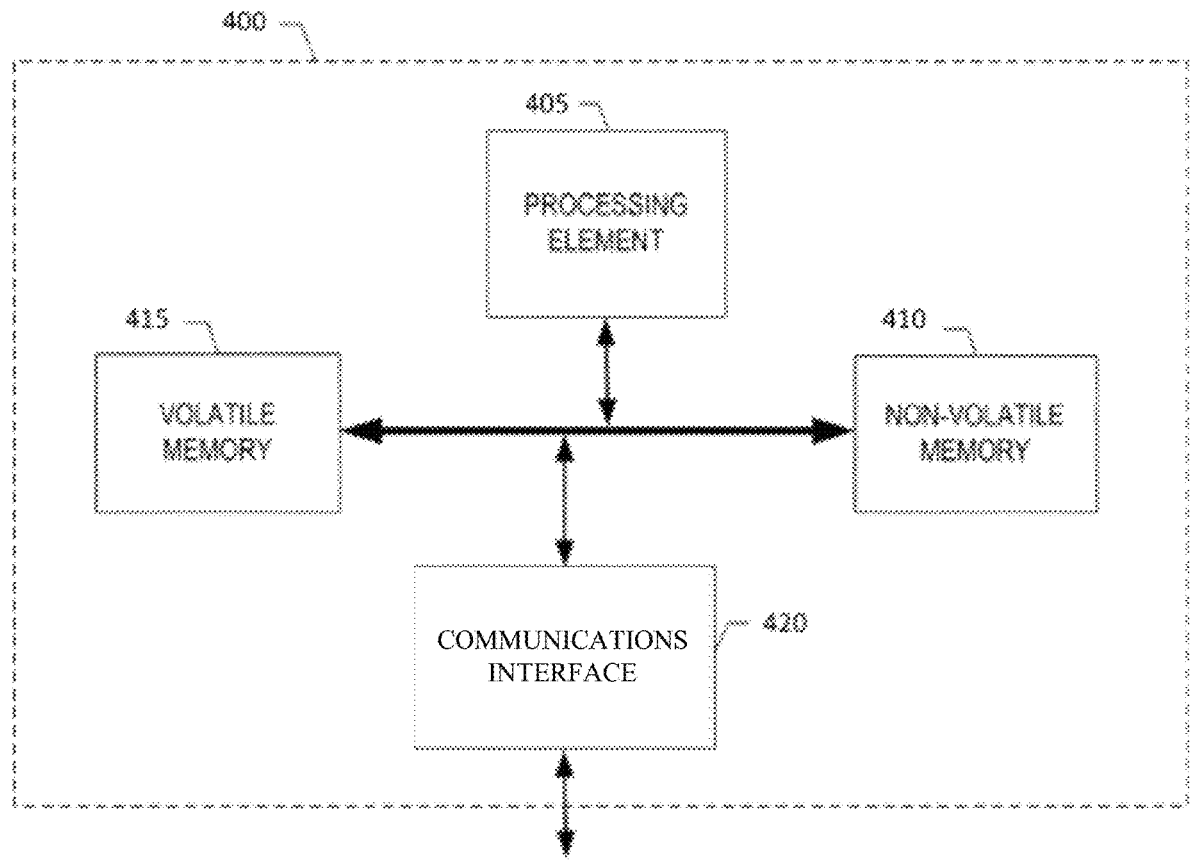
Figure 26:
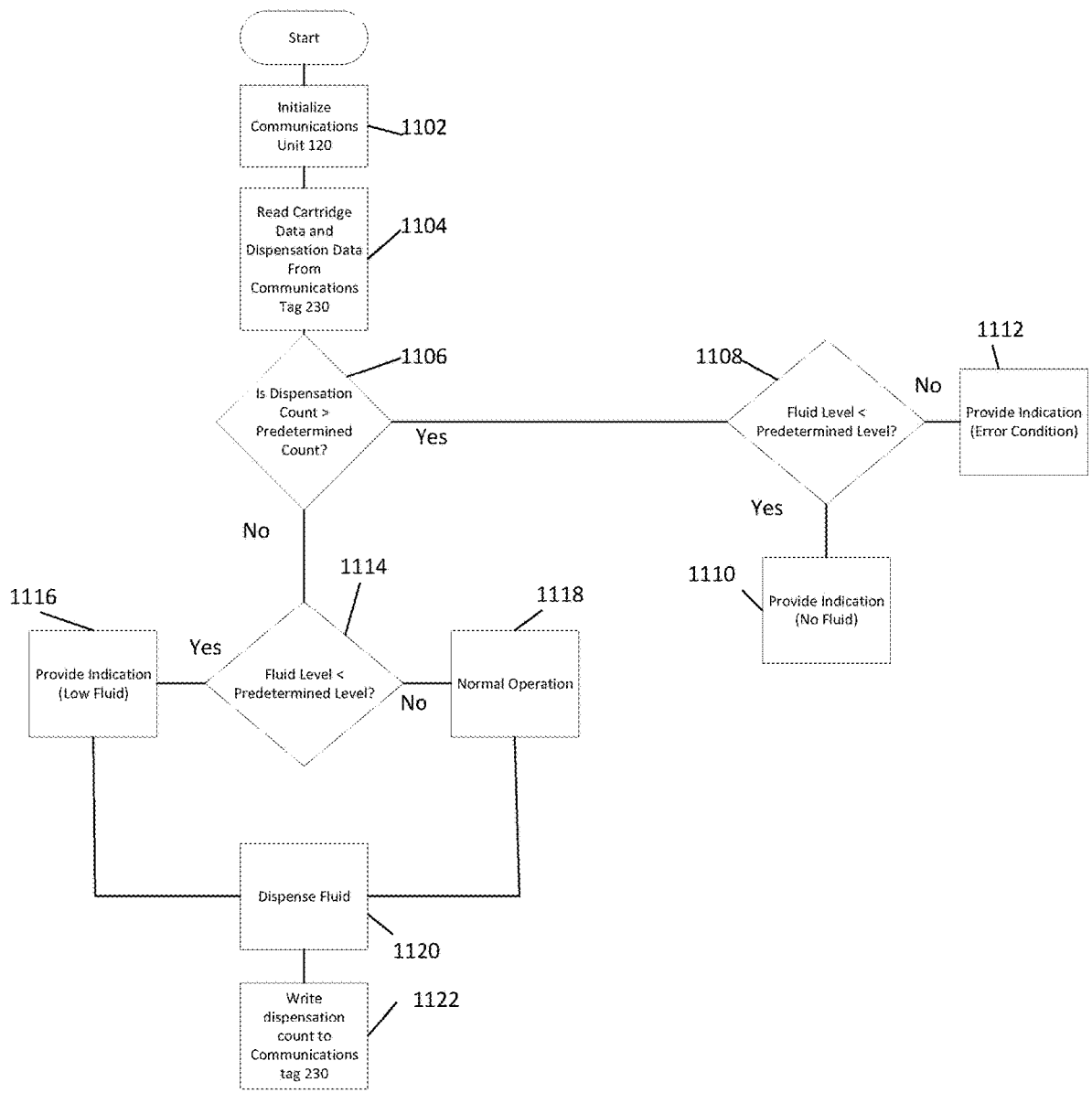
Figure 27:
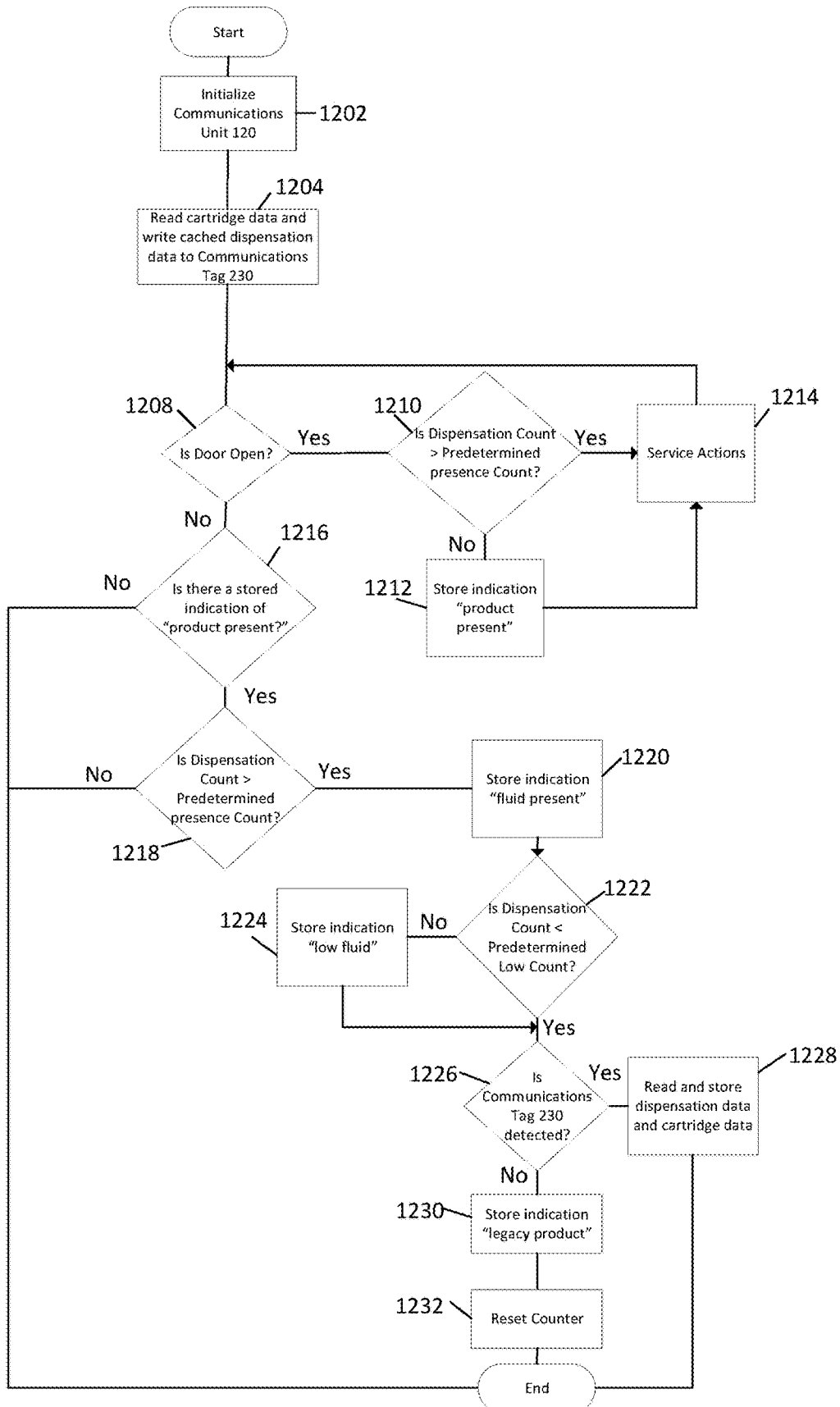
Figure 28:
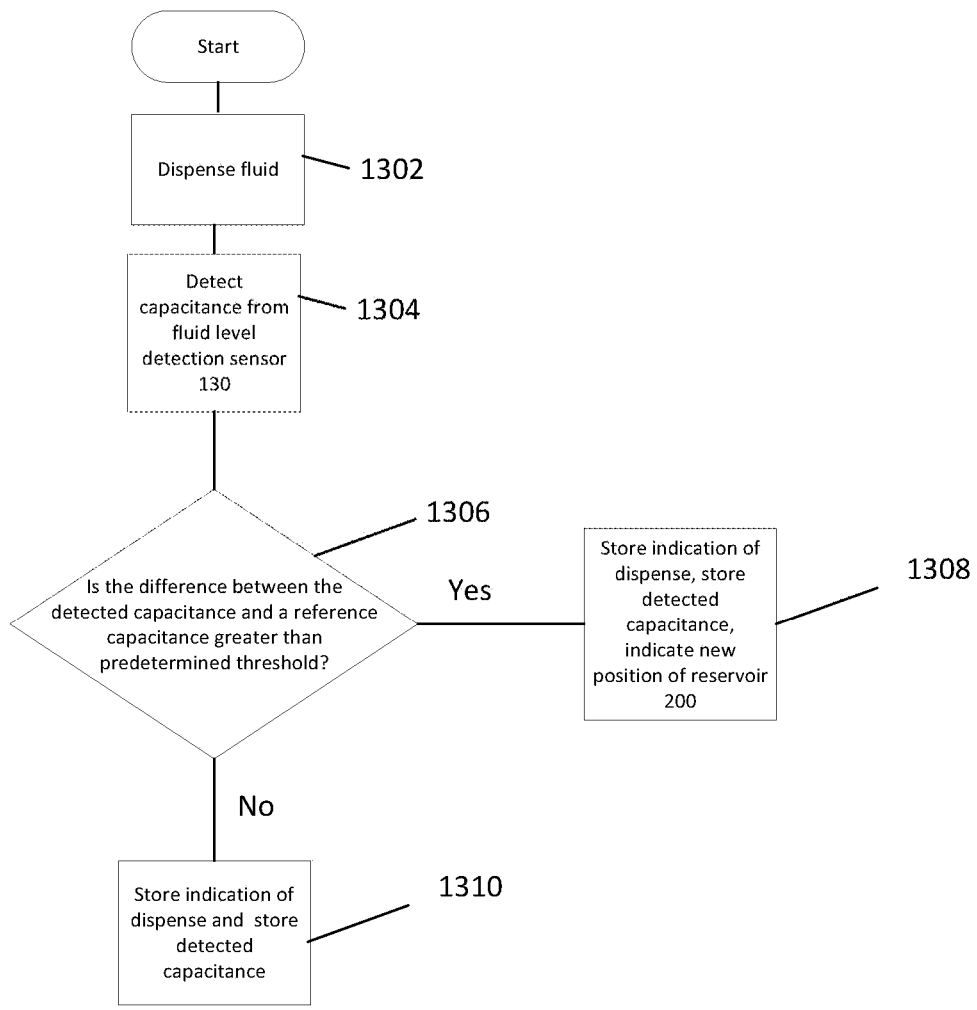

FIG. 10 schematically depicts a perspective view of another example fluid dispenser, wherein the fluid dispenser is configured for under-counter mounting, in accordance with some example embodiments described herein;

FIG. 11 schematically depicts a rear view of another example fluid dispenser, in accordance with some example embodiments described herein;

FIG. 12 schematically depicts a fluid level detection sensor of the dispenser assembly of FIG. 10, in accordance with some example embodiments described herein;

FIG. 13 schematically depicts a perspective view of an example fluid dispenser assembly including a dispenser housing, in accordance with some example embodiments described herein;

FIG. 14 schematically depicts a perspective view of a cartridge positioned within the fluid dispenser of FIG. 13, in accordance with some example embodiments described herein;

FIG. 15 schematically depicts a front view of an example bag-type cartridge for use in a fluid dispenser, in accordance with some example embodiments described herein;

FIG. 16 schematically depicts a front view of an example fluid dispenser for use with a bag-type cartridge, in accordance with some example embodiments described herein;

FIG. 17 schematically depicts a front view of the example fluid dispenser of FIG. 16 with an installed cartridge, in accordance with some example embodiments described herein;

FIG. 18A schematically depicts a front view of an example fluid dispenser including a fluid level detection sensor, in accordance with some example embodiments described herein;

FIG. 18B schematically depicts a front view of another example fluid dispenser including fluid level detection sensors, in accordance with some example embodiments described herein;

FIG. 18C schematically depicts a front view of another example fluid dispenser including fluid level detection, in accordance with some example embodiments described herein;

FIG. 19 schematically depicts a perspective view of another example fluid dispenser, in accordance with some example embodiments described herein;

FIG. 20 illustrates a graphical representation of detected capacitance from fluid level sensors of the example fluid dispenser of FIG. 19, in accordance with some example embodiments described herein;

FIG. 21 illustrates a graphical representation of detected capacitance from fluid level sensors of the example fluid dispenser of FIG. 19, in accordance with some example embodiments described herein;

FIG. 22 schematically depicts an example fluid level detection sensor coupled to wires and a controller, in accordance with some example embodiments described herein;

FIG. 23 schematically depicts the example fluid level detection sensors of FIGS. 18B and 18C coupled to a multiplexer, in accordance with some example embodiments described herein;

FIG. 24 schematically depicts an example controller in communication with a motherboard, in accordance with some example embodiments described herein;

FIG. 25 schematically depicts an example controller, in accordance with some example embodiments described herein;

FIG. 26 schematically depicts a flowchart comprising operations or steps for operating a fluid dispenser according to one or more embodiments shown and described herein;

FIG. 27 schematically depicts a flowchart comprising operations or steps for operating a fluid dispenser according to one or more embodiments shown and described herein; and FIG. 28 schematically depicts a flowchart comprising operations or steps for operating a fluid dispenser according to one or more embodiments shown and described herein.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

Many modifications and other embodiments of the inventions set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the claims. Although specific terms are employed herein, they are used in a generic and descriptive sense only and not for purposes of limitation.

As used herein, the vertical direction (i.e., the +/−Z-direction as depicted) refers to the upward/downward direction of the dispenser assembly. The longitudinal direction (i.e., the +/−X-direction as depicted) refers to the forward/rearward direction of the dispenser assembly and is transverse to the vertical direction. The lateral direction (i.e., the +/−Y-direction as depicted) refers to the cross-wise direction of the dispenser assembly and is transverse to the vertical direction and the longitudinal direction.

Example Fluid Dispensers

Fluid dispensers and fluid dispenser assemblies are often used to provide skincare product, such as soap, hand sanitizer, and/or other fluids, liquids, or foams to a user. The skincare product may be used, for example, for hand washing and/or sanitizing. In general, a fluid, as referred to herein, may be a substance that has no fixed shape and yields easily to external pressure. For example, a fluid may be a substance that flows easily. Some non-limiting examples of fluids are liquid soap hand sanitizer, which may be dispensed as a liquid or converted to a foam by a foaming pump prior to dispensing.

Figure 1:
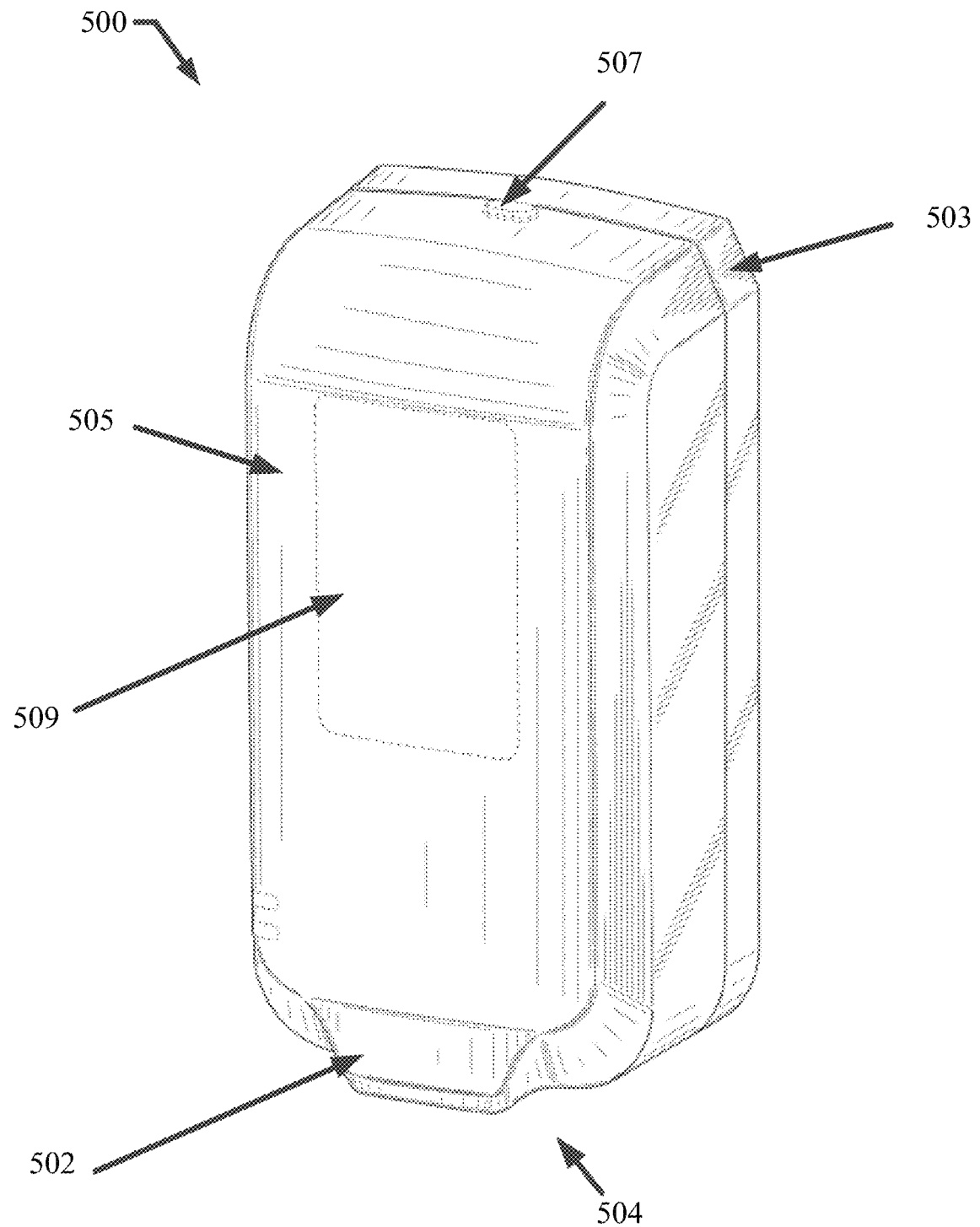
FIG. 1 shows a perspective view of an example fluid (e.g., skincare product) dispenser, in accordance with some example embodiments described herein.

FIG. 1 illustrates an example fluid dispenser 500 with a housing formed of a back portion 503 and cover 505. A user, such as a maintainer or maintenance person, may open the cover 505, such as be inserting a key or pressing a button (e.g., with respect to a latch 507). In general, the dispenser housing encloses the fluid reservoir such that only approved individuals may access the interior of the dispenser (including the fluid reservoir). For example, the cover 505 may form a hinged door or removable panel that may be secured to prevent unauthorized access to the interior of the dispenser. The cover 505 may be secured in a closed position with a key or other locking mechanism.

The dispenser also generally includes an activation mechanism. For example, the dispenser assembly may comprise a button, lever, motion sensor, and/or the like that a user may press or otherwise interact with to activate the dispenser assembly. For example, the user (e.g., consumer) may wave his or her hand in the vicinity of a motion detector (e.g., at 502) or may press a lever on the dispenser to cause the dispenser to provide fluid or foam to the user. When the dispenser is activated (e.g., when the button or lever is pressed or when the motion sensor detects a user's hand motion) a mechanism (e.g., gears, motor, etc.) within the dispenser assembly causes the pump to activate and dispense fluid from the reservoir. Thereafter, the dispensed portion of fluid may drip or fall from underneath the fluid dispenser 500 (such as at 504). In this regard, for automated fluid dispensers, a controller may sense the presence of the user (e.g., the user's hand) and cause a drive assembly to activate (e.g., via a motor) to cause a dispense to occur. Although the above described fluid dispenser 500 is automated, embodiments of the present invention may also be used with mechanical or non-automated fluid dispensers (e.g., a fluid dispenser that dispenses fluid in response to a user pushing on a paddle or lever—though other mechanisms are also contemplated).

The depicted embodiment shown in FIG. 1 also includes a window 509 that enables a user (e.g., a maintainer) to attempt to visually determine the remaining amount of fluid (e.g., skincare product) left in the cartridge. As noted above, such visual determinations are subjective and can lead to pre-mature replacement of the cartridge. For example, depending on how the cartridge collapses, the amount of fluid that is visible may be deceiving regarding the actual level of fluid remaining.

Figure 2:
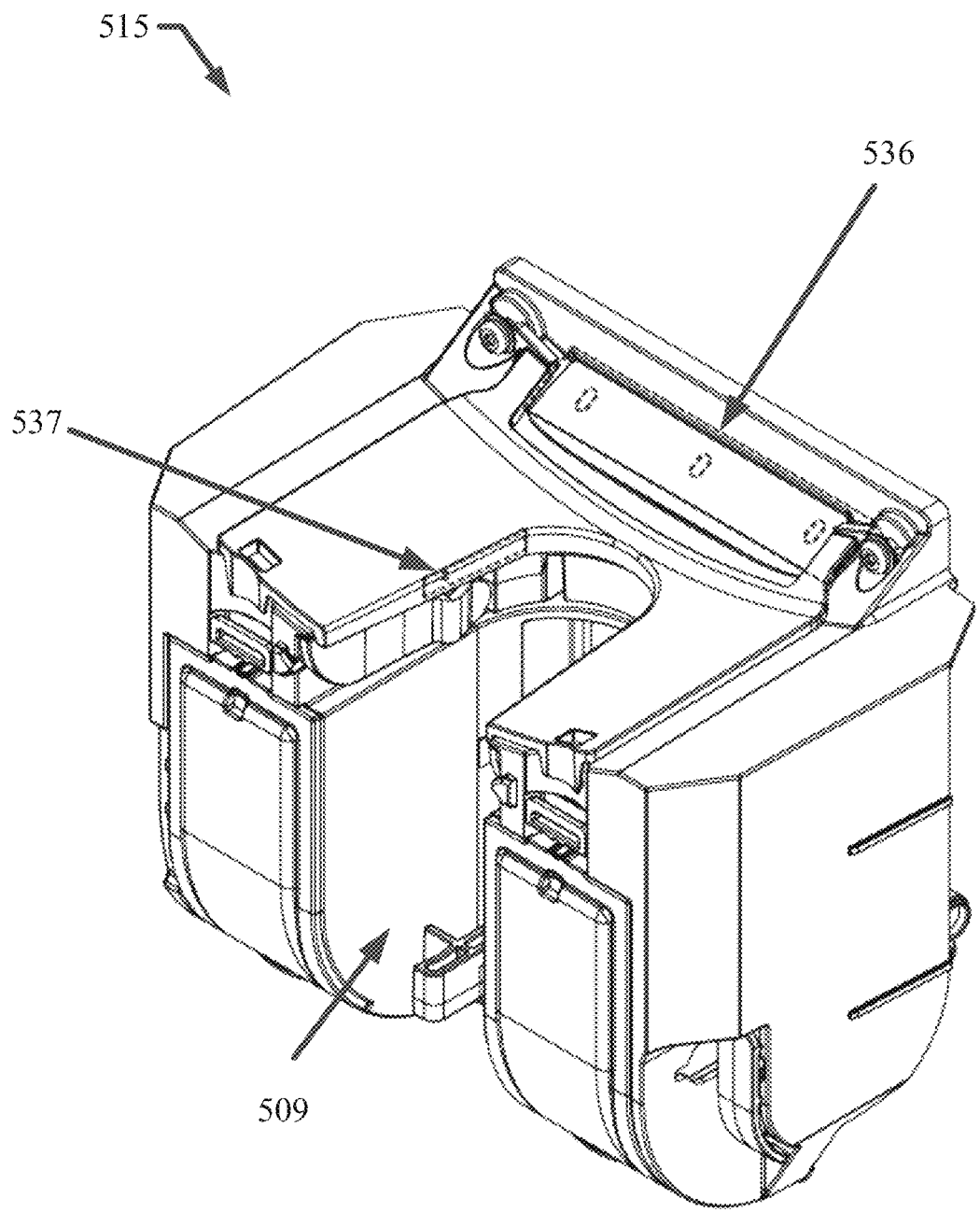
FIG. 2 shows a perspective view of an example drive assembly for a fluid dispenser, in accordance with some example embodiments described herein.
Figure 3:
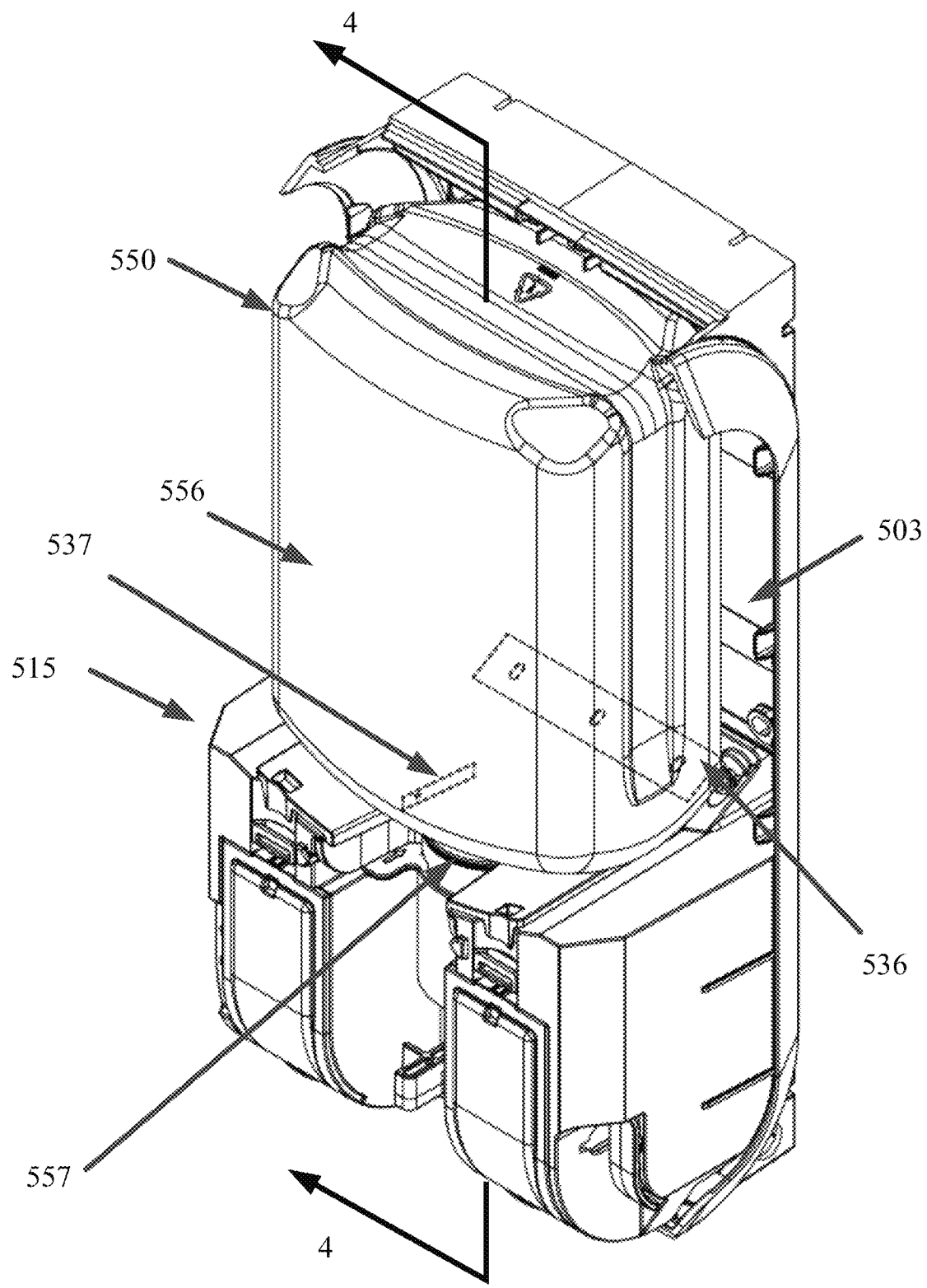
FIG. 3 shows a perspective view of an example cartridge installed in the drive assembly of FIG. 2 inside a fluid dispenser, in accordance with some example embodiments described herein.
Figure 4:
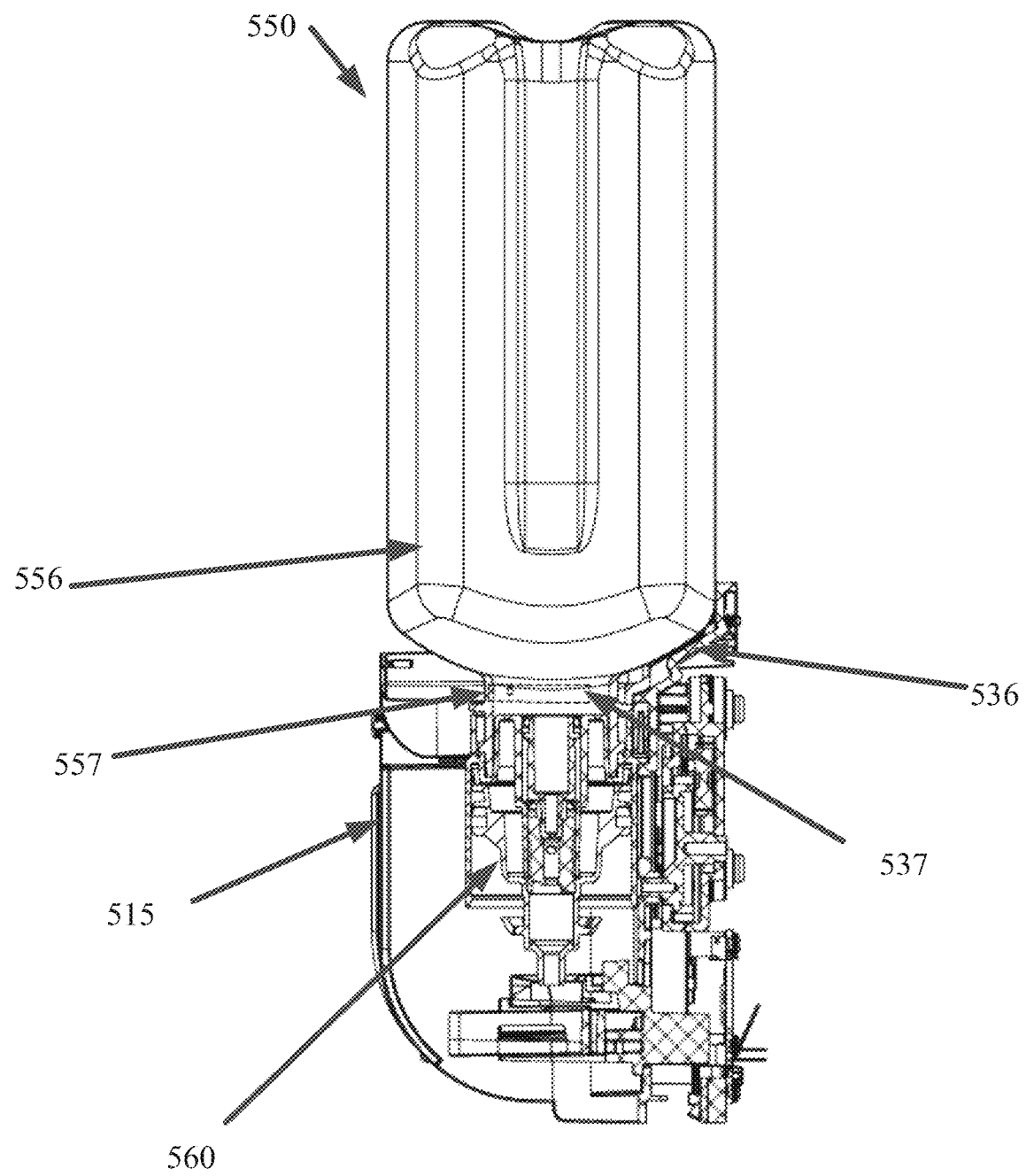
FIG. 4 shows a side section view taken along line 4-4 in FIG. 3, in accordance with some example embodiments described herein.

With reference to FIGS. 2-4, the fluid dispenser 500 may include a drive assembly 515 that is configured to receive and interact with a cartridge assembly that includes fluid reservoir 550 and nozzle assembly 560. The nozzle assembly (e.g., pump) is configured to receive fluid from the fluid reservoir and provide fluid or foam to the user. The pump may be connected to the fluid reservoir such that when the fluid reservoir is empty or the supply of fluid in the fluid reservoir is low, the entire cartridge assembly, including the fluid reservoir and the pump, may be removed from the housing of the dispenser and replaced. In some embodiments, including the pump and nozzle assembly with the reservoir may form a completely closed system that may provide the benefit of increased hygiene compliance (e.g., untwisting and opening of the reservoir may be avoided).

The drive assembly 515 may be positioned within the dispenser housing, such as attached to the back portion 503 and may define a slot 509 that is configured to receive and hold the cartridge assembly, such as shown in FIG. 3. Though not shown, the drive assembly 515 may include one or more components (e.g., a motor, gears, etc.) that enable operation of a pump of the nozzle assembly 560 to cause dispensing of a portion of the fluid from the reservoir 550. Notably, though not shown, as fluid is dispensed from the reservoir 550, the depicted reservoir 550 is configured to collapse (e.g., due to a vacuum seal). In the illustrated embodiment, the reservoir 550 is a collapsible bottle, but in other embodiments the reservoir 550 may be a bag. As noted above, collapsing of the reservoir 550 can be unpredictable, making determinations of product level therein difficult.

Further detail regarding operation of some example fluid dispensers can be found in U.S. Pat. No. 10,034,583, entitled "Dispenser With Stroke Adjustment Capabilities", issued Jul. 31, 2018, which is assigned to the assignee of the present invention and incorporated by reference herein in its entirety.

Though the above described and shown fluid dispenser 500 is an automated, wall mounted soap dispenser, embodiments of the present invention are contemplated for use with other types of dispensers. For example, FIG. 10 illustrates an under-counter mounted fluid dispenser. FIGS. 13-19 also illustrate other example fluid dispensers contemplated by various example embodiments herein.

Example Fluid Detection Sensor Systems

Some example embodiments of the present invention provide a fluid detection system for fluid dispensers. In some embodiments, the number of fluid detection sensors, their positioning, and the utilization of the corresponding sensor data provide a beneficial fluid level detection system that helps inform a maintainer of the proper time to replace the fluid within the fluid dispenser—thereby avoiding unnecessarily wasted fluid and time while still ensuring the dispenser does not run empty, enabling usage by consumers.

Notably, while some embodiments described herein do not measure the exact fluid level throughout the life of the reservoir, some such embodiments do determine when certain threshold fluid levels are reached. In this regard, it has been noticed that some threshold levels that correlate to low-to-empty product levels (e.g., low product level, end-of-life level, empty level, and the like) may be more desirable and useful to a maintainer than others—thereby enabling replacement of the reservoir. In this regard, some embodiments utilize fluid detection sensors positioned at certain locations with respect to the reservoir—particularly to enable detection of fluid levels corresponding to low-to-empty product levels remaining.

With reference to FIGS. 1-4, an example fluid dispenser 500 includes a drive assembly 515 (shown best in FIG. 2) that includes a first fluid detection sensor 536 and a second fluid detection sensor 537. As described herein, the fluid detection sensors may be any type of sensor capable of detecting fluid (or attributes corresponding to fluid). For example, the fluid detection sensor may be a capacitance sensor that is configured to emit an electrostatic field and form a capacitor when an object is positioned within the electrostatic field. However, in some embodiments, the fluid detection sensor may be any suitable non-contact sensor capable of determining the presence of and/or the level of fluid within the reservoir, such as a sonar sensor, an optical sensor, or the like.

In the depicted embodiment, the fluid detection sensors are single-plate capacitance sensors that measure the detected capacitance in the volume proximate the sensor (such as within the reservoir shown in FIGS. 3 and 4). FIG. 22 shows an example connection between a single-plate capacitance sensor (e.g., a fluid detection sensor 130) and a controller 300 (such as a controller of the fluid dispenser). The fluid detection sensor 130 is electrically coupled to a controller 300 through a first wired connection 140. The controller 300 may also include a second wired connection 142 that is not electrically coupled to the fluid detection sensor 130 (e.g., it may be free at a second end 146 such that it is not connected to any components of the dispenser 100). The controller 300 may detect a capacitance level in the fluid detection sensor 130 via the first wired connection 140—which may, for example, correspond to a capacitance level within a volume of the reservoir. Notably, the capacitance level detected in the second wired connection 142 may provide a reference capacitance that is indicative of a portion of the capacitance level that may be attributed to the first wired connection 140 as opposed to the fluid detection sensor 130. From that data, the controller may be configured to determine the capacitance level corresponding to a volume of the reservoir (e.g., where the fluid detection sensor is oriented).

In some embodiments, the single plate capacitance sensor may be formed from a copper plate or plate assembly, a printed circuit board, or other suitable material, and may be formed of a solid material, a lattice or mesh construction, or any other suitable construction.

In some embodiments, the single plate capacitance sensor may provide various advantages over other capacitance sensors, such as a two-plate capacitance sensor. For example, the single plate capacitance sensor may provide more range and a larger sensing field depth into the reservoir. The operating envelope may be maximized with a single plate capacitance sensor, which may be more beneficial. In some cases, the single-plate capacitance sensor is simpler from a cost and manufacturing perspective.

In some embodiments, potential disadvantages of an increased operating envelope (such as increased sensitivity to environmental factors and objects in close proximity) may be counteracted by using an electronic shield or guard ring that can be positioned around the single-plate capacitive sensor to focus the field to be sensitive in a more directional manner. In such embodiments, a more focused field can help minimize sensor influence outside of the target fluid being measured. In some embodiments, by minimizing the size of the operating envelope, the fluid detection sensor may detect a fluid level (or change in fluid level as described herein) within reservoirs having different shapes and/or sizes (e.g., the detected volume within the reservoir may be small enough to not need to account for different shapes and sizes).

Though the above described embodiment details a single-plate capacitance sensor, some embodiments of the present invention may utilize other capacitance sensors, such a double-plate capacitance sensors (e.g., with a separate transmitter and receiver).

As noted above, in some embodiments, the positioning of the fluid detection sensors may be important for enabling determination of various product level thresholds. In the depicted embodiment (such as shown in FIGS. 3 and 4), the first fluid detection sensor 536 is positioned on the housing proximate the main body portion 556 and near the bottom of the reservoir 550. The first fluid detection sensor 536 is oriented generally upwardly toward the interior of the reservoir 550. This position and orientation enables detection of the fluid until very low product levels, as the fluid level moves down the main body portion 557 of the reservoir 550 as fluid is drained from the reservoir 550 (such as due to dispensing). As shown, the first fluid detection sensor 536 may have an elongated surface area that corresponds to the width of the reservoir, thereby enabling increased coverage for detecting the fluid within the reservoir 550.

The second fluid detection sensor 537 is positioned on the housing proximate the nozzle portion 557 of the reservoir 550. The second fluid detection sensor 537 is oriented toward the nozzle portion 557. This position and orientation enables detection until and including an empty product level, as the fluid level moves down the nozzle portion 557 of the reservoir 550 as fluid is drained from the reservoir 550 (such as due to dispensing).

Figure 5A:
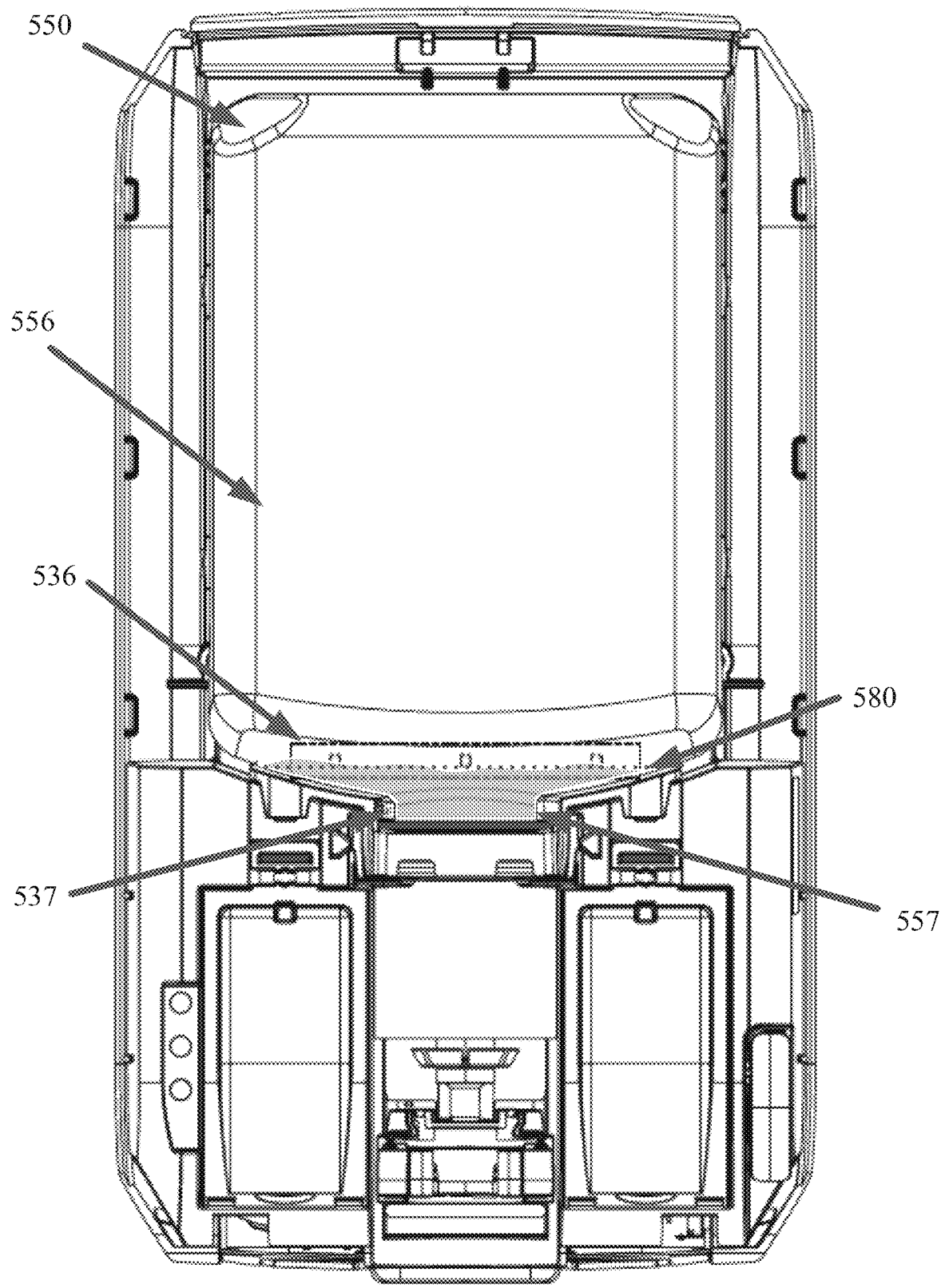
FIG. 5A illustrates an example low product level of fluid within the cartridge shown in FIG. 3, in accordance with some example embodiments described herein.
Figure 5B:
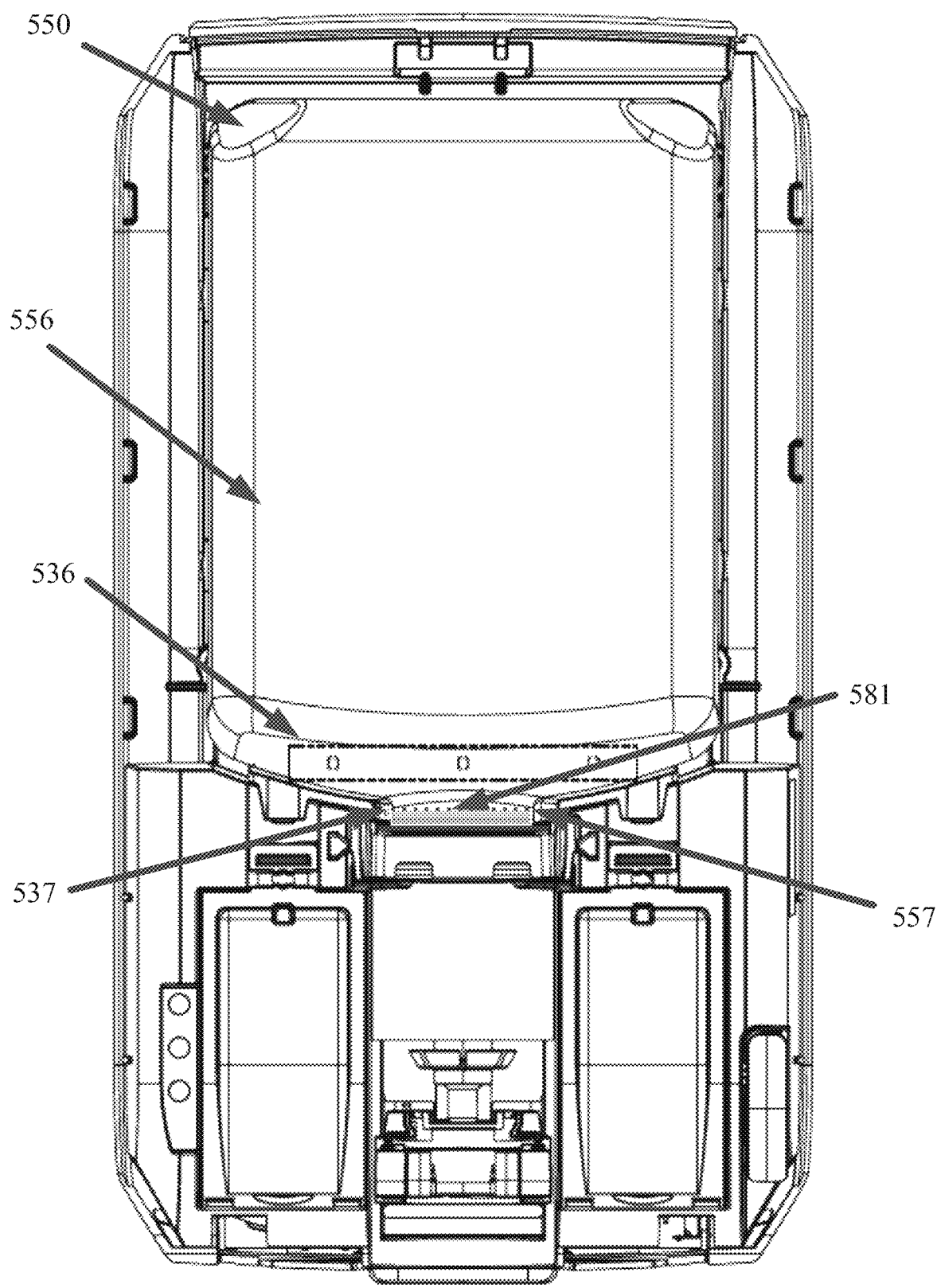
FIG. 5B illustrates an example end-of-life product level of fluid within the cartridge shown in FIG. 3, in accordance with some example embodiments described herein.
Figure 5C:
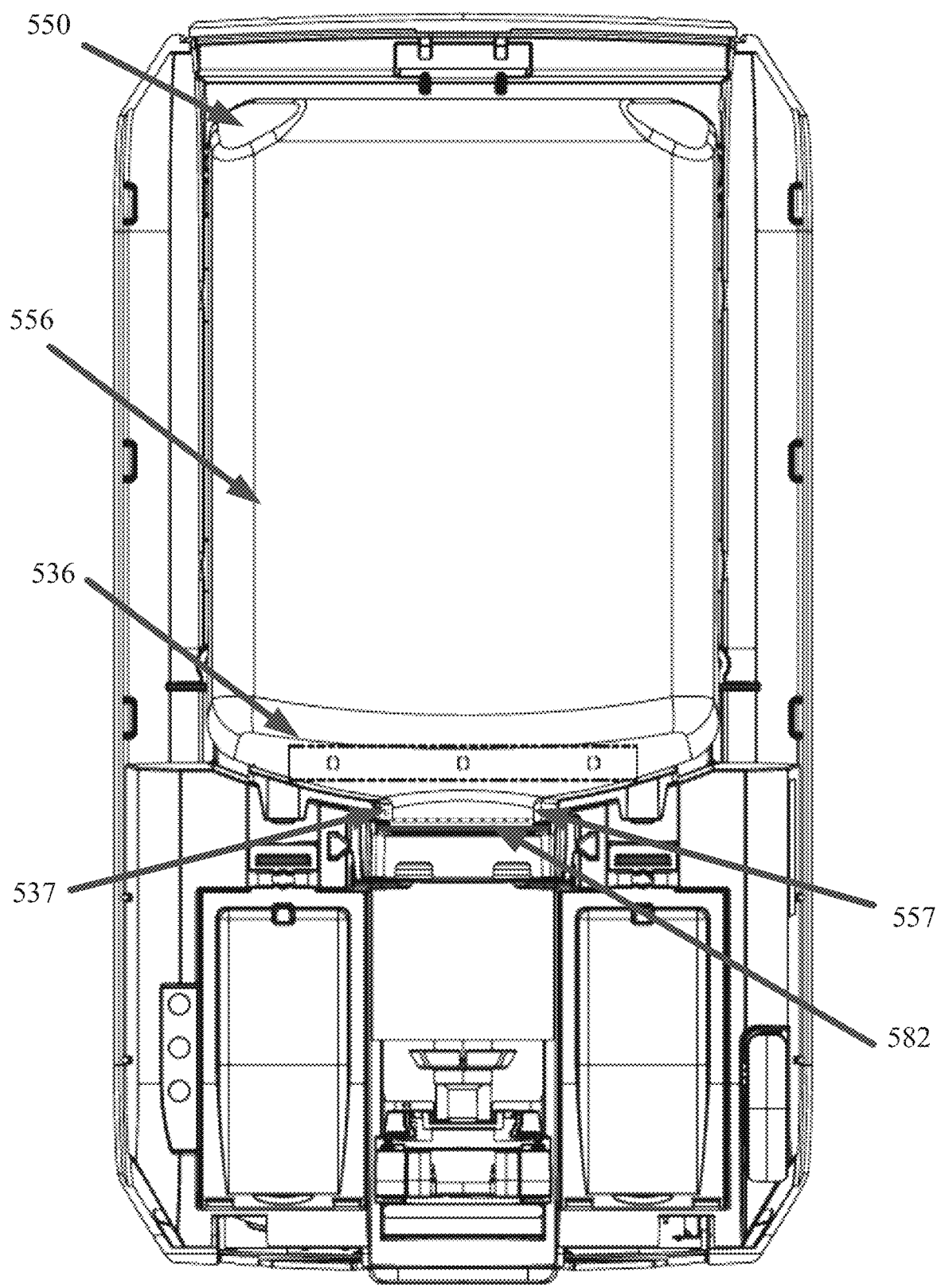
FIG. 5C illustrates an example empty product level of fluid within the cartridge shown in FIG. 3, in accordance with some example embodiments described herein.

FIGS. 5A-5C illustrate three different product levels within the reservoir 550 of the fluid dispenser 500. Notably, the three different product levels illustrate three different product level thresholds that the example fluid detection system (using the fluid detection sensors so positioned and oriented) is able to determine. Though the depicted embodiments of FIGS. 5A-5C do not show it, in some cases, the reservoir 550 may collapse as the fluid level within the reservoir decreases.

FIG. 5A illustrates an example fluid level 580 within a reservoir 550 that corresponds to when an example fluid detection system may determine that a "low product" level is reached, which, in some cases, may equate to about 2% of the product remaining within the reservoir. In the depicted embodiment, the first fluid detection sensor 536 (which is positioned relative to the main body portion 556), detects capacitance levels before and after a dispense. The fluid level 580 drops after the dispense and the example fluid detection system can determine that a "low product" threshold is met, such as through indication of a change in slope of the detected capacitance (such as described below with respect to FIG. 7). In the example depicted embodiment, the change in fluid level 580 may show a change in detected capacitance because the first fluid detection sensor 536 may be reading additional "air" within the reservoir 550 (instead of fluid—because the fluid level lowered with respect to the sensor face). In some embodiments, the second fluid detection sensor 537 may be reading similar detected capacitance before and after the dispense because the fluid level relative to its sensor face is the same.

FIG. 5B illustrates another example fluid level 581 within a reservoir 550 that corresponds to when an example fluid detection system may determine that an "end-of-life" level is reached, which, in some cases, may equate to about 10-20 dispenses of the product remaining within the reservoir. In the depicted embodiment, the second fluid detection sensor 537 (which is positioned relative to the nozzle portion 557), detects capacitance levels before and after a dispense. The fluid level 581 drops after the dispense and the example fluid detection system can determine that an "end-of-life" threshold is met, such as through indication of a change in slope of the detected capacitance (such as described below with respect to FIG. 7). In the example depicted embodiment, the change in fluid level 581 may show a change in detected capacitance because the second fluid detection sensor 537 may be reading additional "air" within the reservoir 550 (instead of fluid—because the fluid level lowered with respect to the sensor face).

FIG. 5C illustrates yet another example fluid level 582 within a reservoir 550 that corresponds to when an example fluid detection system may determine that an "empty" level is reached, which, in some cases, may equate to about zero dispenses of the product remaining within the reservoir. In the depicted embodiment, the second fluid detection sensor 537 (which is positioned relative to the nozzle portion 557), detects capacitance levels before and after a dispense. The fluid level 582 drops after the dispense and the example fluid detection system can determine that an "empty" threshold is met, such as through indication of a change in slope of the detected capacitance (such as described below with respect to FIG. 7). In the example depicted embodiment, the change in fluid level 582 may show a change in detected capacitance because the second fluid detection sensor 537 may be reading additional "air" within the reservoir 550 (instead of fluid—because the fluid level lowered with respect to the sensor face).

As indicated herein, in some example embodiments, the fluid detection system may be configured to, such as through a controller (e.g., the fluid dispenser controller 300 or a remote computing device, such as management computing server 400), cause performance of an action (e.g., a threshold operation) in response to determining the occurrence of the fluid level in the reservoir reaching a threshold level. Depending on the various configurations and desired operations, many different types of actions/operations may be performed. For example, an indication of a notification/alert may occur on the fluid dispenser 500, such as through a user interface (e.g., illumination of a low product LED, an audible alert, among many other forms). Additionally or alternatively, a notification (or other information) may be sent remotely, such as directly to the maintainer. For example, a text message may be sent to a mobile device of the maintainer that provides instructions to replace the reservoir (or cartridge) within the dispenser. Likewise, additional or different information could be sent to the maintainer, such as indicating that there is "Low Product Level in Dispenser No. A-FLOOR35". In some embodiments, data corresponding to the readings could be sent to a remote computing device, such as for further processing and/or data storage. In such an example, additional information may also be sent, such as the number of dispenses counted in the dispenser since the cartridge was replaced. In some embodiments, the system may perform automatic functions, such as ordering replacement cartridges, scheduling a maintenance visit by the maintainer, etc. In some embodiments, an operating parameter of the fluid dispenser may be modified, such as to prolong the life of the fluid within the dispenser. For example, a delay time between enabling dispenses may be increased, such as to deter unnecessary double dispensing. As another example, the shot size of the dispensed product may be decreased, such as in an effort to increase the number of overall dispenses remaining. As a further example, operation of the dispenser may be turned off altogether. In some cases, determination of what and how to modify an operating parameter may be based on a maintenance schedule and/or an anticipated number of users leading up to an anticipated maintenance occurrence.

Some embodiments of the present invention determine a "change" in product level (e.g., as opposed to an exact product level reading) to help determine when a threshold product level is met. In this regard, various factors throughout the usage of a fluid dispenser reservoir may cause exact product level detection to be difficult. For example, as noted herein, when utilizing a collapsible bottle or bag, the way in which collapsing occurs through usage of the fluid can vary. Thus, measurements of exact fluid level may be difficult because, for example, fluid could be "hiding" in pockets of the collapsed bottle or bag.

Additionally, in some cases, fluid viscosity may impact the settling time and equalization of the fluid level within the reservoir, thereby making an accurate fluid level measurement difficult. For example, fluid may cling to the sides of the reservoir, such as may occur as the result of the occurrence of a dispense. For example, pump actuation may cause fluid to rise and fall within the reservoir and during that time, some fluid residue may remain on the wall of the reservoir. That fluid may then be unaccounted for during a measurement, as it may take too long to settle and return to the remaining fluid within the reservoir.

Figure 6:
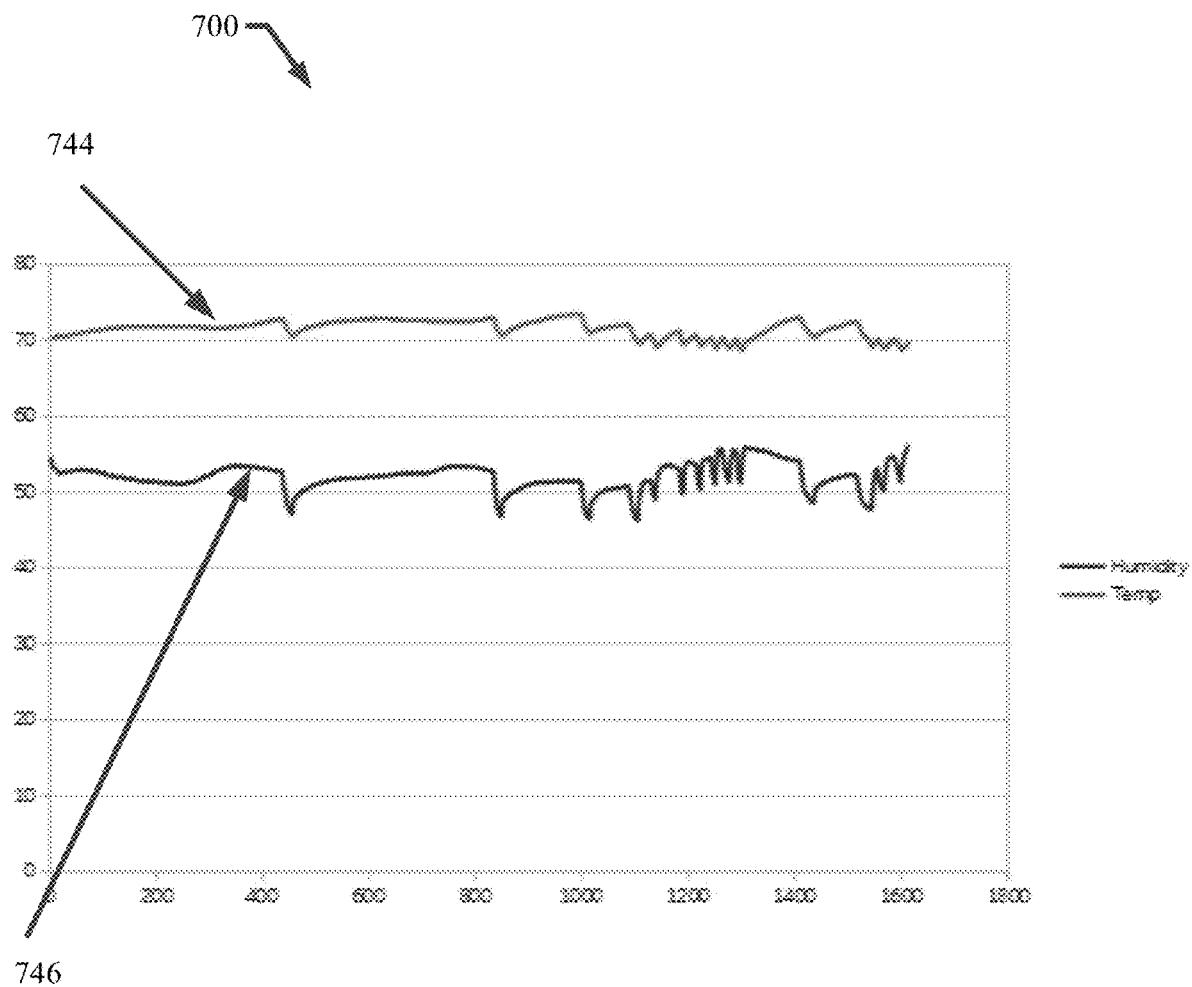
FIG. 6 illustrates an example graph of measured humidity and temperature during a life cycle of a cartridge within a fluid dispenser, in accordance with some example embodiments described herein.

Additionally, it has been noticed that humidity and temperature fluctuations have an effect on the predictability of detected capacitance (which would otherwise be used to determine the product level). FIG. 6 shows a graph 700 that illustrates the fluctuations in temperature 744 and humidity 746 over time within the dispenser—which make it difficult to maintain accuracy with respect to determining the exact product level within the dispenser when detecting capacitance.

In view of the above difficulties, some embodiments of the present invention seek to monitor (or look for) certain changes in slope of the detected capacitance—particularly, for example, before and after a dispense from the fluid dispenser. In this regard, it has been noticed that certain changes in slope of the detected capacitance are indicative of key product level thresholds. Further, by looking for specific slope changes, other noise can be easily filtered out, providing for a reliable and easily implemented algorithm for determining that a product level threshold is met.

Figure 7:
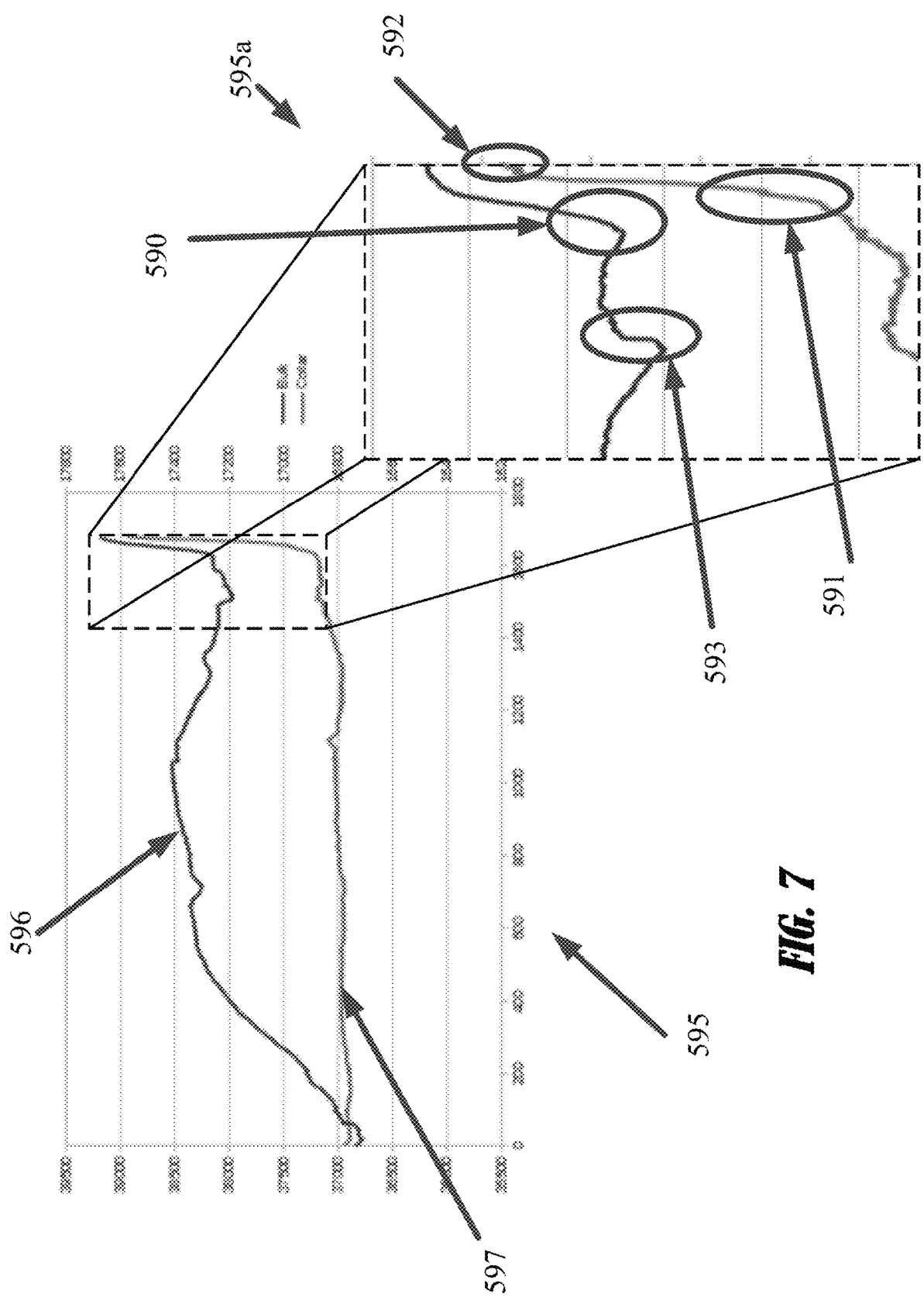
FIG. 7 illustrates an example graph of the measured capacitance level of two fluid detection sensors positioned within the dispenser shown in FIG. 3, wherein a portion of the graph is zoomed in on, in accordance with some example embodiments described herein.

As an example, FIG. 7 shows a graph 595 that illustrates the detected change (e.g., slope) of the capacitance level within the reservoir before and after each dispense throughout the product level life of a reservoir using the main body portion fluid detection sensor 536 (line 596) and the nozzle portion fluid detection sensor 537 (line 597) shown in FIGS. 5A-5C. Notably, the "x" axis of the graph 595 corresponds to the occurrence of a dispense (e.g., the "$1400^{th}$" dispense) and the "y" axis corresponds to the detected capacitance level taken after a dispense (e.g., a post-dispense measurement capacitance level, whereas the measurement prior to the dispense may be referred to as a pre-dispense measurement capacitance level).

In some embodiments, a number of consecutive "changes (slopes) of capacitance level before and after a dispense" may be looked at to determine if a significant enough change of slope (e.g., a change of the changes in capacitance level) has occurred—which may thereby indicate that the fluid level within the reservoir has reached a threshold fluid level. In some embodiments, a certain number of consecutive dispenses (e.g., 5 dispenses, 10 dispenses, etc.) may be considered before determining that a product level threshold is reached. In some embodiments, the direction of the change in the slope may be considered. For example, certain product level thresholds may correspond to an increasing change in slope (e.g., the example low product level threshold and the example end-of-life product level threshold), whereas other product level thresholds may correspond to a decreasing change in slope (e.g., the example empty product level threshold).

To explain, it has been noticed that, in some embodiments, there is a correlation between a prolonged changing in the slope of the capacitance level before and after a dispense and the fluid level in the reservoir reaching various desirable product level thresholds (such as some low-to-empty product levels as described herein). Such a prolonged change in slope can be visualized by sharp changes in the lines 596 and 597 of the graph 595, which shows the dispense vs. the capacitance level after the dispense. Notably, the graph 595 illustrates a sharp change in slope represented between post-dispense measurement capacitance levels. In some embodiments, such a calculation could be used in determining whether a product level threshold has been reached. Additionally or alternatively, in some embodiments, a change among multiple changes in capacitance level across a dispense (e.g., from before the dispense to after the dispense) may be used to determine whether a product level threshold has been reached. In this regard, the depicted graph 595 may, in some cases, just illustrate a relationship between a distinguishable slope change and a product level threshold. Further, additional factors (such as described herein) may be utilized in determination of the product level threshold being reached.

As shown in the zoomed-in portion 595a of the graph, a first sharp change in slope of the detected capacitance level at the main body portion fluid detection sensor 536 can be seen around 590. That sharp change is easily detectable and corresponds to a product level threshold of "low product", which, in some cases, may equate to about 2% of the product remaining within the reservoir. Likewise, a first sharp change in slope (second overall) of the detected capacitance level at the nozzle portion fluid detection sensor 537 can be seen around 591. That sharp change is also easily detectable and corresponds to a product level threshold of "end-of-life", which, in some cases, may equate to about 10-20 dispenses of the product remaining within the reservoir. Finally, a second sharp change (in the negative) in slope (third overall) of the detected capacitance level at the nozzle portion fluid detection sensor 537 can be seen around 592. That sharp change is also easily detectable and corresponds to a product level threshold of "empty", which, in some cases, may equate to about zero dispenses of the product remaining within the reservoir. Though the above example describes specific thresholds that correspond to predetermined changes in slope of the detected capacitance level after a dispense, the overall concept of monitoring for changes in slope of the detected capacitance level related to a dispense (and/or a detected change in capacitance level before and after a dispense) while utilizing knowledge of the position of the fluid detection sensors with respect to the reservoir can be used to help identify many different product level thresholds in many different types of fluid dispensers (such as described herein).

In some embodiments, the controller (e.g., controller 300) may be configured to filter out changes in the slope lines that do not correspond to desired product threshold levels. For example, with reference to FIG. 7, example signal noise can be seen at 593. In some cases, the collapsible reservoir (such as a collapsible bottle) may "pop", such as to due to the vacuum causing the reservoir to deform suddenly. Such example deformation "pops" may cause a very high slope change (such as shown at 593). Notably, however, some such changes in the slope occur over a short duration of time, which can generally be characterized and filtered out as signal noise—thereby increasing the accuracy of detecting product level thresholds. For example, as noted above, in some embodiments, the change in slope may need to be maintained (e.g., in each corresponding dispense, overall as an average, or otherwise) over a number of dispenses in order to determine that the fluid level within the reservoir has reached a threshold.

Along these lines, in some embodiments, other factors may be determined and/or considered in order to make a determination that the fluid level within the reservoir has reached a threshold level. For example, in some embodiments (in addition to or in the alternative to the detected changes in slope), the value of a specific detected capacitance level (or change in capacitance level before and after a dispense) may be considered for determining if a threshold product level has been reached. As an example, looking at the graph 595, a detected capacitance level reading of 17,000 or above for the nozzle portion fluid detection sensor 537 may be determined to correlate to an end-of-life product threshold level. In some embodiments, a detected capacitance level may be compared to a running baseline capacitance level to determine when a product level threshold has been reached. In some embodiments, the rate at which the slope changes may be used to determine when a product level threshold has been reached. As noted above, such example factors (and others) may be used alone or in various combinations to determine when a product level threshold is met. In this regard, in some embodiments, by utilizing multiple factors, accuracy of product level thresholds increases, such as by removing or not considering signal noise created by various factors (e.g., reservoir deformation, liquid viscosity, other environmental factors, etc.)

In some embodiments, the timing of when to measure the detected capacitance using the fluid detection sensors may be important. In this regard, in some cases, it has been observed that measuring the detected capacitance too soon after a dispense may lead to inaccurate readings. To explain, in some embodiments with reservoirs that collapse, a film within the fluid is often created right after a dispense occurs. In such a circumstance, a detected capacitance may be altered by a reading of the film. Further, if the reading occurs too long after a dispense, environmental factors, such as humidity and temperature, may cause the reading to be inaccurate. Thus, there is an ideal time window after a dispense occurs to measure the detected capacitance. Some embodiments of the present invention seek to utilize that ideal time window. For example, the time window may be between 90 seconds and 120 seconds for various reservoirs.

In some embodiments, the amount of fluid remaining in the reservoir and/or the shape of the reservoir may affect the ideal time window. Further, the desire for a more accurate reading may be weighed against the overall delay in waiting after a dispense. For example, an exact measurement may be less important before the fluid level as reached the end-of-life threshold and so a shorter delay after a dispense can be used (as the measurement impact of filming may be much less when larger amounts of liquid material are present). On the other hand, after the fluid level has reached or surpassed the end-of-life threshold, a more exact measurement may be more desirable and, thus, it may be beneficial to wait a little extra time to let the fluid settle. As an example, taking a measurement around 90 seconds after a dispense may be ideal for when the overall fluid level is above an end-of-life threshold fluid level (such as described herein), whereas taking a measurement around 120 seconds after a dispense may be ideal for when the overall fluid level is below the end-of-life threshold fluid level.

In some embodiments, the fluid detection sensor(s) may be configured to continually monitor and/or measure the capacitance level within the reservoir. However, the fluid dispenser (such as through the controller 300) may be configured to select a measurement corresponding to a specific time before and after a dispense. Thereafter, the controller may determine the change in detected capacitance level before and after a dispense, such as used with various embodiments described herein.

Figure 8:
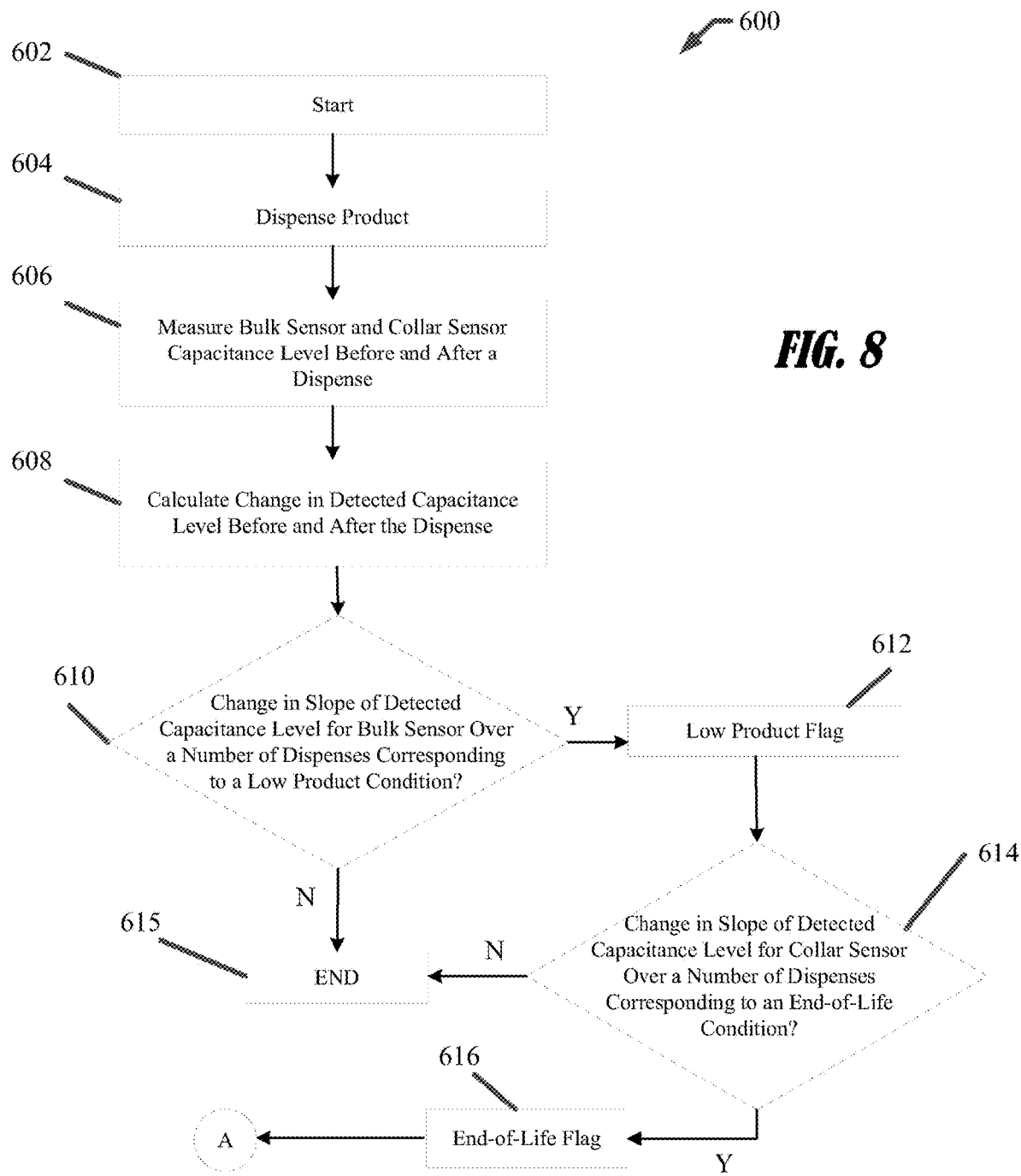
FIGS. 8-9 illustrate an example flowchart for example methods for determining various product level thresholds within a fluid dispenser, in accordance with some example embodiments described herein.
Figure 9:
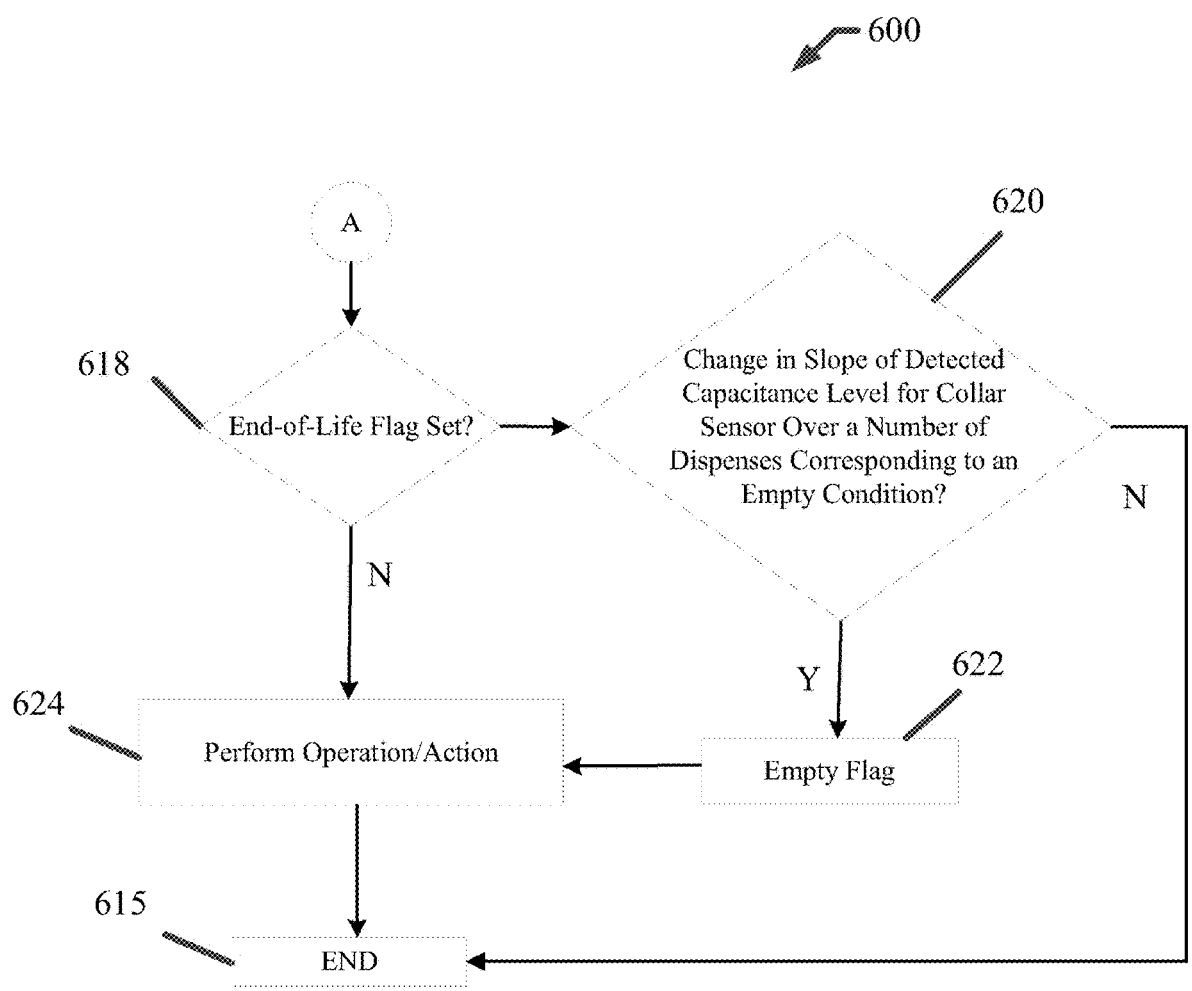

FIGS. 8-9 illustrate an example flowchart for an example method 600 for determining various product level thresholds within a fluid dispenser, such as the example embodiments described above with respect to fluid dispenser 500. The operations illustrated in and described with respect to FIGS. 8-9 may, for example, be performed by, with the assistance of, and/or under the control of one or more of the fluid dispenser 500, 100; fluid detection sensors 130, 131, 536, 537; controller 300; management computing server 400; and/or various other components of various embodiments described herein.

The operation flow begins at operation 602. At operation 604, the method comprises dispensing the product from the fluid dispenser (e.g., soap or sanitizer in the form of a gel, liquid, or foam etc.). Operation 606 comprises measuring the capacitance level at the fluid detection sensors before and after a dispense (e.g., the example "Bulk Sensor" may refer to the first fluid detection sensor 536 and the example "Collar Sensor" may refer to the second fluid detection sensor 537). At operation 608, the change in detected capacitance level before and after a dispense is calculated for the fluid detection sensors.

At operation 610, it is determined whether, over a number of consecutive dispenses, the change in the slope of the change in detected capacitance level before and after a dispense from the first detection sensor (e.g., "Bulk Sensor") corresponds to a low product threshold condition. For example, as described above with respect to FIGS. 5A and 7, the change in detected capacitance level across a dispense (e.g., from before the dispense to after the dispense) may change over a number of consecutive dispenses—thereby forming a sharp change in the line 596 (such as at 590). Such a condition may correspond to a condition that signifies that the fluid level within the reservoir is at or below a first "low product" threshold level. If the change in slope of detected capacitance level over a number of dispenses corresponds to a "low product" level condition, then a "Low Product" flag is set at operation 612. Depending on the configuration of the system, an operation/action (such as one or more of the various threshold operations described above) may be performed (such as at operation 624 in FIG. 9). If, however, the change in slope of the detected capacitance level over a number of dispenses does not correspond to a low product condition, then the operation may end at 615.

In some embodiments, after a low product flag is set, the method may move to operation 614. At operation 614, it is determined whether, over a number of consecutive dispenses, the change in the slope of the change in detected capacitance level before and after a dispense from the second detection sensor (e.g., "Collar Sensor") corresponds to an end-of-life threshold condition. For example, as described above with respect to FIGS. 5B and 7, the change in detected capacitance level across a dispense (e.g., from before the dispense to after the dispense) may change over a number of consecutive dispenses—thereby forming a sharp change in the line 597 (such as at 591). Such a condition may correspond to a condition that signifies that the fluid level within the reservoir is at or below a second "end-of-life" threshold level. If the change in slope of detected capacitance level over a number of dispenses corresponds to an "end-of-life" level condition, then an "End-of-Life" flag is set at operation 616. Depending on the configuration of the system, an operation/action (such as one or more of the various threshold operations described above) may be performed (such as at operation 624 in FIG. 9). If, however, the change in slope of the detected capacitance level over a number of dispenses does not correspond to an end-of-life condition, then the operation may end at 615.

Moving to FIG. 9, in some embodiments, the method may check if the End-of-Life Flag is set at operation 618. If it is set, than the method may proceed to operation 620. At operation 620, it is determined whether, over a number of consecutive dispenses, the change in the slope of the change in detected capacitance level before and after a dispense from the second detection sensor (e.g., "Collar Sensor") corresponds to an empty threshold condition. For example, as described above with respect to FIGS. 5C and 7, the change in detected capacitance level across a dispense (e.g., from before the dispense to after the dispense) may change over a number of consecutive dispenses—thereby forming a sharp change in the line 597 (such as at 592). Such a condition may correspond to a condition that signifies that the fluid level within the reservoir is at or below a third "empty" threshold level. If the change in slope of detected capacitance level over a number of dispenses corresponds to an "empty" level condition, then an "Empty" flag is set at operation 622. Depending on the configuration of the system, an operation/action (such as one or more of the various threshold operations described above) may be performed (such as at operation 624 in FIG. 9). If, however, the change in slope of the detected capacitance level over a number of dispenses does not correspond to an empty condition, then the operation may end at 615.

While the above described method includes various operations that are linked in order, in some embodiments, some of the product level checks (e.g., operations 610, 614, and/or 620) may be performed out of order and/or independently of the others. In this regard, the example flowchart is provided for explaining an example method for determining product level thresholds. Along these lines, in some embodiments, the method may not end after determining that a certain product threshold is not met. For example, after determining that a low product condition is not met at operation 610, the method may continue to operation 614 instead of ending at operation 615. Such example embodiments may account for if a product level threshold condition determination was accidentally missed (such as may have occurred due to deformation of the reservoir or other factors).

Example Under-Counter Mounted Fluid Dispenser and Fluid Detection Sensor Systems FIGS. 10-12 illustrate other example fluid dispensers for use with various embodiments of the present invention. In particular, the example fluid dispensers shown in FIGS. 10-11 are under-counter mounted soap dispensers. With reference to FIGS. 10-11, a rear perspective view and a rear view of additional example embodiments of a dispenser 100 are depicted, respectively. Similar to the embodiment described above, the dispenser 100 includes a dispenser housing 102 that is shaped to accept a nozzle assembly of a cartridge 200. However, in the embodiment depicted in FIGS. 10 and 11, the cartridge 200 is positioned below the dispenser housing 102. In such configurations, the cartridge 200 and the dispenser housing 102 may be positioned below a countertop, while a spout 170 of the dispenser 100 is positioned above the countertop.

Similar to the embodiment described above, the embodiment shown in FIG. 10 includes a fluid detection sensor 132 that is coupled to the dispenser housing 102. The depicted fluid detection sensor 132 includes a single-plate capacitive sensor. In the embodiment depicted in FIG. 10, the fluid detection sensor 132 is positioned above the cartridge 200. In addition, the nozzle assembly of the cartridge 200 is also positioned above the reservoir 220. As noted above, while reservoirs 220 of different cartridges 200 may have different heights/sizes, the position of the nozzle assembly with respect to the dispenser housing 102 may be relatively constant. In this way, by positioning the fluid detection sensor 132 above the reservoir 220 when the nozzle assembly is likewise above the reservoir 220, the fluid level detection sensor 132 may maintain alignment with the reservoir 220 regardless of the overall height/size of the reservoir 220. In some embodiments, positioning the fluid level detection sensor 132 above the reservoir 220 may help maintain accuracy when measuring a capacitance level (or a change in capacitance level) corresponding to a low product level.

In the depicted embodiment of FIG. 10, the fluid detection sensor 132 may be a single-plate capacitance sensor, such as described above. However, in some embodiments, other types of sensors may be utilized (such as described above).

When the cartridge 200 is positioned within the dispenser 100, the reservoir 220 of the cartridge 200 is positioned such that the fluid detection sensor 132 is positioned proximate to and above the reservoir 220. In some configurations, the fluid detection sensor 132 contacts the reservoir 220 when the cartridge 200 is positioned within the dispenser assembly 100. In other configurations, the fluid detection sensor 132 may be spaced apart from the reservoir 220, and the reservoir 220 may be positioned within the electrostatic field emitted by the fluid detection sensor 132. For example, in embodiments where the fluid detection sensor 132 is a capacitive sensor, a voltage may be applied to the fluid detection sensor 132, such that the fluid detection sensor 132 emits an electrostatic field with the reservoir 220 being positioned within the electrostatic field. In the embodiment depicted in FIG. 10, the fluid detection sensor 132 is positioned above the cartridge 200, and the fluid detection sensor 132 may emit an electrostatic field downward toward the cartridge 200. Alternatively, in some embodiments, the fluid detection sensor 132 may include any suitable non-contact sensor capable of determining the presence of and/or the level of fluid within the reservoir 220, such as a sonar sensor, an optical sensor, or the like.

In some embodiments, the various example methods of determining product levels described above may be utilized with the fluid detection sensor 132. For example, the fluid detection sensor 132 may determine a change in capacitance level of the reservoir 220 before and after a dispense. Therefrom, the changes in slope of the change in capacitance level across consecutive dispenses can be used to determine one or more product level thresholds (such as described above with respect to FIG. 7).

In embodiments where the fluid detection sensor 132 is a capacitive sensor (e.g., a single-plate capacitance sensor), capacitance across the capacitive sensor may change depending on the dielectric constant of materials positioned within the electrostatic field. Without being bound by theory, air has a relatively low dielectric constant as compared to the dielectric constant of water and the dielectric constant of alcohol. Accordingly, air has a relatively low dielectric constant as compared to the dielectric constant of most water-based and alcohol-based liquids and gels. As such, when a fluid, such as a liquid or gel positioned within the reservoir 220, is positioned within the electrostatic field of the fluid detection sensor 132, the fluid detection sensor 132 may detect a capacitance that is different than when liquid or gel is not positioned within the electrostatic field (i.e., when air is positioned within the electrostatic field). By detecting whether liquid or gel is positioned within the electrostatic field, the fluid detection sensor 132 may detect when the fluid within the reservoir 220 of the cartridge 200 is below a predetermined threshold (or when a change in the fluid level indicates a predetermined threshold, such as described above). Additionally, air may have a relatively low dielectric constant as compared to the dielectric constant of the materials used to form the reservoir 220, which may include plastics, composites, or the like. Accordingly, when a reservoir 220 (whether empty or full of fluid) is positioned within the dispenser housing 102, the fluid detection sensor 132 may detect a capacitance that is different than when no reservoir is positioned within the dispenser housing 102. In this way, the fluid detection sensor 132 may also detect the presence of a reservoir 220 within the dispenser 100.

Furthermore, a human hand may have a relatively high dielectric constant as compared to air. Accordingly, when a user's hand is positioned within the dispenser 100, such as when a maintainer is replacing the cartridge 200, the fluid detection sensor 132 may detect a capacitance that is different than when the maintainer's hand is positioned outside of the dispenser. In this way, the fluid detection sensor 132 may also detect the presence of a maintainer's hand, which may be indicative of a service event such as a user replacing the cartridge 200.

As is consistent with above described embodiments, in some configurations, the capacitive sensor of the fluid detection sensor 132 may detect changes in volume of the fluid within the reservoir 220. Specifically, as the volume of fluid within the reservoir 220 decreases, the level of fluid within the reservoir may move downward within the reservoir 220 such that a distance between the fluid and the fluid detection sensor 132 increases. As the distance between the fluid detection sensor 132 and the fluid within the reservoir 220 increases, the capacitance detected by the fluid detection sensor 132 may change. In this way, the fluid detection sensor 132 may detect incremental changes in volume of the fluid within the reservoir 220.

Referring to FIG. 11, in some embodiments, the dispenser 100 may optionally include a second fluid detection sensor 134 coupled to the dispenser housing 102 and extending along the reservoir 220 in the vertical direction, and a third fluid detection sensor 136 coupled to the dispenser housing 102 and positioned beneath the reservoir 220 in the vertical direction Similar to the dispenser assembly 100 described herein with respect to FIG. 19, the first fluid detection sensor 132, the second fluid detection sensor 134, and the third fluid detection sensor 136 depicted in FIG. 11 may detect the movement of the reservoir 220 and a level of fluid within the reservoir 220 in multiple directions. As described above, the first fluid detection sensor 132 may detect downward movement of the fluid within the reservoir 220 as the fluid within the reservoir moves downward and away from the first fluid level detection sensor 132. In some embodiments, additional sensors may be positioned relative to the reservoir, such as along an opposite side of the reservoir from the sensor 134. In some embodiments, the sensor 134 may extend some portion around the circumferential surface of the cylindrical reservoir 220. In some of the above described embodiments, the various sensors may not be dependent on each other, and may, in various embodiments, be used exclusively or in additive combination. In some embodiments, each sensor may add a unique piece of information or data that may enable additional measurements/determinations.

The second fluid detection sensor 134 is oriented to face laterally and/or longitudinally inward into the reservoir 220 (or radially inward in configurations in which the reservoir 220 is cylindrical) and extends along the reservoir 220 in the vertical direction. The second fluid detection sensor 134 may partially wrap around a perimeter of the reservoir 220. The second fluid detection sensor 134 may detect changes in the level of fluid within the reservoir 220 as the fluid moves downward within the reservoir 220, and accordingly downward along the second fluid detection sensor 134. For example, the detected capacitance level within the reservoir 220 may change, indicating a change in the ratio of air versus fluid in the reservoir. Additionally, various embodiments, such as those described above may be utilized to detect changes in the detected capacitance level before and after a dispense. The second fluid detection sensor 134 may also detect movement of the reservoir 220 in the lateral and/or the longitudinal directions (i.e., movement toward or away from the second fluid detection sensor 134), and may generally detect the presence of the reservoir 220 within the dispenser 100.

The third fluid detection sensor 136 is positioned beneath the reservoir 220 in the vertical direction, and may detect the fluid level (and/or change thereof) within the reservoir 220 (e.g., the capacitance level may change as product is dispensed from the reservoir—even if some fluid still remains directly above the sensor 136—such as due to the size of the operating envelope of the sensor 136). In some embodiments, the fluid detection sensor 136 may detect the presence of a reservoir 220 within the dispenser housing 100. The third fluid detection sensor 136 may additionally detect vertical movement of the reservoir 220 with respect to the dispenser 100 (i.e., movement toward or away from the third fluid detection sensor in the vertical direction). As described herein, by utilizing multiple fluid detection sensors, changes in capacitance detected by the fluid detection sensors that may be attributed to changes in the level of fluid level of the reservoir 220 may be distinguished from changes in capacitance that may be attributed to movement and/or collapse of the reservoir 220.

Referring to FIG. 12, the first fluid detection sensor 132, the second fluid detection sensor 134, and the third fluid detection sensor 136 of FIG. 11 are depicted in isolation. The first fluid detection sensor 132 and the third fluid detection sensor 136 may include single-plate capacitive sensors, and may be formed from a copper plate or plate assembly, a printed circuit board, or other suitable material, and may be formed of a solid material, a lattice or mesh construction, or any other suitable construction. Alternatively, the first fluid detection sensor 132 and the third fluid detection sensor 136 may include any suitable capacitive sensor or non-contact sensor, such as a sonar sensor, an optical sensor, or the like.

In embodiments, the second fluid detection sensor 134 may include a "finger" type capacitive sensor including a signal component 190 and a ground component 192 that extend in the vertical direction along the second fluid detection sensor 134. The signal component 190 and the ground component 192 may cooperate to detect a capacitance within a field emitted by the second fluid detection sensor 134. Alternatively, the second fluid detection sensor 134 may include a single-plate capacitive sensor, or any other suitable capacitive or non-contact sensor, such as a sonar sensor, an optical sensor, or the like.

Additional Example Fluid Detection Sensor Systems

FIGS. 13 and 14 illustrate example portions of another example fluid dispenser according to some embodiments of the present invention. FIG. 13 shows a perspective view of a dispenser 100 and FIG. 14 shows a perspective view of a cartridge 200 positioned within the dispenser 100. The dispenser 100 includes a dispenser housing 102 and may include a door coupled to the dispenser housing 102. The door may be selectively opened and closed to provide access to the inside of the dispenser 100 and to allow the cartridge 200 to be replaced. The dispenser housing 102 includes a slot 110 that accepts a nozzle assembly 210 of the cartridge 200. While the slot 110 is depicted as being generally u-shaped, it should be understood the slot 110 may include any suitable shape to accommodate the nozzle assembly 210 of the cartridge 200. The dispenser housing 102 may further include a receiving portion 112 that is positioned above the slot 110 in the vertical direction. The receiving portion 112 is positioned such that when the cartridge 200 is installed to the dispenser housing 102, a lower portion 222 of a reservoir 220 (see e.g., the bag reservoir 220 shown in FIG. 15) of the cartridge 200 is aligned with the receiving portion 112 in the vertical direction. In some embodiments, the receiving portion 112 includes a concave surface that faces forward in the longitudinal direction, such that the receiving portion 112 may accommodate cartridges 200 including a reservoir 220 with a curved shape or a flexible reservoir 220 (FIG. 15).

Referring to FIG. 15, an example bag-type cartridge 200 is shown in isolation. The cartridge 200 generally includes the nozzle assembly 210 and the reservoir 220 in fluid communication with the nozzle assembly 210. The nozzle assembly 210 may include a pump that selectively dispenses fluid (e.g., skincare product) from the reservoir 220. In some embodiments, the reservoir 220 may include a bag, or the like, that contains skincare product within the reservoir 220. As skincare product is dispensed from the reservoir 220, the bag may collapse such that the volume of space occupied by the reservoir 220 decreases. In other embodiments (such as described with respect to FIGS. 1-4), the reservoir 220 may include a collapsible solid structure that is generally rigid when filled with fluid. As fluid is dispensed from the reservoir 220, the collapsible solid structure may collapse, such that the volume of space occupied by the reservoir 220 decreases. Alternatively, in some embodiments, the reservoir 220 may include a solid structure that retains its shape as liquid is dispensed from the reservoir 220. In some embodiments, the reservoir 220 includes the lower portion 222 and an upper portion 224 that is positioned above the lower portion 222 in the vertical direction. The lower portion 222 of the reservoir 220 is positioned adjacent to the nozzle assembly 210 in the vertical direction. As referred to herein, the lower portion 222 may include at least the portion of the reservoir 220 positioned between the nozzle assembly 210 and a reservoir centerline 221 that bisects the reservoir 220 in the vertical direction. Notably, in some embodiments, such as described above with respect to FIG. 11, the cartridge may be designed to be installed with the nozzle assembly above the reservoir such that an upper portion of the reservoir is positioned adjacent the nozzle assembly.

In the depicted embodiment of FIG. 15, the cartridge 200 includes a communications tag 230 that receives and records information. The communications tag 230 is shown coupled to the nozzle assembly 210 of the cartridge 200. Alternatively, the communications tag 230 may be coupled to the reservoir 220, or any other suitable portion of the cartridge 200. The communications tag 230 may be coupled to the cartridge 200 in such a way as to prevent removal of the communications tag 230, which may assist in preventing the use of counterfeit or unauthorized cartridges 200 (such as by removing an authorized communications tag 230 and attaching it to an unauthorized cartridge 200). The communications tag 230 may take many forms capable of receiving and recording information. For instance, the communications tag 230 may be a Bluetooth low energy (BLE) tag, a beacon (e.g., a URIBeacon, an AltBeacon, or an iBeacon), a radio frequency identification (RFID) tag, a near field communication (NFC) device, a Wi-Fi device, and/or the like. The communications tag 230 can include some or all of the following components: one or more input interfaces for receiving information/data, one or more transceivers, one or more antennae, one or more output interfaces for transmitting information/data, a processor, a clock, memory modules, one or more sensors for sensing and detecting various information/data, location determining aspects, and a power source. The power source may be a source provided by the cartridge 200, an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, the communications tag 230 can store one or more unique identifiers, such as a global unique identifier (GUID), a universally unique identifier (UUID), a character string, an alphanumeric string, text string, and/or the like. In some embodiments, the unique identifier may be encrypted using a cipher, to prevent alteration or duplication of the unique identifier, which may assist in preventing the use of counterfeit or unauthorized cartridges 200. The unique identifier may identify the associated communications tag 230 and/or the associated cartridge 200. Via various communication standards and protocols, the communications tag 230 can be communicated with, interrogated, read, and/or the like. For example, a communications unit 120 (FIG. 16) of the dispenser assembly 100 may communicate with the communications tag 230 of the cartridge 200 using one or more wireless communication standards and protocols, including Bluetooth, Bluetooth Low Energy (BLE), NFC, Wi-Fi, ZigBee, and/or any other wireless protocol or standard. When a communications tag 230 is installed to a dispenser 100, the dispenser 100 may store in a non-volatile memory information/data related to the unique identifier so that usage data/information may be associated with the unique identifier, as will be described in greater detail herein. By associating usage data/information with the unique identifier of specific communications tag 230, the dispenser assembly 100 may maintain a cache of the usage data/information for cartridges 200 used with the dispenser assembly 100, which may assist in maintaining an accurate estimation of remaining skincare product within the cartridges 200.

Referring to FIG. 16, a front view of an example dispenser 100 is shown in isolation. As described above, the dispenser 100 is shaped to receive the cartridge 200 (FIG. 15). The depicted example dispenser 100 includes a communications unit 120 that is capable of sending, reading, and/or receiving information, including communicating with the communications tag 230 (FIG. 15) of the cartridge 200. In some embodiments, the communications unit 120 includes an RFID antenna that writes information to and reads information from the communications tag 230. In other embodiments, the communications unit 120 may include any suitable device capable of reading and writing information to the communications tag 230.

In some embodiments, the communications unit 120 writes usage information/data to the communications tag 230 of the cartridge 200. The usage information/data may include information related to the number of times a fluid has been dispensed from the cartridge 200 associated with the communications tag 230.

In particular, as described above, skincare product, such as liquid, foam, or gel, may be dispensed from the cartridge 200 through activation of a pump within the nozzle assembly 210. To dispense skincare product from the cartridge 200, the pump of the cartridge 200 is activated by the dispenser 100. Each time that the dispenser 100 activates the pump in the nozzle assembly 210 of the cartridge 200, information/data indicative of a dispensation may be stored in a non-volatile memory of the dispenser 100. At periodic intervals, the communications unit 120 may retrieve or receive the information/data from the non-volatile memory, and may write the information/data to the communications tag 230, the information/data being indicative of the number of times skincare product has been dispensed from the cartridge 200. By cumulatively writing information/data to the communications tag 230 that is indicative of the number of times skincare product is dispensed from the cartridge 200, the communications tag 230 may include information/data indicative of the total number of times that skincare product has been dispensed from the cartridge 200. In embodiments where the pump dispenses a constant or near constant volume of fluid upon activation, the total number of times that skincare product has been dispensed from the cartridge 200 may be indicative of the total volume of skincare product dispensed from the cartridge 200. Accordingly, the usage information/data recorded to the communications tag 230 may indirectly indicate the volume of skincare product dispensed from the cartridge 200, which may be used to calculate the volume of skincare product remaining in the cartridge 200. Furthermore by retrieving or receiving the information/data from the non-volatile memory of the dispenser assembly at periodic intervals, power consumption of the dispenser 100 may be reduced. Furthermore by storing usage information/data within the dispenser 100 and periodically writing the usage information/data to the communications tag 230, errors associated with the resolution of the writing process may be minimized, such as when the usage information/data is stored on the communications tag 230 as written bits of memory, as is explained in greater detail below.

In some embodiments, the communications tag 230 may include cartridge information/data that can be read by the communications unit 120. The cartridge information/data may include information related to the cartridge 200, such as the manufacturer of the cartridge 200, the type of fluid within the reservoir 220 (i.e., hand sanitizer, liquid soap, foam soap, etc.), and the unique identifier data associated with the cartridge 200. In embodiments, the cartridge information/data is associated with the usage information/data in the communications tag 230, such that the unique identification number associated with each cartridge 200 may be associated with the number of times that fluid is dispensed from the cartridge 200. In this way, the number of times that fluid has been dispensed from a specific cartridge 200 may be associated with the unique identifier associated with that cartridge 200.

Furthermore, in some embodiments, the dispenser 100 may provide a notification and/or may change operation based on the received cartridge data. Some example changes in operation may include limiting the number of dispenses allowed, limiting or expanding the size of shot for each dispense, causing a delay between dispenses, preventing dispenses, etc. For example, the dispenser 100 may provide a notification and/or change operation of the dispenser 100 if the communications unit 120 receives cartridge information/data from a cartridge 200 that indicates installation of an unapproved cartridge (e.g., the installed cartridge was not manufactured by an authorized manufacturer and/or provided by an authorized distributor). Similarly, the dispenser 100 may provide a notification and/or change operation of the dispenser based on received cartridge information/data from a cartridge 200 that indicates a date of manufacture and/or expiration date of the cartridge 200 that is beyond a recommended limit, for example in clinical settings in which the use of expired skincare product would be undesirable. In some embodiments, the dispenser may provide a notification and/or change operation of the dispenser 100 if the communications unit 120 receives cartridge information/data from a cartridge 200 that indicates the cartridge includes a fluid not intended to be dispensed by the dispenser 100 (e.g., the cartridge 200 includes a foam soap, while the dispenser 100 is intended to dispense gel sanitizer, etc.). In this way, reading cartridge information/data associated with a cartridge 200 may assist in preventing the use of improper, counterfeit, or expired cartridges with the dispenser 100.

In some embodiments, the communications tag 230 may be designed for "one-time" use, and may assist in preventing unauthorized re-use of the cartridge 200. For example, if the communications unit 120 receives cartridge information/data that indicates that the cartridge 200 has previously been used, such as if the cartridge 200 has been utilized by another dispenser assembly, the dispenser 100 may provide a notification and/or limit operation of the dispenser 100. In some embodiments, the communications tag 230 may include a write-only or lockable memory that may prevent intentional or unintentional alteration of data/information on the communications tag 230. The communications tag 230 may include bits of memory that may be used to "count" the number of times skincare product is dispensed from the cartridge 200, and may provide a low-cost option for tracking refill life. In particular, the communications tag 230 may include a predetermined amount of one-time writable bits of memory. In embodiments, the communications tag 230 includes a section of write-only bit memory in a fuse-based configuration to track and monitor refill life remaining. The fuses may be allocated based on a resolution of the communications tag 230, and may be scaled based the memory of the communications tag 230, and individual fuses may be "blown" or broken when the bit memory is written to. Utilizing write-only or lockable memory may provide a low-cost manner of tracking use of the cartridge 200 while preventing re-use of the communications tag 230 and associated cartridge 200.

The predetermined amount of one-time writable bits of memory may be associated with the number of expected dispenses of skincare product from a cartridge 200. For example, in a cartridge 200 including a volume of skincare product in which 4000 dispenses are expected, the communications tag 230 may include 400 one-time writable bits (50 bytes), such that each bit may represent 10 dispenses (i.e., 4000 dispenses/400 bits=10 dispenses/bit). In some embodiments, an estimated overfill value may be included to determine the amount of dispenses per bit. For example, if it is known that a particular supplier provides an excess reserve capacity of skincare product in the cartridge 200

(i.e., a volume of product in excess of the stated initial volume), this reserve capacity may also be included in the calculation of dispenses per bit. The communications tag 230 may be configured to allow user specific configuration of options. For example, the inclusion of an estimated overfill value may be enabled or disabled with a selected amount of allowed reserve capacity. Allowing the estimated overfill value to be enabled or disabled may assist in compensating for variation in fill volumes, evaporation, as well as pump variations.

When skincare product is dispensed from the dispenser 100, the communications unit 120 may write to the number of one-time writable bits of memory associated with the number of dispense cycles to the communications tag 230. In the example above, the communications unit 120 would write to a bit of memory every 10 dispense cycles. Once all of the memory bits of the communications tag 230 have been written to, the cartridge 200 may be considered empty. With all of the bits of the communications tag 230 being written to, the communications tag 230, and accordingly the cartridge 200 may be prevented from being re-used. For example, once removed from the operating dispenser, the cartridge 200 will be prevented from being used in any other dispenser, preventing unauthorized re-use of the communication tag 230, as may be encountered through an unauthorized refill and subsequent re-use of the cartridge 200. For example, the dispenser assembly 100 may provide a notification and/or change operation if the communications unit 120 detects that all of the memory bits of a communications tag 230 positioned within the dispenser assembly 100 have been written to.

In some embodiments, write-only or lockable bits of memory of the communications tag 230 may be dedicated to tracking the number of times that a particular cartridge has been installed to different dispenser assemblies. For example, a communications tag 230 may have 4 bits that are dedicated to tracking the number of times that the cartridge 200 is installed to different dispensers 100. When the cartridge 200 is first installed to an initial dispenser assembly 100, all 4 bits of the communications tag 230 may remain unwritten. Upon the detection of a service event, such as the opening of a door of the dispenser 100, the communications unit 120 may write to one of the four memory bits of the communications tag 230, to indicate that cartridge 200 had previously been installed to the dispenser 100. In this way, if the cartridge 200 is installed to a different dispenser 100, the communications tag 230 will have an indication that the cartridge 200 had previously been installed to another dispenser 100. This process may be repeated each time the cartridge is installed and then removed from different dispensers 100. By tracking the number of times that a cartridge is installed to different dispensers 100, error associated with variations between different dispensers 100 may be taken into account when estimating the amount of skincare product remaining in the cartridge 200.

As noted above, the dispenser 100 may also include a non-volatile memory that stores unique identifier data associated with the communications tag 230. By storing the unique identifier data, the dispenser 100 may only write to a bit of memory on the communications tag 230 if the cartridge 200 has not previously been installed to the dispenser 100. In this way, communications tag 230 may store only the number of times that the cartridge has been installed to different dispensers 100, without tracking re-installation of the cartridge to the same dispenser 100.

Referring to FIG. 16, the dispenser 100 may further include a fluid detection sensor 130 that is coupled to the dispenser housing 102 and that may detect the presence of a cartridge 200 positioned within the dispenser housing 102. The fluid detection sensor 130 further detects the presence of and/or the level of fluid present in a cartridge 200 positioned within the dispenser assembly 100. The fluid detection sensor 130 is coupled to the receiving portion 112 of the dispenser assembly 100 such that the lower portion 222 of the reservoir 220 (FIG. 15) is aligned with the fluid detection sensor 130 in the vertical direction when installed to the dispenser assembly 100. By aligning the fluid detection sensor 130 with the bottom portion 222 of the reservoir 220 (FIG. 15), the fluid detection sensor 130 may be aligned with reservoirs having different sizes and/or heights. In particular, while the reservoirs 220 of different cartridges 200 may have different sizes/heights evaluated in the vertical direction, the size/height of the nozzle assembly 210 of different cartridges 200 may be relatively constant. As such, when installed to the dispenser 100, the position of the nozzle assembly 210 (FIG. 15) of different cartridges 200 may be relatively constant with respect to the dispenser assembly 100. As the lower portion 222 of the reservoir 200 (FIG. 15) is adjacent to the nozzle assembly 210 (FIG. 15), when installed, the position of the lower portion 222 of different cartridges 200 may similarly be relatively constant with respect to the dispenser 100 regardless of the overall size/height of the reservoir 220 (FIG. 15). Accordingly, by aligning the fluid detection sensor 130 with the lower portion 222 of the reservoir 220 (FIG. 15), the fluid detection sensor 130 may maintain alignment with the reservoir 220 regardless of the overall size/height of the reservoir 220.

The fluid detection sensor 130 may have a curved or semi-curved shape that conforms to the receiving portion 112 of the dispenser 100. As shown in FIG. 13, the fluid detection sensor 130 and the receiving portion 112 of the dispenser 100 include a concave shape facing forward in the longitudinal direction. By conforming to the shape of the receiving portion 112, the fluid detection sensor 130 may maintain contact and/or direct or indirect engagement with reservoirs 220 having a curved shape or formed from a flexible material.

In the embodiment depicted in FIG. 16, the fluid detection sensor 130 includes a single-plate capacitive sensor coupled to the dispenser housing 102. Alternatively, in some embodiments, such as described herein, other types of sensors may be utilized.

Referring now to FIG. 17, a front view of the cartridge 200 positioned within the dispenser 100 of FIG. 16 is schematically depicted. When the cartridge 200 is positioned within the dispenser assembly 100, the reservoir 220 of the cartridge 200 is positioned such that the fluid detection sensor 130 is positioned proximate to the reservoir 220. In some configurations, the fluid detection sensor 130 contacts the reservoir 220 when the cartridge 200 is positioned within the dispenser assembly 100. In other configurations, the fluid detection sensor 130 may be spaced apart from the reservoir 220, and the reservoir 220 may be positioned within the electrostatic field emitted by the fluid detection sensor 130. For example, as described above, in embodiments where the fluid detection sensor 130 is a capacitive sensor, a voltage may be applied to the fluid detection sensor 130, such that the fluid detection sensor 130 emits an electrostatic field with the reservoir 220 being be positioned within the electrostatic field. Alternatively, the fluid detection sensor 130 may include any suitable non-contact sensor capable of determining the presence of and/or the level of fluid within the reservoir 220, such as a sonar sensor, an optical sensor, or the like.

In embodiments where the fluid detection sensor 130 is a capacitive sensor, capacitance across the capacitive sensor may change depending on the dielectric constant of materials positioned within the electrostatic field. Without being bound by theory, air has a relatively low dielectric constant as compared to the dielectric constant of water and the dielectric constant of alcohol. Accordingly, air has a relatively low dielectric constant as compared to the dielectric constant of most water-based and alcohol-based liquid and gels. As such, when a liquid or gel, such as a liquid or gel positioned within the reservoir 220, is positioned within the electrostatic field of the fluid detection sensor 130, the fluid detection sensor 130 may detect a capacitance that is different than when liquid or gel is not positioned within the electrostatic field (i.e., when air is positioned within the electrostatic field). By detecting whether liquid or gel is positioned within the electrostatic field, the fluid detection sensor 130 may detect when the fluid within the reservoir 220 of the cartridge 200 is below a predetermined threshold. Additionally, air may have a relatively low dielectric constant as compared to the dielectric constant of the materials used to form the reservoir 220, which may include plastics, composites, or the like. Accordingly, when a reservoir 220 (whether empty or full of fluid) is positioned within the dispenser housing 102, the fluid detection sensor 130 may detect a capacitance that is different than when no reservoir is positioned within the dispenser housing 102. In this way, the fluid detection sensor 130 may also detect the presence of a reservoir 220 within the dispenser 100.

Furthermore, a human hand may have a relatively high dielectric constant as compared to air. Accordingly, when a user's hand is positioned within the dispenser 100, such as when a user is replacing the cartridge 200, the fluid detection sensor 130 may detect a capacitance that is different than when the user's hand is positioned outside of the dispenser assembly. In this way, the fluid detection sensor 130 may also detect the presence of a user's hand, which may be indicative of a service event such as a user replacing the cartridge 200.

In addition to detecting when fluid within the reservoir 220 is below a predetermined threshold, in some configurations, the capacitive sensor of the fluid detection sensor 130 may detect changes in volume of the fluid within the reservoir 220. Specifically, as the volume of fluid within the reservoir 220 decreases, the capacitance detected by the fluid detection sensor 130 may change. In this way, the fluid detection sensor 130 may detect incremental changes in volume of the fluid within the reservoir 220, in addition to detecting when the fluid within the reservoir 220 is below a predetermined threshold.

Referring to FIG. 18A, a front view of a portion of the dispenser 100 is schematically depicted. As shown in FIG. 18A, the fluid detection sensor 130 is generally oriented in the lateral direction, such that the fluid detection sensor 130 may engage the reservoir 220 in the lateral direction. While the fluid detection sensor 130 is depicted as being oriented in the lateral direction, it should be understood the fluid detection sensor 130 may have any suitable orientation to detect fluid within the reservoir 220. As noted above, the fluid detection sensor 130 may be formed of a flexible material that conforms to the curvature of the dispenser housing 102.

Referring to FIG. 18B, a front view of a portion of the dispenser 100 including a plurality of fluid detection sensors 131 is schematically depicted. In the embodiment, shown in FIG. 18B, the plurality of fluid detection sensors 131 includes a first fluid detection sensor 132, a second fluid detection sensor 134, a third fluid detection sensor 136, and a fourth fluid detection sensor 138. Each of the plurality of fluid detection sensors 131 are generally oriented in the vertical direction, and each of the plurality of fluid detection sensors 131 have a different height, as evaluated in the vertical direction. Each of the plurality of fluid detection sensors 131 may operate independently of one another, each generating a separate electrostatic field, as compared to operating in cooperation as transmitting and receiving sensors. When the cartridge 200 is positioned within the dispenser housing 102, the individual fluid detection sensors extend to different heights along the reservoir 220, and each of the fluid detection sensors are arranged in descending order by height. The first fluid detection sensor 132 has a height elevated in the vertical direction that is greater than the heights of the second fluid detection sensor 134, the third fluid detection sensor 136, and the fourth fluid detection sensor 138. The first fluid detection sensor 132 is positioned adjacent to the second fluid detection sensor 134, which has a height that is less than the first fluid detection sensor 132, but greater than the heights of the third fluid detection sensor 136 and the fourth fluid detection sensor 138. The third fluid detection sensor 136 is positioned adjacent to the second fluid detection sensor 134, and the third fluid detection sensor 136 has a height that is greater than the fourth fluid detection sensor 138, which is positioned adjacent to the third fluid detection sensor 136.

As fluid is dispensed from the reservoir 220, the level of fluid within the reservoir 220 decreases and moves downward in the vertical direction. As the fluid within the reservoir 220 moves downward in the vertical direction, the fluid within the reservoir 220 may sequentially move below successive fluid detection sensors of the plurality of fluid detection sensors 131. For example, as the fluid within the reservoir 220 moves downward, the level of fluid within the reservoir 220 may first move below the first fluid detection sensor 132, while the fluid level is still above the height of the second fluid detection sensor 134, the third fluid detection sensor 136, and the fourth fluid detection sensor 138. When the fluid within the reservoir 220 is at a height in the vertical direction below the first fluid detection sensor 132 and above the second fluid detection sensor 134, the first fluid detection sensor 132 will have a different capacitance than the second fluid detection sensor 134, indicating that the fluid within the reservoir 220 is positioned at a height that is between the first fluid detection sensor 132 and the second fluid detection sensor 134. In this way, the approximate level of the fluid within the reservoir 220 can be estimated by detecting changes in capacitance between adjacent fluid detection sensors. While the embodiment depicted in FIG. 18B depicts the first fluid detection sensor 132, the second fluid detection sensor 134, the third fluid detection sensor 136, and the fourth fluid detection sensor 138, it should be understood that the plurality of fluid detection sensors 131 may include any suitable number of fluid detection sensors to detect differences in capacitance between adjacent fluid detection sensors.

Referring to FIG. 18C, a front view of a portion of the dispenser 100 is schematically depicted with the plurality of fluid detection sensors 131. Similar to the embodiment shown in FIG. 18B, the plurality of fluid detection sensors 131 include the first fluid detection sensor 132, the second fluid detection sensor 134, the third fluid detection sensor 136, and the fourth fluid detection sensor 138. As in the embodiment shown in FIG. 18B, each of the plurality of fluid detection sensors 131 may operate independently of one another, each generating a separate electrostatic field, as compared to operating in cooperation as transmitting and receiving sensors. However, in the embodiment shown in FIG. 18C, each of the plurality of fluid detection sensors 131 is oriented to extend in the lateral direction. As the fluid within the reservoir 220 moves downward, the level of fluid within the reservoir 220 will first move below the first fluid detection sensor 132, while the fluid level is still above the height of the second fluid detection sensor 134, the third fluid detection sensor 136, and the fourth fluid detection sensor 138. Accordingly, when the fluid within the reservoir 220 is positioned at a height in the vertical direction that is below the first fluid detection sensor 132, but above the second fluid detection sensor 134, the first fluid detection sensor 132 will have a different capacitance than the second fluid detection sensor 134, indicating that the fluid within the reservoir 220 is positioned at a height that is between the first fluid detection sensor 132 and the second fluid detection sensor 134. In this way, the approximate level of the fluid within the reservoir 220 can be estimated by detecting changes in capacitance between adjacent fluid detection sensors. While the embodiment depicted in FIG. 18C depicts the first fluid detection sensor 132, the second fluid detection sensor 134, the third fluid detection sensor 136, and the fourth fluid detection sensor 138, it should be understood that the plurality of fluid detection sensors 131 may include any suitable number of fluid detection sensors to detect differences in capacitance between adjacent fluid detection sensors.

Referring to FIG. 19, a front perspective view of another embodiment of a dispenser 100 is schematically depicted. In the embodiment depicted in FIG. 19, the dispenser 100 includes a plurality of fluid detection sensors 131 that are oriented to detect movement of the cartridge 200 in the x-direction, y-direction, and/or the z-direction. The first fluid detection sensor 132 may include a capacitive sensor that detects objects placed within an electrostatic field emitted by the capacitive sensor. In the embodiment shown in FIG. 19, the first fluid detection sensor 132 is positioned on the vertical portion 103 of the dispenser housing 102, which is oriented to face forward in the longitudinal direction (i.e., in the +x-direction). Accordingly, the first fluid detection sensor 132 may detect movement of the cartridge 200 in the longitudinal direction with respect to the dispenser housing 102, may detect the level of fluid within the cartridge 200, and may generally detect the presence of a cartridge 200 within the dispenser housing 102.

The plurality of fluid detection sensors 131 further includes a second fluid detection sensor 134 that is positioned on a base portion 105 of the dispenser housing. The second fluid detection sensor 134 may include a capacitive sensor that detects objects placed within an electrostatic field emitted by the capacitive sensor. In the embodiment shown in FIG. 19, the second fluid detection sensor 134 is positioned on the base portion 105 of the dispenser housing 102, which is oriented to face upward in the vertical direction (i.e., in the +z-direction). Accordingly, the second fluid detection sensor 134 may detect movement of the cartridge 200 in the vertical direction with respect to the dispenser housing 102, may detect the level of fluid within the cartridge 200, and may generally detect the presence of a cartridge 200 within the dispenser housing.

The plurality of fluid detection sensors 131 further includes a third fluid detection sensor 136 that is positioned on a contoured portion 107 of the dispenser housing 102. The third fluid detection sensor 136 may include a capacitive sensor or capacitive sensors that detect objects placed within an electrostatic field emitted by the capacitive sensor. In the embodiment shown in FIG. 19, the third fluid detection sensor 136 is positioned on the contoured portion 107 of the dispenser housing 102, which is oriented to face at least partially in the lateral direction (i.e., in the +/−y-direction). The contoured portion 107 may also oriented to face at least partially in the vertical direction (i.e., in the +z-direction). Accordingly, the third fluid detection sensor 136 may detect movement of the cartridge 200 in the longitudinal direction and/or the vertical direction with respect to the dispenser housing 102, may detect the level of fluid within the cartridge 200, and may generally detect the presence of a cartridge 200 within the dispenser housing. While the embodiment depicted in FIG. 19 shows that the third fluid detection sensor 136 includes a pair of capacitive sensors positioned on opposite sides of the slot 110, it should be understood that the third fluid detection sensor 136 may include any suitable number of sensors positioned around the contoured portion 107 of the dispenser housing 102, and may include a single capacitive sensor that wraps around the slot 110.

Accordingly, the first fluid detection sensor 132 may detect movement of the cartridge 200 in the longitudinal direction, the second fluid detection sensor 134 may detect movement of the cartridge 200 in the vertical direction, and the third fluid detection sensor 136 may detect movement of the cartridge 200 in at least the lateral direction. As such, the plurality of fluid detection sensors 131 may detect different modes of collapse of the cartridge 200 in any of the longitudinal, the vertical, and/or the lateral directions. By detecting different modes of collapse of the cartridge 200 in multiple directions, the plurality of fluid detection sensors 131 may assist in distinguishing between changes in capacitance resulting from movement of the cartridge 200, and changes in capacitance that may result from changes in fluid level within the cartridge 200. In particular, movement of the cartridge 200 and/or fluid within the cartridge 200 that is limited to only one of the vertical, the lateral, or the longitudinal direction may be indicative of a directional collapse of the cartridge 200 in any of the vertical, lateral, or longitudinal directions, rather than a volumetric change of fluid within the cartridge 200.

Referring to FIGS. 20 and 21, a graphical representation of detected capacitances of the first fluid detection sensor 132, the second fluid detection sensor 134, and the third fluid detection sensor 136 of FIG. 19 is schematically depicted. FIG. 20 schematically depicts detected capacitances that might be experienced with a collapsing reservoir 220, while FIG. 21 depicts expected or modeled capacitances of a non-collapsing reservoir 220. In the graph shown in FIGS. 20 and 21, the detected capacitance of the first fluid detection sensor 132 is depicted as line 32, the detected capacitance of the second fluid detection sensor 134 is depicted as line 34, and the detected capacitance of the third fluid detection sensor 136 is depicted as line 36. The detected capacitances of the first fluid detection sensor 132, the second fluid detection sensor 134, and the third fluid detection sensor 136 are depicted along the y-axis across a given time, which is depicted along the x-axis.

As described above, in operation, as fluid is dispensed from a cartridge 200 within the dispenser housing 102 over a period of time, the capacitance detected by the first fluid detection sensor 132, the second fluid detection sensor 134, and the third fluid detection sensor 136 will change as a result of the changing volume of fluid within the cartridge 200, as well as from the movement of the cartridge 200 within the dispenser housing 102. When similar changes in capacitance are detected across at least two of the first fluid detection sensor 132, the second fluid detection sensor 134, and/or the third fluid detection sensor 136, the change in capacitance may be attributed to a change in fluid level within the cartridge 200 that may be indicative of a low volume of fluid within the cartridge 200 such that the cartridge 200 is nearly empty.

For example and referring to FIGS. 20 and 21, at time 1000, the detected capacitance 32 of the first fluid detection sensor 132 indicates a relatively sharp decrease in detected capacitance as compared to the detected capacitances 34, 36 of the second fluid detection sensor 134 and the third fluid detection sensor 136, respectively. As the relatively sharp decrease in capacitance is detected only on the first fluid detection sensor 132, the decreased capacitance may be attributed to the fluid and/or the cartridge 200 moving with respect to the first fluid detection sensor 132, but may not necessarily indicate that the cartridge 200 is nearly empty. For example, in the dispenser housing 100 shown in FIG. 19, the first fluid detection sensor 132 is positioned above the second fluid detection sensor 134 and the third fluid detection sensor 136 in the vertical direction. Accordingly, as fluid is dispensed from the cartridge 200, the fluid level and/or the cartridge 200 may move below the first fluid detection sensor 132 before the fluid level and/or the cartridge 200 moves below the second fluid detection sensor 134 and the third fluid detection sensor 136. Accordingly, when only the first fluid detection sensor 132 detects a large change in the detected capacitance 32 as compared to the detected capacitances 34, 36 of the second fluid detection sensor 134 and the third fluid detection sensor 136, the change in the detected capacitance 32 may indicate simply that the fluid level and/or the cartridge 200 has moved with respect to the first fluid detection sensor 132, rather than that the cartridge 200 is nearly empty.

In contrast, at time 1002, both the detected capacitances 34, 36 of the second fluid detection sensor 134 and the third fluid detection sensor 136, respectively, detect a relatively large change in capacitance as compared to the detected capacitance 32 of the first fluid detection sensor 132. As both the second fluid detection sensor 134 and the third fluid detection sensor 136 experience a relatively large and nearly simultaneous change in the detected capacitances 34, 36, respectively, the relatively large change in capacitance may be attributed to a decrease in the fluid level of the cartridge 200 indicating that the cartridge 200 is nearly empty. For example and referring to the dispenser 100 shown in FIG. 19, the second fluid detection sensor 134 and the third fluid detection sensor 136 are positioned near the bottom of the dispenser 100 in the vertical direction. Accordingly, when a large and nearly simultaneous change in detected capacitance 34, 36 is detected from the second fluid detection sensor 134 and the third fluid detection sensor 136, the large change in detected capacitance may be attributed to a change in the fluid level of the cartridge 200 proximate to the second fluid detection sensor 134 and the third fluid detection sensor 136, which may indicate that the cartridge 200 is nearly empty. In this regard, such as may be similar to other embodiments described herein, the position of the sensors relative to the geometry of the reservoir may enable determination of desirable product levels within the reservoir. In some embodiments, such as may be consistent with the above embodiments, additional sensors may be positioned relative to other sensors and the reservoir in order to increase accuracy of product level detection and/or level thresholds.

By detecting when the cartridge 200 is nearly empty, the first fluid detection sensor 132, the second fluid detection sensor 134, and the third fluid detection sensor 136 may assist in identifying when a cartridge 200 should be replaced, minimizing the waste of product that results from replacing a cartridge 200 that is not empty or nearly empty. Furthermore, by identifying when the cartridge 200 is nearly empty, just-in-time replacement of the cartridge 200 may be facilitated, which may reduce the amount of replacement cartridges 200 that need to be maintained in inventory, thereby reducing operating costs.

Example Dispenser System Architecture

Referring to FIG. 22, an example connection between a fluid detection sensor 130 and a controller 300 is illustrated. The fluid detection sensor 130 is electrically coupled to a controller 300. In some embodiments, the fluid detection sensor 130 is electrically coupled to the controller 300 through a first wired connection 140. The controller 300 may include a second wired connection 142 that is not electrically coupled to the fluid detection sensor 130. The second wired connection 142 may be electrically coupled to the controller 300 at a first end 144, and may be free and not connected to any components of the dispenser 100 at an opposite second end 146. The controller 300 may detect a capacitance in the second wired connection 142 and may detect the capacitance in the fluid detection sensor 130 via the first wired connection 140. The capacitance detected in the second wired connection 142 may provide a reference capacitance that is indicative of the capacitance that may be attributed to the first wired connection 140 as opposed to the fluid detection sensor 130.

Notably, the first wired connection 140 and the second wired connection 142 may be similar in length and composition, such that the capacitance in the first wired connection 140 may be similar to the second wired connection 142. Accordingly, by detecting the capacitance in the second wired connection 142, which is not electrically coupled to the fluid detection sensor 130, the controller 300 may estimate the capacitance that may attributed to the first wired connection 140, as opposed to the capacitance that may be attributed to the fluid detection sensor 130.

Referring to FIG. 23, in embodiments including a plurality of fluid detection sensors (e.g., fluid detection sensors 131), the plurality of fluid detection sensors may be electrically coupled to the controller 300 through a multiplexer 301. As commonly understood, the multiplexer 301 may select a signal from one of the plurality of fluid detection sensors 131 for transmission to the controller 300. In embodiments including the plurality of fluid detection sensors 131, the difference in detected capacitance between adjacent fluid detection sensors may indicate the level of fluid within the reservoir 220, as described above. The difference in detected capacitance between adjacent fluid level detection sensors may be represented by the following equation:

$$\Delta C_{sensor} = C_{Sensor(n)} - C_{Sensor(n-1)}$$

In the above equation, $C_{Sensor(n)}$ indicates the detected capacitance of one of the plurality of fluid detection sensors 131, and $C_{Sensor(n-1)}$ indicates the detected capacitance of an adjacent fluid detection sensor, for example the detected capacitances of the first fluid detection sensor 132 and the second fluid detection sensor 134, respectively. The difference in capacitance between the adjacent fluid detection sensors may be indicative of the amount of fluid positioned between the adjacent fluid detection sensors. For example, a relatively large difference in detected capacitance may be indicative of relatively little fluid positioned between the adjacent fluid detection sensors, while a relatively low difference in detected capacitance may be indicative of a relatively large amount of fluid positioned between the adjacent fluid detection sensors. Put another way, the difference in detected capacitance between adjacent fluid detection sensors may be not only indicative that the level of fluid in the reservoir 220 is positioned between the adjacent fluid detection sensors, but the magnitude of the difference in detected capacitance may also be indicative of the quantity of fluid positioned between the adjacent fluid detection sensors. In this way, the level of fluid within the reservoir 220 may be understood with accuracy.

Referring to FIG. 24, in some embodiments, the controller 300 may be communicatively coupled, through a wired or wireless connection, to the communications unit 120. The controller 300 may control the function of the communications unit 120 and may send and receive information from the communications unit 120, such as the usage information/data and the cartridge information/data read by the communications unit 120. The controller 300 may also be communicatively and/or electrically coupled to a motherboard 302, which may control certain functions of the dispenser assembly 100. The motherboard 302 may be electrically coupled to a power source 306 and a pump motor 304, and may selectively drive the pump motor 304 to activate the pump within the cartridge 200. In some embodiments, the controller 300 may be communicatively coupled, through a wired or wireless connection, to a compliance module 308. The compliance module 308 may include functionality to track health hygiene compliance, collecting information/data and/or providing notifications of a user's compliance with hand washing procedures and regulations.

FIG. 25 provides a schematic of a management computing server 400 according to some embodiments of the present invention. In some embodiments, the controller 300 and/or the motherboard 302 are communicatively coupled, through a wired or wireless connection, to the management computing server 400, which may collect information/data from the controller 300 and/or the motherboard 302. In some embodiments, controllers 300 and/or motherboards 302 of multiple dispenser assemblies 100 may be communicatively coupled to the management computing server 400 (e.g., remotely). In other embodiments, individual dispensers 100 may operate as stand-alone units that are not connected to a common management computing server 400.

In some embodiments, the management computing server 400 may be configured to perform various functions of various embodiments of the present invention described herein. In some embodiments, the management computing server 400 may form part of the controller 300 or work with the controller 300 to perform various functions of the embodiments of the present invention. For example, the management computing server 400 (and/or controller 300) may determine, based on data form the fluid detection sensor(s), whether pre-determined threshold product levels have been reached in dispensers 100 and provide indications or alerts accordingly. For example, the management computing server 400 may determine that a certain dispenser has a low product level of fluid remaining and, in response, instruct the dispenser to provide an alert notification in the form of illuminating a low product LED signal. Additionally or alternatively, the management computing server 400 may transmit a corresponding alert remotely, such as to a remote computing device (e.g., a mobile computing device of a maintainer). In some embodiments, the management computing server 400 may be part of a dispenser 100. Alternatively, the management computing server 400 may be remotely located from the dispenser 100, such as in a separate module (e.g., in a different location, in the same room, such as on the ceiling of the restroom, etc.).

In embodiments where multiple dispensers 100 are connected to the management computing server 400, information/data transmitted from separate dispensers 100 may be utilized to provide notifications of likely errors related to the installation of cartridges 200 to the dispensers 100. As one example, using information/data from multiple dispensers 100, the management computing server 400 may assist in determining if an incorrect cartridge 200 is installed to an incorrect dispenser 100. In particular, in some instances, different dispensers 100 may be located in a common location (e.g., the same room or area of a building), and the dispensers 100 may be configured to dispense different types of product (e.g., one dispenser may be configured to dispense a gel, another dispenser may be configured to dispense a foam soap, etc.). When replacing cartridges 200 of the dispensers 100, a user may attempt to refill one of the dispensers 100 with a partially used cartridge 200 from another dispenser assembly 100 in the same location. For example, a user may take a 60% full cartridge 200 filled with gel from one dispenser, and may attempt to install the 60% full cartridge 200 of gel into another dispenser that has an empty cartridge 200 of foam soap.

As the management computing server 400 may have data/information indicating that the dispenser 100 configured to dispense gel previously had a 60% full cartridge 200, upon receiving data/information from the dispenser 100 configured to dispense foam soap that a cartridge 200 that is 60% full has been newly installed, the management computing server 400 may estimate that it is likely that the 60% full cartridge 200 filled with gel has been incorrectly installed to the dispenser assembly 100 in the same location that is configured for dispensing foam soap. The management computing server 400 may subsequently provide an indication and/or prevent operation of the dispenser 100 configured to dispense foam soap.

Additionally, in some embodiments, the management computing server 400 may assist in determining if a particular dispenser 100 has been locally re-configured to dispense an incorrect dose size. For example, the management computing server 400 may store, in memory, specifications related to dispensers 100, including the amount of skincare product to be dispensed with each dispensation cycle. If a dispenser 100 is locally re-configured to dispense an incorrect dose size, the usage data/information associated with the dispenser 100 may not match expected usage (i.e., the cartridge 200 within the dispenser 100 may have a higher or lower remaining volume compared to an expected volume based on the specified dose size). The management computing server 400 may be configured to identify discrepancies between expected usage and the usage data/information, and may provide an indication of such discrepancies.

In general, the terms sever, computing entity, computer, entity, device, system, and/or similar words used herein interchangeably may refer to, for example, one or more computers, computing entities, desktop computers, mobile phones, tablets, phablets, notebooks, laptops, distributed systems, items/devices, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In some embodiments, the management computing server 400 may include or be in communication with one or more processing elements 405 (also referred to as processors, processing circuitry, processing device, and/or similar terms used herein interchangeably) that communicate with other elements within the management computing server 400 via a bus, for example. As will be understood, the processing element 405 may be embodied in a number of different ways. For example, the processing element 405 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In some embodiments, the management computing server 400 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 410, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include usage information/data and cartridge information/data received from the controller 300 and/or the motherboard 302. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In some embodiments, the management computing server 400 may further include or be in communication with volatile media (also referred to as volatile storage, memory, memory storage, memory circuitry and/or similar terms used herein interchangeably). In one embodiment, the volatile storage or memory may also include one or more volatile storage or memory media 415, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the management computing server 400 with the assistance of the processing element 405 and operating system, such as the provision of an indication upon the detection of a predetermined condition, as will be described in greater detail herein.

As indicated, in one embodiment, the management computing server 400 may also include one or more communications interfaces 420 for communicating with various computing entities, such as by communicating data, content, information, and/or similar terms used herein interchangeably that can be transmitted, received, operated on, processed, displayed, stored, and/or the like. For instance, the management computing server 400 may communicate with the controller 300 and/or the motherboard 302. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing server 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, NFC protocols, Bluetooth protocols, Zigbee protocols, BLE protocols, wireless universal serial bus (USB) protocols, and/or any other wireless protocol.

Although not shown, the management computing server 400 may include or be in communication with one or more input elements, such as a keyboard input, a mouse input, a touch screen/display input, motion input, movement input, audio input, pointing device input, joystick input, keypad input, and/or the like. The management computing server 400 may also include or be in communication with one or more output elements (not shown), such as audio output, video output, screen/display output, motion output, movement output, and/or the like.

As will be appreciated, one or more of the management computing server's 400 components may be located remotely from other management computing server 400 components, such as in a distributed system. Furthermore, one or more of the components may be combined and additional components performing functions described herein may be included in the management computing server 400. Thus, the management computing server 400 can be adapted to accommodate a variety of needs and circumstances. As will be recognized, these architectures and descriptions are provided for exemplary purposes only and are not limiting to the various embodiments. Further, in some embodiments, the management computing server 400 may monitor and/or control the function of the dispenser 100, and may monitor and/or control the function of multiple dispensers 100. The management computing server 400 may receive data/information from the dispensers 100, and may be configured to process the data/information received from the dispensers 100 to assist users in determining appropriate maintenance for the dispenser assemblies.

Example Operation of Some Embodiments of the Dispenser Assembly

FIGS. 26-28 illustrate some example operational method for various example embodiments of the present invention described herein. Referring to FIG. 26, in a first step 1102 the controller 300 initializes the communications unit 120, such that the communications unit 120 may communicate with the communications tag 230. Upon initialization, the controller 300 proceeds to step 1104, and reads the usage information/data and/or the cartridge information/data from the communications tag 230. The controller 300 then proceeds to step 1106, where the controller 300 determines whether the usage count (i.e., the number of times fluid has been dispensed from the cartridge 200) from the usage information/data is greater than a predetermined threshold count. If the usage count is greater than the predetermined threshold count, the controller 300 proceeds to step 1108. At step 1108, the controller 300 detects capacitance from the fluid detection sensor 130 or the plurality of fluid detection sensors 131, where the detected capacitance is indicative of a fluid level in the cartridge 200. If the detected capacitance is indicative of a fluid level below a predetermined level, the controller 300 proceeds to step 1110, and provides an indication that there is no (or low) fluid in the cartridge 200. If the detected capacitance is indicative of a fluid level that is not below the predetermined level, the controller proceeds to step 1112, and provides an indication that maintenance is required. By providing indication when the detected capacitance indicates a fluid level that is not below the predetermined level while the usage count is above the predetermined count (i.e., when the fluid detection sensor 130 indicates there is fluid in the cartridge 200 but the usage count indicates the cartridge should be empty), the controller 300 may assist in calibrating the fluid detection sensor 130.

If at step 1106, the usage count is not greater than the predetermined threshold count, the controller 300 proceeds to step 1114. At step 1114, the controller 300 detects capacitance from the fluid detection sensor 130 or the plurality of fluid detection sensors 131, where the capacitance is indicative of a fluid level in the cartridge 200. If the detected capacitance is indicative of a fluid level below the predetermined level, the controller 300 proceeds to step 1116, and provides an indication that the fluid level of the cartridge 200 is low. If the detected capacitance is indicative of a fluid level that is not below the predetermined level, the controller proceeds to step 1118, and may provide an indication that the dispenser assembly is operating normally. From either step 1116 or 1118, the controller 300 proceeds to step 1120 and commands the pump motor 304 to activate to dispense fluid from the cartridge 200. After dispensing fluid from the cartridge 200 at step 1120, the controller 300 commands the communications unit 120 to write a usage count to the communications tag 230 of the cartridge 200 at step 1122.

In some embodiments, the predetermined count may be the number of dispenses expected to empty the cartridge 200 of fluid. In some embodiments, the predetermined count may be higher than the number of dispenses expected to empty the cartridge 200 of fluid. In some embodiments, the predetermined level of fluid is greater than zero (i.e., the predetermined level includes remaining fluid in the cartridge 200). Alternatively, the predetermined level of fluid may be zero (i.e., no fluid remaining in the cartridge 200). In some embodiments, the predetermined level of fluid may be determined through the use of fuzzy state definitions, and the detected capacitance may be filtered through a cascaded integrator-comb (CIC) filter and/or a median filter for fast refill detection and noise elimination.

Accordingly, the dispenser 100 may provide an indication upon the satisfaction of a number of conditions indicating the level of the fluid in the cartridge 200. By providing an indication based the level of the fluid in the cartridge 200, the dispenser 100 may assist in alerting maintenance members when service of the dispenser 100 or replacement of the cartridge 200 is required. In some embodiments, the controller 300 may provide a local indication, such as through a visual or audible indicator positioned on the dispenser 100. Additionally or alternatively, the controller 300 may provide a notification to the management computing server 400, which may provide a notification to a user device. In particular, the controller 300 may provide a specific notification upon the satisfaction certain conditions (i.e., "Low Fluid" at step 1116, "Normal Operation" at step 1118, "No Fluid" at step 1110, and "Error Condition" at step 1112) such that a user may understand the particular nature of the notification and proper maintenance can be scheduled and accommodated.

In some embodiments, such as when a cartridge 200 without a communications tag 230 is inserted within the dispenser 100, the controller 300 will proceed to step 1114 upon failing to detect a communications tag 230. In this way, the dispenser assembly 100 may provide an indication of a low fluid level with cartridges 200 that do not include a communications tag 230 based on the detected capacitance from the fluid detection sensor 130 or the plurality of fluid detection sensors 131. In instances where no communications tag 230 is detected, the controller 300 may locally count the number of dispenses experienced subsequent to a triggering event, such as when a door or panel of the dispenser 100 is opened or closed, which may be indicative of the installation of a new cartridge 200.

In other embodiments, the controller 300 may prevent operation of the dispenser 100 if a communications tag 230 is not detected, or if the cartridge information/data read from the communications tag 230 does not indicate that the cartridge 200 was manufactured by an approved vendor, or if the cartridge 200 contains a product not suitable for the dispenser 100. For example, in some instances, a particular cartridge 200 may only be used with a particular model of dispenser 100. In other instances, a particular model of dispenser 100 may be configured to dispense multiple types of skincare product, and the cartridge information/data may assist in ensuring that the cartridge 200 inserted within the dispenser 100 includes the correct type of skincare product.

The dispenser 100 may further include sensors that indicate whether a door or panel enclosing the dispenser 100 is open. An open door or panel of the dispenser 100 may be indicative of a user removing and/or replacing the cartridge 200, and the controller 300 may refrain from proceeding through some or all of the steps shown in FIG. 26 when the sensors indicate the door or panel is open. Further, predetermined delays or pauses, in which the controller 300 delays proceeding through the steps, may be executed between some or all of the steps shown in FIG. 26.

Furthermore, in some embodiments, at step 1116 (i.e., when the detected fluid level is below the predetermined level), the controller 300 may alternatively not command the dispenser 100 to dispense fluid. In some environments, such as clinical settings, it may be undesirable to attempt to dispense fluid when the cartridge 200 is empty. In instances where a compliance module 308 with health hygiene tracking is employed, a notification of the user's compliance with hand washing procedures will not be recorded if the detected fluid level is below the predetermined level.

Referring to FIG. 27, another embodiment of operations or steps for operating the dispenser assembly 100 is schematically depicted. The operations depicted in FIG. 27 describe the exchange of information with the communications tag 230, and may be performed in conjunction with or independently from the operations described above and depicted in FIG. 26. In a first step 1202, the controller 300 commands the communications unit 120 to initialize. At step 1204, the communications unit 120 reads cartridge data/information from the communication tag 230 and writes cached usage data/information associated with the cartridge data/information to the communications tag 230. In particular, at step 1204, the controller 300 may read cartridge data/information from the communications tag 230, such as a unique identification number associated with the communications tag 230. The controller 300 may further retrieve previously stored usage data/information associated with the unique identification number, such as from the management computing server 400, and may write the retrieved usage data/information to the communications tag 230.

From step 1204, the controller 300 proceeds to step 1208. At step 1208, the controller 300 receives a signal from a sensor configured to detect whether a door or panel of the dispenser assembly 100 is open. If the controller 300 receives a signal indicating that the door or panel is in an open position, the controller 300 proceeds to step 1210. At step 1210, the controller 300 determines if the usage count from the usage data/information is greater than a predetermined presence count. If the usage count is not greater than the predetermined presence count, then the controller 300 proceeds to step 1212 and stores an indication, associated with the cartridge data/information, of "product present" in the controller 300 and/or the management computing server 400. Proceeding from step 1212, or proceeding from step 1210 if the usage count is greater than the predetermined presence count, the controller 300 proceeds to step 1214. At step 1214, the controller 300 may pause or may execute a predetermined delay in which the controller 300 does not perform any actions, allowing a maintenance member to perform a service action on the dispenser 100. In some embodiments, the controller 300 may perform or execute service actions associated with the maintenance of the dispenser 100 at step 1214.

From step 1214, the controller returns to step 1208 to determine if a signal is received from the sensors indicating that the door or panel of the dispenser 100 is in the open position. If the controller 300 does not receive a signal from the sensors that the door or panel is in the open position, the controller 300 proceeds to step 1216. At step 1216, the controller 300 determines if a "product present" indication is stored in the controller 300 and/or the management computing server 400. If the controller 300 determines that a "product present" indication is not associated with the cartridge 200, the controller 300 proceeds to the end of the process, and may provide an indication. If the controller 300 determines that a "product present" indication is stored in the controller 300 and/or the management computing server 400, the controller proceeds to step 1218. At step 1218, the controller 300 determines from the usage data/information whether the usage count is greater than the predetermined presence count. If the usage count is not greater than the predetermined presence count, the controller 300 proceeds to the end of the process, and may provide an indication. If the usage count from the usage data/information is greater than the predetermined presence count, the controller 300 proceeds to step 1220 and stores an indication, associated with the cartridge data/information, of "fluid present" in the controller 300 and/or the management computing server 400.

From step 1220, the controller 300 proceeds to step 1222, and determines if the usage count from the usage data/information is less than a predetermined low count. If the usage count is not less than the predetermined low count, the controller 300 stores an indication, associated with the cartridge data/information, of "low fluid" in the controller 300 and/or the management computing server 400. Proceeding from step 1224, or from step 1222 if the usage count from the usage data/information is less than the predetermined low count, the controller 300 proceeds to step 1226. At step 1226, the controller 300 may command the communications unit 120 to detect the presence of the communications tag 230. If a communications tag 230 is detected, the controller 300 reads and stores usage data/information associated with the communications tag 230 to the controller 300 and/or the management computing server 400. If the communications unit 120 does not detect the presence of a communications tag 230, the controller 300 proceeds to step 1230 and stores an indication of "legacy product." The controller 300 may then proceed to step 1232, resetting a counter to count the number of times fluid is dispensed from the dispenser assembly 100.

In some embodiments, the predetermined presence count may be the number of dispenses expected to empty the cartridge 200 of fluid. In some embodiments, the predetermined presence count may be higher than the number of dispenses expected to empty the cartridge 200 of fluid. In some embodiments, the predetermined low count is greater than the number of dispenses expected to empty the cartridge 200 of fluid, and may be different from the predetermined presence count.

While the steps described above are described and depicted in a particular order, it should be understood that the steps may be performed in any suitable order and may be performed simultaneously. For example, in some embodiments, step 1226 (i.e., detecting the presence of a communications tag 230) may be performed immediately after initializing the communications unit 120 at step 1202.

In some embodiments, as described above, the controller 300 may prevent operation of the dispenser 100 if a communications tag 230 is not detected, or if the cartridge information/data read from the communications tag 230 does not indicate that the cartridge 200 was manufactured by an approved vendor, or if the cartridge 200 contains a product not suitable for the dispenser 100.

Upon storing indications of "product present," "low fluid," and/or "legacy product," the controller 300 may provide a signal or indication to a user. In some embodiments, the controller 300 may provide a local indication, such as through a visual or audible indicator positioned on the dispenser 100. In some embodiments, the controller 300 may provide a notification to the management computing server 400, which may provide a notification to a user device.

Referring to FIG. 28, another embodiment of operations or steps for operating the dispenser 100 is schematically depicted. The operations depicted in FIG. 28 describe an example correspondence of a detected capacitance from the fluid detection sensor 130 with the fluid level within the reservoir 220, and may be performed in conjunction with or independently from the operations described herein. In a first step 1302, the dispenser 100 dispenses a fluid from the reservoir 220. The controller 300 then proceeds to step 1304, where the controller 300 detects a capacitance from the fluid detection sensor 130. At step 1306, the controller 300 compares the detected capacitance from the fluid detection sensor 130 to a reference capacitance. In embodiments, the reference capacitance includes a baseline capacitance stored in memory in the controller 300. For example, the reference capacitance may include a previously detected capacitance from the fluid detection sensor 130. In such embodiments, the comparison between the detected capacitance and the reference capacitance reflects a change in capacitance between successive dispenses. If the difference between the detected capacitance and the reference capacitance is below a predetermined threshold, the controller 300 proceeds to step 1310, where the controller stores an indication that fluid has been dispensed, and stores the detected capacitance. If the difference between the detected capacitance and the reference capacitance is above the predetermined threshold, the controller 300 proceeds to step 1308. At step 1308, the controller 300 stores an indication that fluid has been dispensed, stores the detected capacitance, and stores an indication of a new position of the reservoir 220. In some embodiments, the predetermined threshold is between a 5% and 10% difference between the detected capacitance and the reference capacitance, inclusive of the endpoints. In other embodiments, the predetermined threshold is a difference between the detected capacitance and the reference capacitance that is greater than 2%. As described above, incremental changes in detected capacitance may be indicative of decreasing volume of fluid within the reservoir, such as may be observed as fluid is dispensed from the reservoir 220. However, relatively large changes in detected capacitance may be indicative of movement of the reservoir 220 with respect to the fluid detection sensor 130. For example, in embodiments where the reservoir 220 does not occupy a constant volume of space as fluid is dispensed from the reservoir 220 (such as when the reservoir 220 includes a bag or collapsible solid), the position of the reservoir 220 with respect to the fluid detection sensor 130 may vary as fluid is dispensed from the reservoir 220. In particular, in some instances, a distance between the reservoir 220 and the fluid detection sensor 130 may increase as fluid is dispensed from the reservoir 220. In instances where the reservoir 220 moves away from the fluid detection sensor 130, the fluid detection sensor 130 may detect a relatively large change in capacitance as compared to when the volume of fluid within the reservoir 220 decreases. Similarly, the fluid detection sensor 130 may detect a relatively large change in capacitance when the reservoir 220 is removed from the dispenser 100. Accordingly, by detecting a change in capacitance that is above a predetermined threshold, the controller 300 may detect when the reservoir 220 has moved with respect to the fluid detection sensor 130, and measurements can be re-baselined to account for the movement of the reservoir 220.

By identifying changes in capacitance that are indicative of the reservoir 220 moving with respect to the fluid detection sensor 130 as compared to changes in capacitance that are indicative of fluid being dispensed from the reservoir 220, the controller 300 may accurately associate a detected capacitance with a fluid level within the reservoir 220.

Accordingly, it should now be understood that dispensers according to some embodiments of the present application include fluid detection sensors and a communications unit 120 that may read and write information/data to a communications tag on a cartridge positioned within the dispenser. Based on a detected usage count from the communications unit 120 and a detected fluid level from the fluid level detection sensor or sensors, the dispenser may provide an indication or indications when maintenance may be required. By utilizing a fluid detection sensor, the level of fluid within the cartridge may be detected based on the physical presence of fluid within the cartridge, providing a direct indication of detected fluid level. However, when the fluid detection sensor includes a capacitive sensor, the fluid detection sensor may be susceptible to environmental changes and it may be difficult to calibrate the fluid level detection sensor. By utilizing a communications unit 120 to indirectly count and estimate fluid remaining in the cartridge, the dispenser may have an alternative confirmation of the fluid level within the cartridge.

By combining fluid level sensing, such as through capacitive sensing, with the exchange of information/data with the communications tag 230, such as through RFID features, information/data from the communications tag 230 may be used to correct and/or re-calibrate sensor measurements from the fluid detection sensor 130, such as when the cartridge 220 shifts or moves, when calibration is lost, or when fluid level sensor 130 information/data is inconclusive. Information/data from the fluid detection sensor 130 (i.e., detected capacitance), complements the information/data from the communications tag 230, in that information/data from the fluid detection sensor 130 may be used to provide a direct, and consequently more accurate representation of the fluid level within the reservoir 220. Further, information/data from the fluid detection sensor 130 may provide more accurate representation of starting points of fluid level within the reservoir 220, for example in cases of variable initial fill levels, and may provide an accurate representation of fluid level when erroneous doses of skincare product are dispensed from the dispenser 100, as compared to representations based on usage count alone.

Furthermore, the use of product identification, through the unique identifier of the communications tag 230, may be used to adjust fluid detection sensor 130 calibrations based on product type being dispensed, dosage settings, and full reservoir 220 starting volume. Product identification, in association with fluid level detection sensor data/information and usage count data/information, may also be used to track the amount of product that may have evaporated (or short fills) due to refill age, leakage, or storage conditions. Accordingly, the product identification, in association with fluid level detection sensor data/information and usage count data/information, may assist in understanding expected life of different skincare product cartridges 200 under different conditions, which may assist in determining quality metrics, precise usage data, and may assist in the development of automated inventory control.

Further Example Embodiments

An example embodiment of the present invention includes a skincare dispenser assembly comprising a dispenser housing shaped to accommodate a nozzle assembly of a cartridge positioned within the dispenser housing. The skincare dispenser includes a fluid level detection sensor coupled to the dispenser housing and configured to detect a level of skincare product within the cartridge. The fluid level detection sensor is positioned on the dispenser housing such that the fluid level detection sensor is aligned with an end of a reservoir of the cartridge that is proximate to the nozzle assembly. The fluid level detection sensor comprises a single-plate capacitive sensor that is configured for detecting the presence of the cartridge within the dispenser housing, movement of the reservoir with respect to the fluid level detection sensor, the presence of skincare product within the reservoir of the cartridge, and the level of skincare product within the reservoir of the cartridge based on a detected capacitance across the single-plate capacitive sensor. The skincare dispenser further includes a controller electrically coupled to the fluid level detection sensor.

In some embodiments, the fluid level detection sensor is configured to determine a change in a distance between skincare product within the reservoir and the fluid level detection sensor.

In some embodiments, the fluid level detection sensor is positioned on the dispenser housing such that the fluid level detection sensor is above the reservoir.

In some embodiments, the skincare dispenser further comprises a plurality of fluid level detection sensors coupled to the dispenser housing. In some such embodiments, individual fluid level detection sensors of the plurality of fluid level detection sensors comprise different heights. In some embodiments, the plurality of fluid level detection sensors comprise a first fluid level detection sensor coupled to the dispenser housing and oriented to face in a longitudinal direction, a second fluid level detection sensor coupled to the dispenser housing and oriented to face in a vertical direction that is transverse to the longitudinal direction, and a third fluid level detection sensor coupled to the dispenser housing and oriented to face in a lateral direction that is transverse to the vertical direction and the longitudinal direction. The second fluid level detection sensor and the third fluid level detection sensor are positioned below the first fluid level detection sensor in the vertical direction. In some embodiments, individual sensors of the plurality of fluid level detection sensors operate independently of one another.

In some embodiments the skincare dispenser further comprises a communications unit communicatively coupled to the controller.

In some embodiments, the fluid level detection sensor is electrically coupled to the controller through a first wired connection, and the skincare dispenser further comprises a second wired connection that is electrically coupled to the controller at one end and is free at an opposite end.

In another example embodiment, a method for detecting a level of skincare product within a cartridge is provided. The method comprises commanding a pump to dispense skincare product from a reservoir of a cartridge that is positioned within a dispenser housing, detecting a capacitance with a fluid level detection sensor coupled to the dispenser housing, comparing the detected capacitance from the fluid level detection sensor to a reference capacitance, and storing an indication that the skincare product has been dispensed from the reservoir, the detected capacitance, and an indication that the reservoir has moved with respect to the fluid level detection sensor if a difference between the detected capacitance and the reference capacitance is greater than a predetermined threshold.

In some embodiments, the predetermined threshold is greater than a 2% difference between the detected capacitance and the reference capacitance.

In some embodiments, the predetermined threshold is between a 5% and 10% difference between the detected capacitance and the reference capacitance.

In some embodiments, the reference capacitance comprises a previously detected capacitance stored in a memory of a controller.

In some embodiments, the fluid level detection sensor comprises a single-plate capacitive sensor.

In some embodiments, the method further comprises storing an indication that skincare product has been dispensed from the reservoir and storing the detected capacitance if the difference between the detected capacitance and the reference capacitance is below the predetermined threshold.

In some embodiments, the fluid level detection sensor is aligned with an end of the reservoir that is proximate to a nozzle assembly of the cartridge.

In yet another example embodiment, a system for detecting the level skincare product within a cartridge is provided. The system comprises a dispenser housing and a fluid level detection sensor coupled to the dispenser housing. The fluid level detection sensor is configured to detect a level of skincare product within a cartridge. The fluid level detection sensor is positioned on the dispenser housing such that the fluid level detection sensor is aligned with a reservoir of the cartridge. The fluid level detection sensor comprises a single-plate capacitive sensor. The system further includes a controller electrically coupled to the fluid level detection sensor. The controller is configured to command a pump to dispense the skincare product from the reservoir of the cartridge positioned within the dispenser housing, detect a capacitance with the fluid level detection sensor, compare the detected capacitance from the fluid level detection sensor to a reference capacitance, and store an indication that the skincare product has been dispensed from the reservoir, the detected capacitance, and an indication that the reservoir has moved with respect to the fluid level detection sensor if a difference between the detected capacitance and the reference capacitance is greater than a predetermined threshold.

In some embodiments, the predetermined threshold is between a 5% and 10% difference between the detected capacitance and the reference capacitance.

In some embodiments, the fluid level detection sensor is a first fluid level detection sensor oriented to face in a longitudinal direction and the system further comprises a second fluid level detection sensor coupled to the dispenser housing and oriented to face in a vertical direction that is transverse to the longitudinal direction. The system also further comprises a third fluid level detection sensor coupled to the dispenser housing and oriented to face in a lateral direction that is transverse to the vertical direction and the longitudinal direction. The second fluid level detection sensor and the third fluid level detection sensor are positioned below the first fluid level detection sensor in the vertical direction.

In some embodiments, the reference capacitance comprises a previously detected capacitance stored in a memory of the controller.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The attached appendix further details some of the components and functionality of the dispenser assemblies described herein.

That which is claimed:

1. A fluid dispenser comprising:
    a dispenser housing configured to hold a reservoir of fluid for dispensing;
    a drive assembly configured to interact with the reservoir of fluid to cause dispensing of the fluid therefrom;
    a fluid detection sensor positioned within the dispenser housing proximate the reservoir and configured to detect a capacitance level within the reservoir; and
    a controller configured to:
        determine, based on data received from the fluid detection sensor, a change in a level of fluid of the reservoir across a dispense;
        determine, based on the change in the level of fluid in the reservoir across the dispense, an instance in which the level of fluid within the reservoir reaches a threshold level of fluid by determining an instance in which a predetermined number of consecutive changes in the level of fluid that corresponds to an increasing capacitance level within the reservoir occurs, wherein the predetermined number corresponds to at least two consecutive dispenses; and
        cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to a remote computing device, or modification of an operating parameter of the fluid dispenser.

2. The fluid dispenser of claim 1, wherein the reservoir comprises a main body portion and a nozzle portion, wherein the fluid detection sensor is a first fluid detection sensor and the detected capacitance level from the first fluid detection sensor is a first capacitance level, wherein the first fluid detection sensor is positioned proximate the main body portion and oriented to detect the capacitance level of fluid within the main body portion, and
    wherein the fluid dispenser comprises a second fluid detection sensor positioned within the dispenser housing proximate the nozzle portion of the reservoir and configured to detect a second capacitance level within the nozzle portion of the reservoir.

3. The fluid dispenser of claim 1, wherein the controller is further configured to determine an instance in which the level of fluid within the reservoir reaches the threshold level of fluid by determining that the determined change in the level of fluid of the reservoir across the dispense is greater than a minimum change in level threshold.

4. The fluid dispenser of claim 1, wherein the fluid detection sensor comprises a single-plate capacitive sensor that is configured to detect the capacitance level within the reservoir.

5. The fluid dispenser of claim 4, wherein the fluid detection sensor is configured to detect the capacitance level of a volume of the reservoir proximate the fluid detection sensor.

6. The fluid dispenser of claim 1, wherein the controller is further configured to determine the change in the level of fluid of the reservoir across the dispense based on a first measured capacitance level taken prior to the dispense and a second measured capacitance level taken after the dispense.

7. The fluid dispenser of claim 6, wherein the second measured capacitance level taken after the dispense occurs at least 90 seconds after the dispense occurs.

8. The fluid dispenser of claim 1, wherein the reservoir comprises a main body portion and a nozzle portion, wherein the reservoir is configured to be positioned with the nozzle portion vertically below the main body portion, wherein the fluid detection sensor is positioned proximate a bottom of the main body portion of the reservoir.

9. The fluid dispenser of claim 8, wherein the fluid detection sensor is oriented generally upwardly and extends across a width of the bottom of the main body portion.

10. The fluid dispenser of claim 1, wherein the reservoir comprises a main body portion and a nozzle portion, wherein the reservoir is configured to be positioned with the nozzle portion vertically below the main body portion, wherein the fluid detection sensor is positioned proximate the nozzle portion and oriented to detect the capacitance level of fluid within the nozzle portion.

11. The fluid dispenser of claim 10, wherein the threshold level of fluid corresponds to an end-of-life product level within the reservoir.

12. The fluid dispenser of claim 10, wherein the threshold level of fluid corresponds to an empty product level within the reservoir.

13. A system comprising:
    a fluid dispenser comprising:
        a dispenser housing configured to hold a reservoir of fluid for dispensing, wherein the reservoir comprises a main body portion and a nozzle portion;
        a drive assembly configured to interact with the reservoir of fluid to cause dispensing of the fluid therefrom;
        a fluid detection sensor positioned within the dispenser housing proximate the reservoir and configured to detect a capacitance level within the reservoir;
        a communications interface configured to transmit data to a remote computing device; and
        a controller configured to:
            determine, based on data received from the fluid detection sensor, a change in a level of fluid of the reservoir across a dispense;
            determine, based on the change in the level of fluid in the reservoir across the dispense, an instance in which the level of fluid within the reservoir reaches a threshold level of fluid by determining an instance in which a predetermined number of consecutive changes in the level of fluid of the reservoir that corresponds to an increasing capacitance level within the reservoir occurs, wherein the predetermined number corresponds to at least two consecutive dispenses; and cause, in an instance in which the level of fluid within the reservoir reaches the threshold level of fluid, transmission of an indication, alert, or information to a remote computing device; and the remote computing device comprising a remote computing device controller configured to:

receive, via a remote computing device communications interface, the indication, alert, or information from the fluid dispenser; and cause performance of a remote computing device action based on receipt of the indication, alert, or information.

14. The system of claim 13, wherein the fluid detection sensor comprises a single-plate capacitive sensor that is configured to detect the capacitance level within the reservoir.

15. The system of claim 13, wherein the reservoir comprises a main body portion and a nozzle portion, wherein the reservoir is configured to be positioned with the nozzle portion vertically below the main body portion, wherein the fluid detection sensor is positioned proximate the nozzle portion and oriented to detect the capacitance level of fluid within the nozzle portion.

16. A fluid dispenser comprising:

a dispenser housing configured to hold a reservoir of fluid for dispensing, wherein the reservoir comprises a main body portion and a nozzle portion;

a drive assembly configured to interact with the reservoir of fluid to cause dispensing of the fluid therefrom;

a fluid detection sensor positioned within the dispenser housing proximate the nozzle portion of the reservoir and configured to detect a capacitance level within the nozzle portion of the reservoir; and a controller configured to:

determine, based on the data received from the fluid detection sensor, a change in the capacitance level within the nozzle portion between a first nozzle portion reading corresponding to before a dispense occurs and a second nozzle portion reading corresponding to after the dispense occurs;

determine, based on data received from the fluid detection sensor, an instance in which a level of fluid within the reservoir reaches a threshold level of fluid, wherein determination of an instance in which the level of fluid within the reservoir reaches the threshold level of fluid is based on the determined change in the capacitance level within the nozzle portion between the first nozzle portion reading and the second nozzle portion reading; and cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to be sent to a remote computing device, or modification of an operating parameter of the fluid dispenser.

17. The fluid dispenser of claim 16, wherein the controller is further configured to determine an instance in which the level of fluid within the reservoir reaches the threshold level of fluid by determining an instance in which a predetermined number of consecutive changes in the capacitance level within the nozzle portion that corresponds to an increasing capacitance level within the nozzle portion occurs, and wherein the predetermined number corresponds to at least two consecutive dispenses.

18. The fluid dispenser of claim 16, wherein the reservoir is configured to be positioned within the fluid dispenser with the nozzle portion vertically below the main body portion.

19. An under-counter mounted fluid dispenser comprising:

a dispenser housing configured to mount underneath a counter and hold a reservoir of fluid for dispensing, wherein the reservoir comprises a main body portion and a nozzle portion, wherein the reservoir is configured such that the nozzle portion is positioned vertically above the main body portion;

a drive assembly configured to interact with the reservoir of fluid to cause dispensing of the fluid therefrom;

a fluid detection sensor positioned within the dispenser housing above the main body portion of the reservoir and oriented generally downwardly into the main body portion, wherein the fluid detection sensor is configured to detect a capacitance level within the main body portion of the reservoir; and a controller configured to:

determine, based on data received from the fluid detection sensor, an instance in which a level of fluid within the reservoir reaches a threshold level of fluid by determining an instance in which an increasing capacitance level within the reservoir occurs among a predetermined number of dispenses, wherein the predetermined number corresponds to at least two consecutive dispenses; and cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to be sent to a remote computing device, or modification of an operating parameter of the fluid dispenser.

20. The under-counter mounted fluid dispenser of claim 19, wherein the fluid detection sensor comprises a single-plate capacitive sensor that is configured to detect the capacitance level within the main body portion of the reservoir.

21. A fluid dispenser comprising:

a dispenser housing configured to hold a reservoir of fluid for dispensing;

a drive assembly configured to interact with the reservoir of fluid to cause dispensing of the fluid therefrom;

a fluid detection sensor positioned within the dispenser housing proximate the reservoir and configured to detect a capacitance level within the reservoir; and a controller configured to:

determine, based on data received from the fluid detection sensor, a change in a level of fluid of the reservoir across a dispense;

determine, based on the change in the level of fluid in the reservoir across the dispense, an instance in which the level of fluid within the reservoir reaches a threshold level of fluid, wherein the threshold level of fluid corresponds to an end-of-life product level within the reservoir, wherein the determination of an instance in which the level of fluid within the reservoir reaches the end-of-life product level comprises determining an instance in which a predetermined number of consecutive changes in the level of fluid of the reservoir that corresponds to an increasing capacitance level within the reservoir occurs, wherein the predetermined number corresponds to at least two consecutive dispenses; and cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to a remote computing device, or modification of an operating parameter of the fluid dispenser.

22. A fluid dispenser comprising:

a dispenser housing configured to hold a reservoir of fluid for dispensing;

a drive assembly configured to interact with the reservoir of fluid to cause dispensing of the fluid therefrom;

a fluid detection sensor positioned within the dispenser housing proximate the reservoir and configured to detect a capacitance level within the reservoir; and a controller configured to:
 determine, based on data received from the fluid detection sensor, a change in a level of fluid of the reservoir across a dispense, wherein the determination of a change in the level of fluid is based on a first measured capacitance level taken prior to the dispense and a second measured capacitance level taken after the dispense;
 determine, based on the change in the level of fluid in the reservoir across the dispense, an instance in which the level of fluid within the reservoir reaches a threshold level of fluid; and
 cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to a remote computing device, or modification of an operating parameter of the fluid dispenser.

23. A fluid dispenser comprising:

a dispenser housing configured to hold a reservoir of fluid for dispensing;

a drive assembly configured to interact with the reservoir of fluid to cause dispensing of the fluid therefrom;

a fluid detection sensor positioned within the dispenser housing proximate the reservoir and configured to detect a capacitance level within the reservoir; and a controller configured to:
 determine, based on data received from the fluid detection sensor, a change in a level of fluid of the reservoir across a dispense;
 determine, based on the change in the level of fluid in the reservoir across the dispense, an instance in which the level of fluid within the reservoir reaches a threshold level of fluid by determining that the determined change in the level of fluid of the reservoir across the dispense is greater than a minimum change in level threshold; and
 cause, in an instance in which the level of fluid within the reservoir reaches the threshold level of fluid, a threshold operation to occur, wherein the threshold operation comprises at least one of indication of a notification on an interface of the fluid dispenser, transmission of an alert or information to a remote computing device, or modification of an operating parameter of the fluid dispenser.

* * * * *